(12) United States Patent
Lee et al.

(10) Patent No.: US 12,736,776 B2
(45) Date of Patent: Sep. 15, 2026

(54) OPTICAL IMAGING SYSTEM

(71) Applicant: SAMSUNG ELECTRO-MECHANICS CO., LTD., Suwon-si (KR)

(72) Inventors: Ji Su Lee, Suwon-si (KR); Dong Hyuk Jang, Suwon-si (KR); Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 726 days.

(21) Appl. No.: 17/861,483

(22) Filed: Jul. 11, 2022

(65) Prior Publication Data

US 2023/0176328 A1 Jun. 8, 2023

(30) Foreign Application Priority Data

Dec. 8, 2021 (KR) ........................ 10-2021-0175111

(51) Int. Cl.
*G02B 9/64* (2006.01)
*G02B 1/04* (2006.01)

(52) U.S. Cl.
CPC ............... *G02B 9/64* (2013.01); *G02B 1/041* (2013.01)

(58) Field of Classification Search
CPC ....... G02B 9/64; G02B 13/16; G02B 13/0045
See application file for complete search history.

(56) References Cited

U.S. PATENT DOCUMENTS

2012/0147254 A1* 6/2012 Adachi .................. G02B 13/04 359/740
2018/0180856 A1* 6/2018 Jung .................. G02B 13/0045
2019/0204560 A1 7/2019 Jhang et al.
2020/0249439 A1* 8/2020 Song .................. G02B 27/0025
2021/0055520 A1* 2/2021 Yan .................... G02B 13/0045
2021/0063697 A1 3/2021 Li et al.
2021/0109323 A1 4/2021 Dai et al.
(Continued)

FOREIGN PATENT DOCUMENTS

CN 110531503 A 12/2019
CN 110908083 A 3/2020
(Continued)

OTHER PUBLICATIONS

Korean Office Action issued on May 8, 2024, in counterpart Korean Patent Application No. 10-2021-0175111 (8 pages in English, 6 pages in Korean).
(Continued)

*Primary Examiner* — Mariam Qureshi
(74) *Attorney, Agent, or Firm* — NSIP Law

(57) ABSTRACT

An optical imaging system is provided. The optical imaging system includes: a first lens, a second lens, a third lens, a fourth lens, a fifth lens, a sixth lens, a seventh lens and an eighth lens, which are arranged in order from an object side to an imaging side, wherein the first lens has positive refractive power and the second lens has negative refractive power, wherein at least one lens of the first lens to the eighth lens is formed of glass, and the remaining lenses are formed of plastic, and TTL/(2×IMG HT)<0.6 is satisfied, where TTL indicates a distance on an optical axis from an object-side surface of the first lens to an imaging plane, and IMG HT indicates half a diagonal length of the imaging plane.

18 Claims, 21 Drawing Sheets

(56) References Cited

U.S. PATENT DOCUMENTS

| | | | | |
|---|---|---|---|---|
| 2021/0149158 | A1 | 5/2021 | Hsueh et al. | |
| 2021/0157097 | A1* | 5/2021 | Hirano | H04N 23/55 |
| 2021/0173183 | A1* | 6/2021 | Ye | G02B 9/64 |
| 2021/0181476 | A1 | 6/2021 | Sun | |
| 2021/0356699 | A1 | 11/2021 | Lin et al. | |
| 2021/0364752 | A1 | 11/2021 | Peng | |
| 2022/0050272 | A1 | 2/2022 | Lin et al. | |
| 2022/0236534 | A1* | 7/2022 | Liu | G02B 15/1461 |
| 2022/0244494 | A1* | 8/2022 | Sun | G02B 9/64 |
| 2022/0244500 | A1* | 8/2022 | Tseng | G02B 13/0045 |

FOREIGN PATENT DOCUMENTS

| | | | |
|---|---|---|---|
| CN | 111025533 | A | 4/2020 |
| CN | 111061036 | A | 4/2020 |
| CN | 111142223 | A | 5/2020 |
| CN | 111308658 | A | 6/2020 |
| CN | 111352219 | A | 6/2020 |
| CN | 212540861 | U | 2/2021 |
| CN | 113156615 | A | 7/2021 |
| CN | 113204096 | A | 8/2021 |
| CN | 113703138 | A | 11/2021 |
| CN | 113759526 | A | 12/2021 |
| JP | 2021-33300 | A | 3/2021 |
| TW | I698675 | B | 7/2020 |
| TW | I742814 | B | 10/2021 |
| WO | WO 2021/237782 | A1 | 12/2021 |

OTHER PUBLICATIONS

Taiwanese Office Action Issued on Jan. 15, 2025, in Counterpart Taiwanese Patent Application No. 113111447 (7 Pages in English, 6 Pages in Chinese).

Taiwanese Office Action issued on Jun. 26, 2023, in counterpart Taiwanese Patent Application No. 111125146 (8 pages in English, 8 pages in Chinese).

Chinese Office Action issued on Mar. 22, 2025, in corresponding Chinese Patent Application No. 202211189192.6. (7pages in English, 12pages in Chinese).

Taiwanese Office Action issued on Apr. 9, 2026, in counterpart Taiwanese Patent Application No. 115102663 (7 pages in English, 8 pages in Chinese).

* cited by examiner

OPTICAL IMAGING SYSTEM

CROSS-REFERENCE TO RELATED APPLICATIONS

This application claims the benefit under 35 USC § 119(a) of Korean Patent Application No. 10-2021-0175111, filed on Dec. 8, 2021, in the Korean Intellectual Property Office, the entire disclosure of which is incorporated herein by reference for all purposes.

BACKGROUND

1. Field

The following description relates to an optical imaging system.

2. Description of Related Art

Recently, portable terminals have been equipped with a camera including an optical imaging system including a plurality of lenses to make, as examples, video calls, and to capture images.

Additionally, as the functions that are implemented by the camera in the portable terminal have gradually increased, there has been an increasing demand for the implementation of high resolution cameras in portable terminals.

In particular, recent cameras implemented in portable terminals may include an image sensor having a high pixel amount (e.g., thirteen to one hundred megapixels) in order to implement clearer image quality.

Additionally, since the form factor of portable terminals has become smaller, it may be beneficial that the cameras implemented in portable terminals also have a slim form factor. Accordingly, an optical imaging system that implements a high resolution while having a slim form factor may also be beneficial.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an optical imaging system includes a first lens, a second lens, a third lens, a fourth lens, a fifth lens, a sixth lens, a seventh lens and an eighth lens, which are arranged in order from an object side to an imaging side, wherein the first lens has positive refractive power and the second lens has negative refractive power, wherein at least one lens of the first to eighth lens is formed of glass, and remaining lenses are formed of plastic, and wherein $TTL/(2\times IMG\ HT)<0.6$ is satisfied, where TTL indicates a distance on an optical axis from an object-side surface of the first lens to an imaging plane, and IMG HT indicates half a diagonal length of the imaging plane.

At least one of $-0.2<SAG\mathbf{52}/TTL<0$, $-0.2<SAG\mathbf{62}/TTL<0$, $-0.3<SAG\mathbf{72}/TTL<0$ and $-0.3<SAG\mathbf{82}/TTL<0$ may be satisfied, where SAG52 indicates a Sag value obtained at an end of an effective diameter of an image-side surface of the fifth lens, SAG62 indicates a Sag value obtained at an end of an effective diameter of an image-side surface of the sixth lens, SAG72 indicates a Sag value obtained at an end of an effective diameter of an image-side surface of the seventh lens, and SAG82 indicates a Sag value obtained at an end of an effective diameter of an image-side surface of the eighth lens.

At least one of $40<v1-v2<70$, $30<v1-v4<70$ and $20<v1-(v6+v7)/2<50$ may be satisfied, where v1 indicates an Abbe number of the first lens, v2 indicates an Abbe number of the second lens, v4 indicates an Abbe number of the fourth lens, v6 indicates an Abbe number of the sixth lens, and v7 indicates an Abbe number of the seventh lens.

The first lens may be formed of glass having an Abbe number greater than 70.

The Abbe number of the first lens may be the greatest among the Abbe numbers of the first to eighth lenses, and the second lens and the fourth lens may each be formed of one of glass and plastic having a refractive index greater than 1.65 and the Abbe number less than 22.

$0<f1/f<1.4$ may be satisfied, where f indicates a total focal length of the optical imaging system, and f1 indicates a focal length of the first lens.

$-10<f2/f<-1$ may be satisfied in which "f" indicates a total focal length of the optical imaging system, and f2 indicates a focal length of the second lens.

$0<|f3/f|/10<30$ may be satisfied, where f indicates a total focal length of the optical imaging system, and f3 indicates a focal length of the third lens.

$0.5<|f6/f|<10$ may be satisfied, where f indicates a total focal length of the optical imaging system, and f6 indicates a focal length of the sixth lens.

$-3<f8/f<0$ may be satisfied, where f indicates a total focal length of the optical imaging system, and f8 indicates a focal length of the eighth lens.

$TTL/f<1.4$ and $BFL/f<0.3$ may be satisfied, where f indicates a total focal length of the optical imaging system, and BFL indicates a distance on the optical axis from an image-side surface of the eighth lens to the imaging plane.

$D\mathbf{1}/f<0.1$ may b satisfied, where D1 indicates a distance on the optical axis between an image-side surface of the first lens and an object-side surface of the second lens.

$FOV\times(IMG\ HT/f)>65°$ may be satisfied, where f indicates a total focal length of the optical imaging system, and FOV indicates a field of view of the optical imaging system.

The fifth lens may have at least one inflection point on an image-side surface thereof, and $2<|Y\mathbf{52}/Z\mathbf{52}|<50$ may be satisfied, where Y52 indicates a vertical height between a first inflection point of the image-side surface of the fifth lens and the optical axis, and Z52 indicates a Sag value obtained at the first inflection point of the image-side surface of the fifth lens.

The sixth lens may have at least one inflection point on an image-side surface thereof, and $3<|Y\mathbf{62}/Z\mathbf{62}|<50$ is satisfied, where Y62 indicates a vertical height between a first inflection point of the image-side surface of the sixth lens and the optical axis, and Z62 indicates a Sag value obtained at the first inflection point of the image-side surface of the sixth lens.

The seventh lens may have at least one inflection point on an image-side surface thereof, and $5<|Y\mathbf{72}/Z\mathbf{72}|<120$ may be satisfied, in which Y72 indicates a vertical height between a first inflection point of the image-side surface of the seventh lens and the optical axis, and Z72 indicates a Sag value obtained at the first inflection point of the image-side surface of the seventh lens.

The eighth lens may have at least one inflection point on an image-side surface thereof, and 2<|Y82/Z82|<30 in which Y82 indicates a vertical height between a first inflection point of the image-side surface of the eighth lens and the optical axis, and Z82 indicates a Sag value obtained at the first inflection point of the image-side surface of the eighth lens.

Other features and aspects will be apparent from the following detailed description, the drawings, and the claims.

BRIEF DESCRIPTION OF DRAWINGS

The above and other aspects, features, and advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
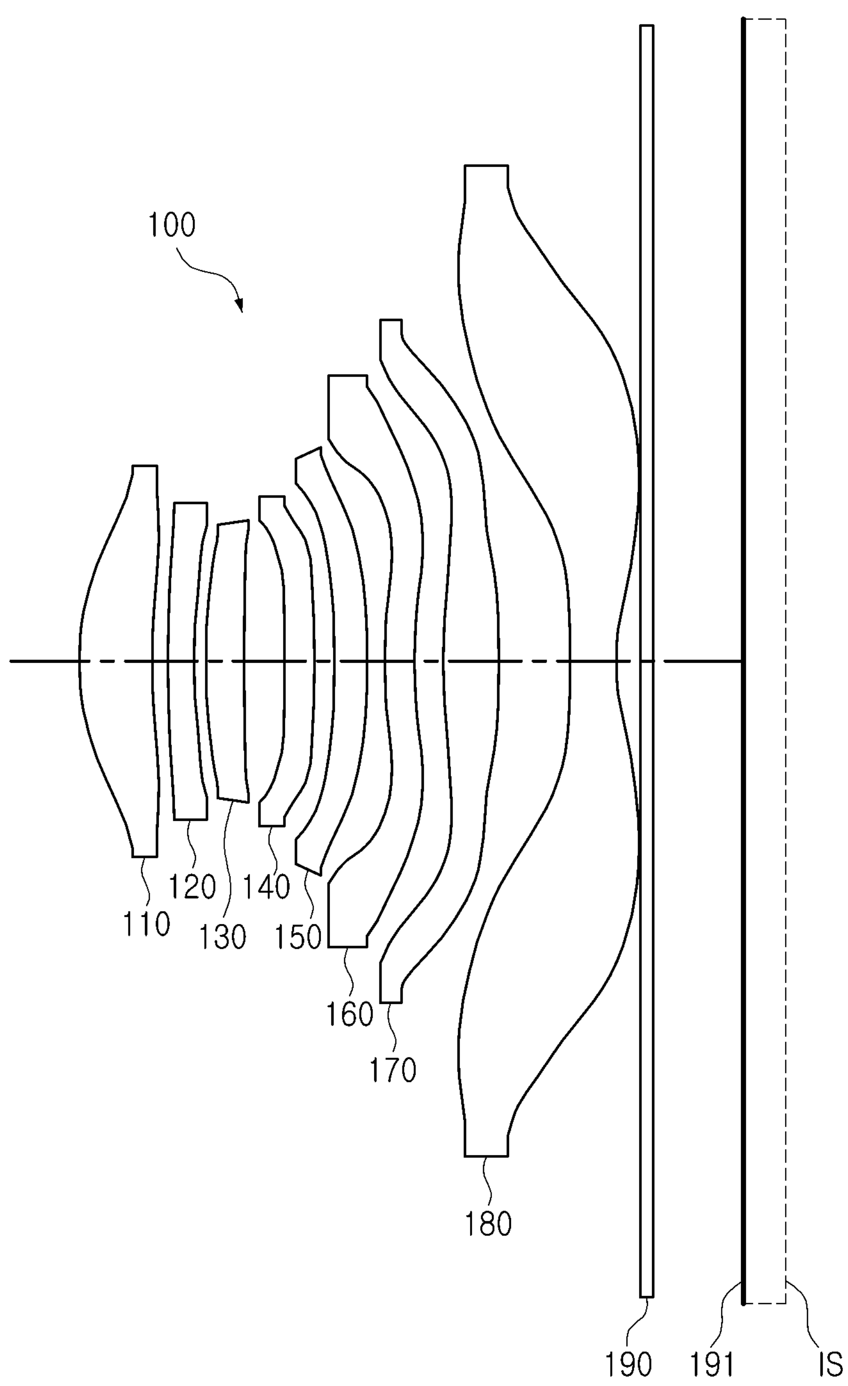
FIG. 1 is a view illustrating an optical imaging system in accordance with a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as “first,” “second,” and “third” may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being “on,” “connected to,” or “coupled to” another element, it may be directly “on,” “connected to,” or “coupled to” the other element, or there may be one or more other elements intervening therebetween. In contrast, when an element is described as being “directly on,” “directly connected to,” or “directly coupled to” another element, there can be no other elements intervening therebetween.

The terminology used herein is for the purpose of describing particular examples only, and is not to be used to limit the disclosure. As used herein, the singular forms “a,” “an,” and “the” are intended to include the plural forms as well, unless the context clearly indicates otherwise. As used herein, the term “and/or” includes any one and any combination of any two or more of the associated listed items. As used herein, the terms “include,” “comprise,” and “have” specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being “on,” “connected to,” or “coupled to” another element, it may be directly “on,” “connected to,” or “coupled to” the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

In the drawings, the thickness, size and shape of a lens are somewhat exaggerated for convenience of explanation. In particular, a shape of a spherical surface or aspherical surface, illustrated in the drawings, is only illustrative. That is, the shape of the spherical surface or aspherical surface is not limited to that illustrated in the drawings.

An aspect of the one or more examples may provide an optical imaging system which may implement a high resolution and have a small overall length.

A first lens may indicate a lens disposed closest to an object side, and an eighth lens may indicate a lens disposed closest to an imaging plane (or image sensor).

Additionally, a first surface of each lens may indicate its surface closest to the object side (or object-side surface) and a second surface of each lens may indicate its surface closest to an image side (or image-side surface). Additionally, all numerical values of the radius of curvature, thickness, distance, focal length and the like of the lens may be indicated by millimeters (mm), and a field of view (FOV) may be indicated by degrees.

Further, in a description for a shape of each lens, one surface of a lens, having a convex shape, may indicate that a paraxial region of the corresponding surface is convex, one surface of a lens, having a concave shape, may indicate that a paraxial region of the corresponding surface is concave, and one surface of a lens, having a flat shape, may indicate that a paraxial region of the corresponding surface is flat. Therefore, although it is described that one surface of a lens is convex, an edge portion of the lens may be concave. Likewise, although it is described that one surface of a lens is concave, an edge portion of the lens may be convex. In addition, although it is described that one surface of a lens is flat, an edge portion of the lens may be convex or concave.

Meanwhile, a paraxial region may indicate a very narrow region in the vicinity of an optical axis.

The imaging plane may indicate a virtual plane where a focal point is formed by the optical imaging system. Alternatively, the imaging plane may indicate one surface of the image sensor, on which light is received.

An optical imaging system in accordance with one or more embodiments may include eight lenses.

In an example, the optical imaging system in accordance with one or more embodiments may include a first lens, a second lens, a third lens, a fourth lens, a fifth lens, a sixth lens, a seventh lens, and an eighth lens sequentially disposed from the object side to the imaging side. The first lens to the eighth lens may respectively be arranged to be spaced apart from each other by a predetermined distance along the optical axis.

However, the optical imaging system, in accordance with one or more embodiments, is not limited to only including eight lenses, and may further include another component and additional or fewer lenses, if necessary.

In an example, the optical imaging system may further include an image sensor converting an image of a subject incident on the image sensor into an electrical signal.

Additionally, the optical imaging system may further include an infrared filter (hereinafter, filter) blocking an infrared ray. The filter may be disposed between the eighth lens and the image sensor. Additionally, the optical imaging system may further include an aperture adjusting an amount of light.

Meanwhile, the fifth to eighth lenses may each include one or more inflection points on the image-side surface. In an example, the fifth to eighth lenses may each include two inflection points on the image-side surface.

The fifth to eighth lenses may each have at least one inflection point and a critical point on the image-side surface.

The inflection point may indicate a point at which a surface of the lens is changed from concave to convex or vice versa. In addition, the critical point may indicate a position of the lens when a tangent line of the lens at any point on its surface is perpendicular to the optical axis.

Some of the plurality of lenses included in the optical imaging system, in accordance with one or more embodiments, may be formed of glass and the others may be formed of plastic.

For example, at least one lens including the first lens may be formed of glass, and the remaining lenses may be formed of plastic.

In the example, the first lens may be formed of glass having the Abbe number greater than 70.

In the examples, the Abbe number of the first lens may be the greatest among the Abbe numbers of the first to eighth lenses.

In the examples, the first lens may be formed of glass, and the second to eighth lenses may be formed of plastic. In addition, the second to eighth lenses may each be formed of plastic having an optical characteristic different from an optical characteristic of an adjacent lens.

In the examples, the first lens and the second lens may be formed of glass, and the third to eighth lenses may be formed of plastic. In addition, the third to eighth lenses may each be formed of plastic having an optical characteristic different from an optical characteristic of an adjacent lens.

In the examples, the first lens to the third lens may each be formed of glass, and the fourth to eighth lenses may be formed of plastic. In addition, the fourth to eighth lenses may each be formed of plastic having an optical characteristic different from an optical characteristic of an adjacent lens.

In the examples, the first lens to the fourth lens may each be formed of glass, and the fifth to eighth lenses may be formed of plastic. In addition, the fifth to eighth lenses may each be formed of plastic having an optical characteristic different from an optical characteristic of an adjacent lens.

In an example, at least three lenses among the first lens to the eighth lens may each have a refractive index greater than 1.61. In an example, the refractive indices of the second, fourth and sixth lenses may each be greater than 1.61. Alternatively, the refractive indices of the second fourth and seventh lenses may each be greater than 1.61.

In the examples, at least two lenses among the first to eighth lenses may each have a refractive index greater than 1.65 and negative refractive power.

In the examples, the second lens and the fourth lens may each be formed of glass or plastic having a refractive index greater than 1.65 and the Abbe number less than 22.

At least one of the first to eighth lenses may have an aspherical surface. Further, each of the first to eighth lenses may have at least one aspherical surface.

That is, at least one of first and second surfaces of all of the first to eighth lenses may be aspherical. In the one or more examples, the aspherical surfaces of the first to eighth lenses may be expressed by Equation 1 below.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30} \quad \text{Equation 1}$$

In Equation 1, "c" may indicate a curvature (reciprocal of the radius of curvature) of the lens, "K" may indicate a conic constant, and "Y" may indicate a distance from any point on the aspherical surface of the lens to the optical axis. In addition, each of constants "A" to "P" may indicate a coefficient of the aspherical surface. In addition, "Z(SAG)" may indicate a distance from any point on the aspherical surface of the lens to a vertex of the aspherical surface in an optical axis direction.

The optical imaging system, in accordance with one or more embodiments, may satisfy the following conditional expressions:

$$0 < f1/f < 1.4 \quad \text{[Conditional Expressions 1]}$$

$$40 < \nu1 - \nu2 < 70 \quad \text{[Conditional Expressions 2]}$$

$$30 < \nu1 - \nu4 < 70 \quad \text{[Conditional Expressions 3]}$$

$$20 < \nu1 - (\nu6 + \nu7)/2 < 50 \quad \text{[Conditional Expressions 4]}$$

$$-10 < f2/f < -1 \quad \text{[Conditional Expressions 5]}$$

$$0 < |f3/f|/10 < 30 \quad \text{[Conditional Expressions 6]}$$

$$0.5 < |f6/f| < 10 \quad \text{[Conditional Expressions 7]}$$

$$-3 < f8/f < 0 \quad \text{[Conditional Expressions 8]}$$

$$TTL/f < 1.4 \quad \text{[Conditional Expressions 9]}$$

$$BFL/f < 0.3 \quad \text{[Conditional Expressions 10]}$$

$$D1/f < 0.1 \quad \text{[Conditional Expressions 11]}$$

$$TTL/(2 \times IMG\ HT) < 0.6 \quad \text{[Conditional Expressions 12]}$$

$$FOV \times (IMG\ HT/f) > 65° \quad \text{[Conditional Expressions 13]}$$

$$-0.2 < SAG52/TTL < 0 \quad \text{[Conditional Expressions 14]}$$

$$-0.2 < SAG62/TTL < 0 \quad \text{[Conditional Expressions 15]}$$

-continued $$-0.3 < SAG72/TTL < 0 \quad \text{[Conditional Expressions 16]}$$

$$-0.3 < SAG82/TTL < 0 \quad \text{[Conditional Expressions 17]}$$

$$2 < |Y52/Z52| < 50 \quad \text{[Conditional Expressions 18]}$$

$$3 < |Y62/Z62| < 50 \quad \text{[Conditional Expressions 19]}$$

$$5 < |Y72/Z72| < 120 \quad \text{[Conditional Expressions 20]}$$

$$2 < |Y82/Z82| < 30 \quad \text{[Conditional Expressions 21]}$$

In the conditional expressions, "f" may indicate a total focal length of the optical imaging system, f1 may indicate the focal length of the first lens, f2 may indicate the focal length of the second lens, f3 may indicate the focal length of the third lens, f6 may indicate the focal length of the sixth lens, and f8 may indicate the focal length of the eighth lens.

ν1 may indicate the Abbe number of the first lens, ν2 may indicate the Abbe number of the second lens, ν4 may indicate the Abbe number of the fourth lens, ν6 may indicate the Abbe number of the sixth lens, and ν7 may indicate the Abbe number of the seventh lens.

TTL may indicate a distance from the object-side surface of the first lens to the imaging plane in the optical axis direction, and BFL may indicate a distance from the image-side surface of the eighth lens to the imaging plane in the optical axis direction.

D1 may indicate a distance between the image-side surface of the first lens and the object-side surface of the second lens in the optical axis direction, IMG HT may indicate half a diagonal length of the imaging plane, and FOV may indicate the field of view of the optical imaging system.

SAG52 may indicate a Sag value obtained at an end of an effective diameter of the image-side surface of the fifth lens, SAG62 may indicate a Sag value obtained at an end of an effective diameter of the image-side surface of the sixth lens, SAG72 may indicate a Sag value obtained at an end of an effective diameter of the image-side surface of the seventh lens, and SAG82 may indicate a Sag value obtained at an end of an effective diameter of the image-side surface of the eighth lens.

The SAG value may have a negative value when the end of the effective diameter of a corresponding surface of the lens is positioned closer to the object side than a vertex of the corresponding surface of the lens in the optical axis direction.

The SAG value may have a positive value when the end of the effective diameter of the corresponding surface of the lens is positioned closer to the image side than the vertex of the corresponding surface of the lens in the optical axis direction.

Y52 may indicate a vertical height between a first inflection point of the image-side surface of the fifth lens and the optical axis, Y62 may indicate a vertical height between a first inflection point of the image-side surface of the sixth lens and the optical axis, Y72 may indicate a vertical height between a first inflection point of the image-side surface of the seventh lens and the optical axis, and Y82 may indicate a vertical height between a first inflection point of the image-side surface of the eighth lens and the optical axis.

Z52 may indicate a Sag value obtained at the first inflection point of the image-side surface of the fifth lens, Z62 may indicate a Sag value obtained at the first inflection point of the image-side surface of the sixth lens, Z72 may indicate a Sag value obtained at the first inflection point of the image-side surface of the seventh lens, and Z82 may indicate a Sag value obtained at the first inflection point of the image-side surface of the eighth lens.

The description describes the first to eighth lenses included in the optical imaging system, in accordance with one or more embodiments.

The first lens may have positive refractive power. In addition, the first lens may have a meniscus shape of which the object-side surface is convex. Specifically, the first lens may have with a convex first surface and a concave second surface.

At least one of the first and second surfaces of the first lens may be aspherical. In an example, both the surfaces of the first lens may be aspherical.

The second lens may have negative refractive power. In addition, the second lens may have a meniscus shape of which the object-side surface is convex. Specifically, the second lens may have with a convex first surface and a concave second surface.

At least one of the first and second surfaces of the second lens may be aspherical. For example, both the surfaces of the second lens may be aspherical.

The third lens may have positive or negative refractive power. In addition, the third lens may have a meniscus shape of which the object-side surface is convex. Specifically, the third lens may have with a convex first surface and a concave second surface.

At least one of the first and second surfaces of the third lens may be aspherical. For example, both the surfaces of the third lens may be aspherical.

The fourth lens may have positive or negative refractive power. In addition, both the surfaces of the fourth lens may be concave. Specifically, the fourth lens may have concave first and second surfaces.

Alternatively, the fourth lens may have a meniscus shape of which the object-side surface is convex. Specifically, the fourth lens may have a convex first surface and a concave second surface.

Alternatively, the fourth lens may have a meniscus shape of which the image-side surface is convex. Specifically, the fourth lens may have a concave first surface and a convex second surface.

At least one of the first and second surfaces of the fourth lens may be aspherical. In an example, both surfaces of the fourth lens may be aspherical.

The fifth lens may have positive or negative refractive power. In addition, the fifth lens may have a meniscus shape of which the image-side surface is convex. Specifically, the fifth lens may have a concave first surface and a convex second surface.

Alternatively, the fifth lens may have a meniscus shape of which the object-side surface is convex. Specifically, the fifth lens may have a first surface that is convex in the paraxial region and a second surface that is concave in the paraxial region.

At least one of the first and second surfaces of the fifth lens may be aspherical. In an example, both surfaces of the fifth lens may be aspherical.

At least one inflection point may be formed on at least one of the first and second surfaces of the fifth lens. In an example, the fifth lens may have a first surface thereof that is concave in the paraxial region and convex in regions other than the paraxial region. The fifth lens may have a second surface that is convex in the paraxial region and may be concave in regions other than the paraxial region.

The sixth lens may have positive or negative refractive power. In addition, the sixth lens may have a meniscus shape of which the object-side surface is convex. Specifically, the sixth lens may have a first surface that is convex in the paraxial region and a second surface that is concave in the paraxial region.

Alternatively, both surfaces of the sixth lens may be convex. Specifically, the sixth lens may have first and second surfaces that are convex in the paraxial region.

At least one of the first and second surfaces of the sixth lens may be aspherical. In an example, both surfaces of the sixth lens may be aspherical.

At least one inflection point may be formed on at least one of the first and second surfaces of the sixth lens. In an example, the sixth lens may have a first surface that is convex in the paraxial region and concave in regions other than the paraxial region. The sixth lens may have a second surface that is concave in the paraxial region and convex in regions other than the paraxial region.

The seventh lens may have positive or negative refractive power. In addition, both surfaces of the seventh lens may be convex. Specifically, the first and second surfaces of the seventh lens may be convex.

Alternatively, the seventh lens may have a meniscus shape of which the image-side surface is convex. Specifically, the seventh lens may have a first surface that is concave in the paraxial region and a second surface that is convex in the paraxial region.

At least one of the first and second surfaces of the seventh lens may be aspherical. In an example, both surfaces of the seventh lens may be aspherical.

In addition, at least one inflection point may be formed on at least one of the first and second surfaces of the seventh lens. In an example, the seventh lens may have a first surface that is convex in the paraxial region and concave in regions other than the paraxial region. The second surface of the seventh lens may be convex in the paraxial region and may be concave in regions other than the paraxial region.

The eighth lens may have negative refractive power. In addition, the eighth lens may have a meniscus shape of which the object-side surface is convex. Specifically, the eighth lens may have a first surface that is convex in the paraxial region and a second surface that is concave in the paraxial region.

At least one of the first and second surfaces of the eighth lens may be aspherical. In an example, both surfaces of the eighth lens may be aspherical.

In addition, at least one inflection point may be formed on at least one of the first and second surfaces of the eighth lens. In an example, the eighth lens may have a first surface that is convex in the paraxial region and concave in regions other than the paraxial region. The eighth lens may have a second surface that is concave in the paraxial region and convex in regions other than the paraxial region.

An optical imaging system, in accordance with a first example, will be described with reference to FIGS. 1 and 2.

The optical imaging system, in accordance with the first example, may include a first lens 110, a second lens 120, a third lens 130, a fourth lens 140, a fifth lens 150, a sixth lens 160, a seventh lens 170 and an eighth lens 180, and may further include a filter 190 and an image sensor IS including an imaging plane 191.

The optical imaging system, in accordance with the first example, may focus an image on the imaging plane 191. The imaging plane 191 may indicate a surface on which the focal point is formed by the optical imaging system. For example, the imaging plane 191 may indicate one surface of the image sensor IS, on which light is received.

Tables 1 and 2 illustrate characteristics of each lens (e.g., radius of curvature, thickness of the lens or distance between the lenses, refractive index, Abbe number or focal length).

TABLE 1

| Surface No. | Item | Radius of curvature | Thickness or distance | Refractive index | Abbe No. | Focal length |
|---|---|---|---|---|---|---|
| S1 | First lens | 2.130 | 0.609 | 1.553 | 71.7 | 5.26 |
| S2 | First lens | 7.086 | 0.120 | | | |
| S3 | Second lens | 12.577 | 0.220 | 1.680 | 18.2 | −15.94 |
| S4 | Second lens | 5.822 | 0.100 | | | |
| S5 | Third lens | 5.527 | 0.319 | 1.535 | 55.7 | 14.02 |
| S6 | Third lens | 20.377 | 0.337 | | | |
| S7 | Fourth lens | −290.876 | 0.235 | 1.680 | 18.2 | −225.46 |
| S8 | Fourth lens | 333.647 | 0.172 | | | |
| S9 | Fifth lens | −5.614 | 0.266 | 1.535 | 55.7 | −159.42 |
| S10 | Fifth lens | −6.107 | 0.157 | | | |
| S11 | Sixth lens | 3.839 | 0.233 | 1.614 | 25.9 | −21.01 |
| S12 | Sixth lens | 2.896 | 0.242 | | | |
| S13 | Seventh lens | 6.584 | 0.470 | 1.544 | 56.0 | 3.88 |
| S14 | Seventh lens | −3.044 | 0.578 | | | |
| S15 | Eighth lens | 17.919 | 0.380 | 1.535 | 55.7 | −3.05 |
| S16 | Eighth lens | 1.489 | 0.200 | | | |
| S17 | Filter | Infinity | 0.110 | 1.517 | 64.2 | |
| S18 | Filter | Infinity | 0.750 | | | |
| S19 | Imaging plane | Infinity | | | | |

TABLE 2

| | | | |
|---|---|---|---|
| f | 4.52 | Y52 | 1.4497 |
| IMG HT | 5.107 | Y62 | 0.4845 |
| FOV | 93.6 | Y72 | 0.7149 |
| SAG52 | −0.3815 | Y82 | 0.5766 |
| SAG62 | −0.3947 | Z52 | −0.27508 |
| SAG72 | −0.8076 | Z62 | 0.03288 |
| SAG82 | −0.9136 | Z72 | −0.06076 |
| | | Z82 | 0.08385 |

In the first example, the first lens 110 may have positive refractive power, with a convex first surface and a concave second surface.

The second lens 120 may have negative refractive power, with a convex first surface and a concave second surface.

The third lens 130 may have positive refractive power, with a convex first surface and a concave second surface.

The fourth lens 140 may have negative refractive power, with a convex first surface and a concave second surface.

The fifth lens 150 may have negative refractive power, while the first surface may be concave in the paraxial region, and the second surface may be convex in the paraxial region.

In addition, at least one inflection point may be formed on at least one of the first and second surfaces of the fifth lens 150. In an example, the fifth lens 150 may have a first surface that is concave in the paraxial region and convex in regions other than the paraxial region. In addition, the fifth lens 150 may have a second surface that is convex in the paraxial region and may be concave in regions other than the paraxial region.

The sixth lens 160 may have negative refractive power, while the first surface of the sixth lens may be concave in the paraxial region.

In addition, at least one inflection point may be formed on at least one of the first and second surfaces of the sixth lens 160. In an example, the first surface of the sixth lens 160 may be convex in the paraxial region and concave in regions other than the paraxial region. In addition, the sixth lens 160 may have a second surface that is concave in the paraxial region and convex in regions other than the paraxial region.

The seventh lens 170 may have positive refractive power, and the first and second surfaces may be convex in the paraxial region.

In addition, at least one inflection point may be formed on at least one of the first and second surfaces of the seventh lens 170. In an example, the seventh lens 170 may have a first surface that is convex in the paraxial region and concave in regions other than the paraxial region. In addition, the seventh lens 170 may have a second surface that is convex in the paraxial region and may be concave in regions other than the paraxial region.

The eighth lens 180 may have negative refractive power, while the first surface of the eighth lens may be concave in the paraxial region.

In addition, at least one inflection point may be formed on at least one of the first and second surfaces of the eighth lens 180. In an example, the eighth lens 180 may have a first surface that is convex in the paraxial region and concave in regions other than the paraxial region. In addition, the eighth lens 180 may have a second surface that is concave in the paraxial region and convex in regions other than the paraxial region.

The first lens 110 may be formed of glass, and the second lens 120 to the eighth lens 180 may be formed of plastic. In addition, the second lens 120 to the eighth lens 180 may each be formed of plastic having optical characteristics different from optical characteristics of an adjacent lens.

In an example, the first lens 110 may be formed of glass having a high dispersion value, and the second lens 120 and the fourth lens 140 may each be formed of plastic having a high refractive index and a low dispersion value.

In an example, each surface of the first lens 110 to the eighth lens 180 may have an aspherical coefficient as illustrated in Table 3. In an example, the object-side surfaces and image-side surfaces of the first to eighth lenses 110 to 180 may be all the aspherical surfaces.

TABLE 3

| | S1 | S2 | S3 | S4 | S5 | S6 | S7 | S8 |
|---|---|---|---|---|---|---|---|---|
| K | −2.938 | −59.628 | 27.579 | 11.874 | 3.652 | 99.000 | −99.000 | −99.000 |
| A | 2.312E−02 | −3.696E−02 | −1.676E−02 | 2.926E−02 | −9.997E−02 | −6.646E−02 | −6.995E−02 | −3.075E−02 |
| B | 3.241E−02 | 3.812E−01 | −3.931E−03 | −9.044E−01 | 1.822E+00 | 8.845E−01 | −7.793E−02 | −1.900E−01 |
| C | −1.979E−01 | −2.758E+00 | 4.464E−02 | 1.011E+01 | −2.242E+01 | −9.357E+00 | 2.582E−01 | 1.168E+00 |
| D | 5.647E−01 | 1.196E+01 | 2.963E−01 | −7.247E+01 | 1.745E+02 | 6.422E+01 | −7.053E−01 | −6.740E+00 |
| E | −9.783E−01 | −3.409E+01 | −2.304E+00 | 3.553E+02 | −9.128E+02 | −3.005E+02 | −1.212E+00 | 2.609E+01 |
| F | 9.295E−01 | 6.692E+01 | 7.819E+00 | −1.227E+03 | 3.338E+03 | 9.895E+02 | 1.753E+01 | −6.857E+01 |
| G | −1.813E−01 | −9.296E+01 | −1.755E+01 | 3.035E+03 | −8.730E+03 | −2.339E+03 | −6.929E+01 | 1.262E+02 |
| H | −7.167E−01 | 9.268E+01 | 2.888E+01 | −5.421E+03 | 1.650E+04 | 4.013E+03 | 1.578E+02 | −1.659E+02 |
| J | 1.037E+00 | −6.650E+01 | −3.534E+01 | 6.989E+03 | −2.255E+04 | −5.001E+03 | −2.336E+02 | 1.567E+02 |
| L | −7.470E−01 | 3.402E+01 | 3.131E+01 | −6.430E+03 | 2.205E+04 | 4.478E+03 | 2.324E+02 | −1.056E+02 |
| M | 3.273E−01 | −1.210E+01 | −1.926E+01 | 4.112E+03 | −1.501E+04 | −2.807E+03 | −1.547E+02 | 4.965E+01 |
| N | −8.820E−02 | 2.839E+00 | 7.723E+00 | −1.735E+03 | 6.757E+03 | 1.168E+03 | 6.622E+01 | −1.546E+01 |
| O | 1.349E−02 | −3.953E−01 | −1.808E+00 | 4.337E+02 | −1.806E+03 | −2.902E+02 | −1.648E+01 | 2.871E+00 |
| P | −8.990E−04 | 2.472E−02 | 1.868E−01 | −4.864E+01 | 2.169E+02 | 3.251E+01 | 1.814E+00 | −2.405E−01 |

| | S9 | S10 | S11 | S12 | S13 | S14 | S15 | S16 |
|---|---|---|---|---|---|---|---|---|
| K | 5.790 | 5.479 | −9.239 | −1.981 | 5.290 | −11.901 | 2.810 | −6.783 |
| A | 6.299E−02 | 3.891E−02 | −9.045E−02 | −1.412E−01 | 5.189E−02 | 7.430E−02 | −2.295E−01 | −1.147E−01 |
| B | 1.857E−02 | 1.167E−01 | 8.254E−02 | 3.577E−02 | −1.431E−01 | −4.380E−02 | 1.348E−01 | 6.800E−02 |
| C | −9.672E−01 | −1.344E+00 | −2.513E−01 | −7.491E−02 | 6.152E−02 | −4.218E−02 | −5.658E−02 | −2.722E−02 |
| D | 3.432E+00 | 4.157E+00 | 5.016E−01 | 3.981E−01 | 1.525E−01 | 1.318E−01 | 1.495E−02 | 6.452E−03 |
| E | −6.980E+00 | −7.726E+00 | −5.032E−01 | −8.279E−01 | −3.035E−01 | −1.508E−01 | −1.011E−03 | −4.862E−04 |
| F | 9.715E+00 | 9.703E+00 | −3.877E−02 | 9.454E−01 | 2.764E−01 | 1.033E−01 | −7.344E−04 | −2.177E−04 |
| G | −9.780E+00 | −8.441E+00 | 7.425E−01 | −6.789E−01 | −1.563E−01 | −4.717E−02 | 2.922E−04 | 8.827E−05 |
| H | 7.399E+00 | 5.094E+00 | −9.686E−01 | 3.263E−01 | 5.960E−02 | 1.496E−02 | −5.659E−05 | −1.682E−05 |
| J | −4.387E+00 | −2.105E+00 | 6.825E−01 | −1.080E−01 | −1.577E−02 | −3.336E−03 | 6.890E−06 | 2.008E−06 |
| L | 2.090E+00 | 5.731E−01 | −3.032E−01 | 2.478E−02 | 2.908E−03 | 5.213E−04 | −5.598E−07 | −1.595E−07 |
| M | −7.785E−01 | −9.378E−02 | 8.751E−02 | −3.877E−03 | −3.670E−04 | −5.579E−05 | 3.047E−08 | 8.436E−09 |
| N | 2.071E−01 | 6.830E−03 | −1.597E−02 | 3.955E−04 | 3.025E−05 | 3.892E−06 | −1.071E−09 | −2.862E−10 |
| O | −3.374E−02 | 2.113E−04 | 1.679E−03 | −2.373E−05 | −1.468E−06 | −1.593E−07 | 2.203E−11 | 5.638E−12 |
| P | 2.467E−03 | −4.871E−05 | −7.754E−05 | 6.361E−07 | 3.179E−08 | 2.897E−09 | −2.017E−13 | −4.905E−14 |

Figure 2:
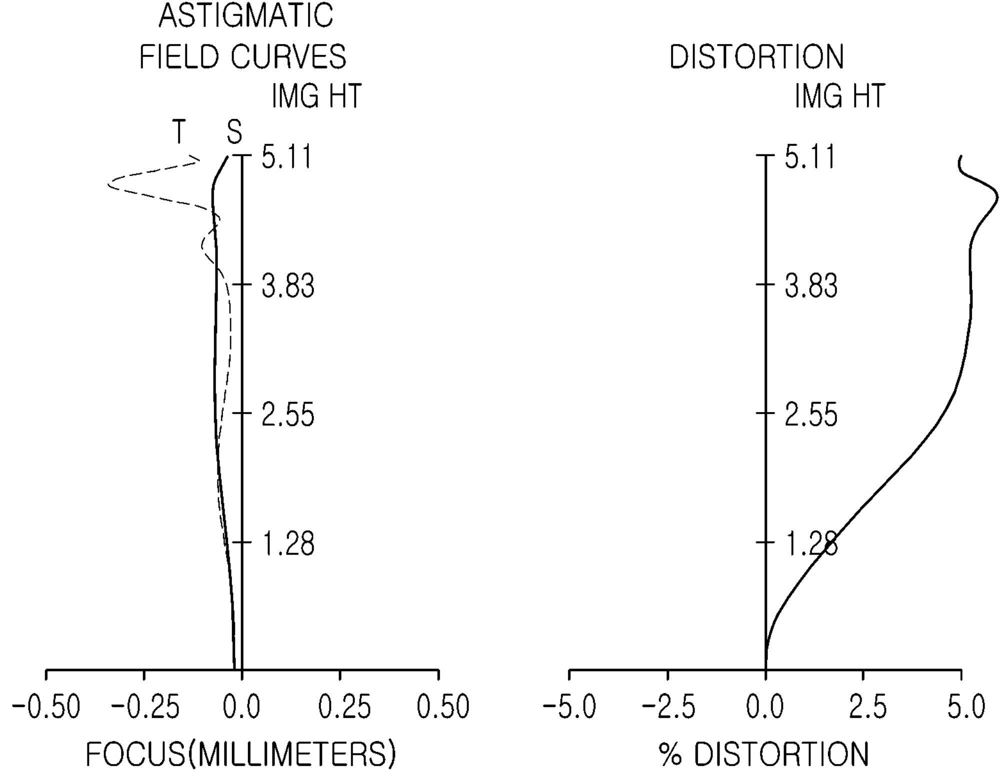
FIG. 2 is a view illustrating aberration characteristics of the example optical imaging system illustrated in FIG. 1.

In addition, the example optical imaging system configured as described above may have aberration characteristics illustrated in FIG. 2.

Figure 3:
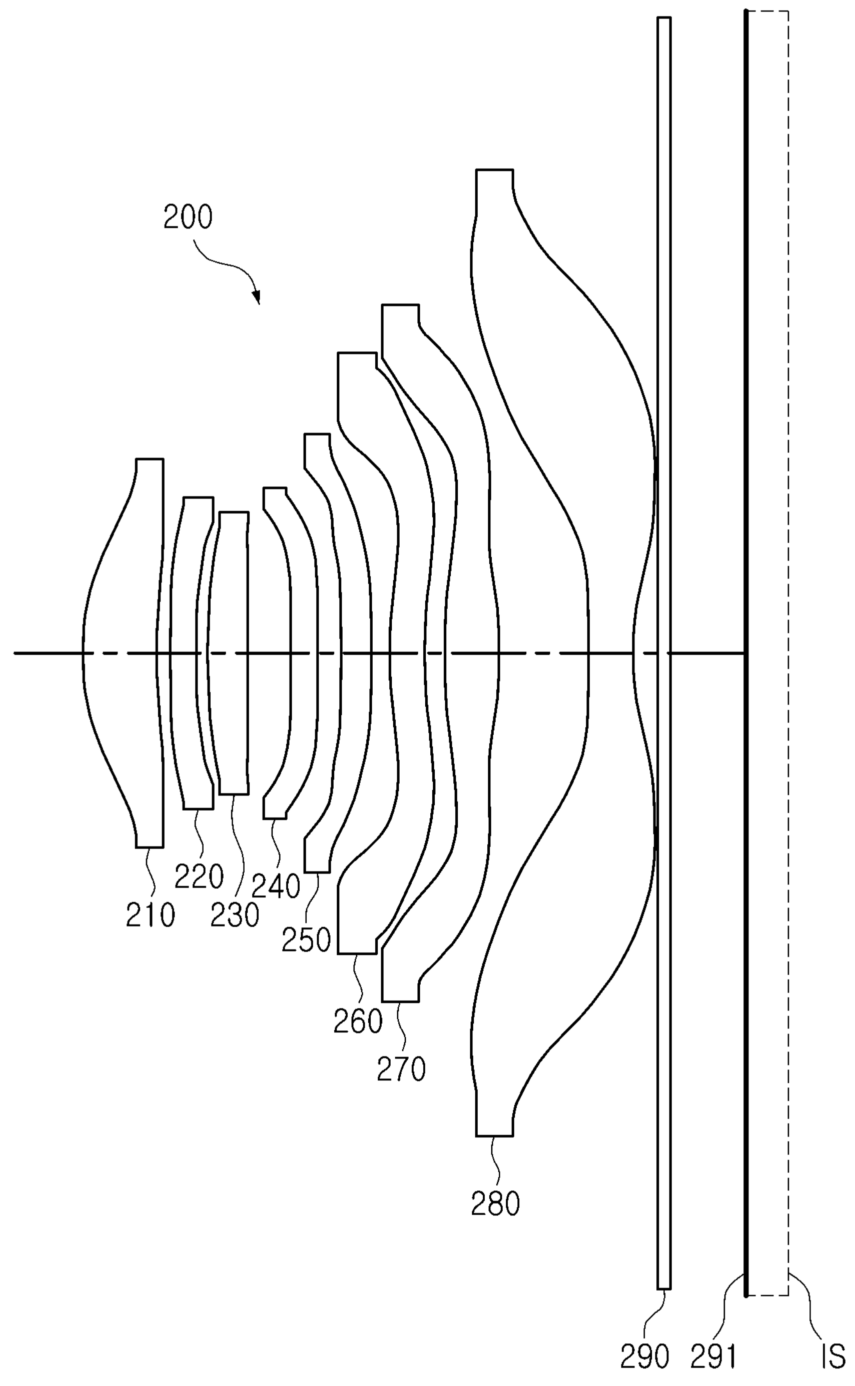
FIG. 3 is a view illustrating an optical imaging system in accordance with a second example.

An optical imaging system according to a second example is described with reference to FIGS. 3 and 4.

The optical imaging system according to the second example may include a first lens 210, a second lens 220, a third lens 230, a fourth lens 240, a fifth lens 250, a sixth lens 260, a seventh lens 270 and an eighth lens 280, and may further include a filter 290 and the image sensor IS including an imaging plane 291.

The optical imaging system according to the second example may focus an image on the imaging plane 291. The imaging plane 291 may indicate the surface on which the focal point is formed by the optical imaging system. In an example, the imaging plane 291 may indicate one surface of the image sensor IS, on which light is received.

Tables 4 and 5 illustrate characteristics of each lens (e.g., radius of curvature, thickness of the lens or distance between the lenses, refractive index, Abbe number or focal length).

TABLE 4

| Surface No. | Item | Radius of curvature | Thickness or distance | Refractive index | Abbe No. | Focal length |
|---|---|---|---|---|---|---|
| S1 | First lens | 2.012 | 0.621 | 1.497 | 81.6 | 5.78 |
| S2 | First lens | 5.992 | 0.100 | | | |
| S3 | Second lens | 7.872 | 0.220 | 1.680 | 18.2 | −18.74 |
| S4 | Second lens | 4.835 | 0.100 | | | |
| S5 | Third lens | 5.640 | 0.322 | 1.535 | 55.7 | 13.18 |
| S6 | Third lens | 27.224 | 0.366 | | | |
| S7 | Fourth lens | 278.650 | 0.221 | 1.650 | 21.5 | −1778.84 |
| S8 | Fourth lens | 224.959 | 0.198 | | | |
| S9 | Fifth lens | −6.097 | 0.241 | 1.535 | 55.7 | −82.38 |
| S10 | Fifth lens | −7.169 | 0.156 | | | |
| S11 | Sixth lens | 3.682 | 0.281 | 1.614 | 25.9 | −16.87 |
| S12 | Sixth lens | 2.644 | 0.172 | | | |
| S13 | Seventh lens | 6.455 | 0.449 | 1.544 | 56.0 | 3.95 |
| S14 | Seventh lens | −3.163 | 0.744 | | | |
| S15 | Eighth lens | 21.100 | 0.360 | 1.535 | 55.7 | −3.15 |
| S16 | Eight lens | 1.558 | 0.200 | | | |
| S17 | Filter | Infinity | 0.110 | 1.517 | 64.2 | |
| S18 | | Infinity | 0.639 | | | |
| S19 | Imaging plane | Infinity | | | | |

TABLE 5

| | | | |
|---|---|---|---|
| f | 4.55 | Y52 | 1.4706 |
| IMG HT | 5.107 | Y62 | 0.579 |
| FOV | 93.4 | Y72 | 0.5613 |
| SAG52 | −0.3365 | Y82 | 0.575 |
| SAG62 | −0.3836 | Z52 | −0.25417 |
| SAG72 | −0.6704 | Z62 | 0.04843 |
| SAG82 | −0.9901 | Z72 | −0.03936 |
| | | Z82 | 0.08088 |

In the second example, the first lens 210 may have positive refractive power, with a convex first surface and a concave second surface.

The second lens 220 may have negative refractive power, with a convex first surface and a concave second surface.

The third lens 230 may have positive refractive power, with a convex first surface and a concave second surface.

The fourth lens 240 may have negative refractive power, with a convex first surface and a concave second surface.

The fifth lens 250 may have negative refractive power, while the first surface may be concave in the paraxial region and the second surface may be convex in the paraxial region.

In addition, at least one inflection point may be formed on at least one of the first and second surfaces of the fifth lens 250. In an example, the fifth lens 250 may have a first surface that is concave in the paraxial region and convex in regions other than the paraxial region. In addition, the fifth lens 250 may have a second surface that is convex in the paraxial region and may be concave in regions other than the paraxial region.

The sixth lens 260 may have negative refractive power, while the first surface of the sixth lens may be concave in the paraxial region.

In addition, at least one inflection point may be formed on at least one of the first and second surfaces of the sixth lens 260. In an example, the first surface of the sixth lens 260 may be convex in the paraxial region and concave in regions other than the paraxial region. In addition, the sixth lens 260 may have a second surface that is concave in the paraxial region and convex in regions other than the paraxial region.

The seventh lens 270 may have positive refractive power, and the first and second surfaces of the seventh lens may be convex in the paraxial region.

In addition, at least one inflection point may be formed on at least one of the first and second surfaces of the seventh lens 270. In an example, the seventh lens 270 may have a first surface that is convex in the paraxial region and concave in regions other than the paraxial region. In addition, the seventh lens 270 may have a second surface that is convex in the paraxial region and may be concave in regions other than the paraxial region.

The eighth lens 280 may have negative refractive power, while the first surface of the eighth lens may be concave in the paraxial region.

In addition, at least one inflection point may be formed on at least one of the first and second surfaces of the eighth lens 280. In an example, the eighth lens 280 may have a first surface that is convex in the paraxial region and concave in regions other than the paraxial region. In addition, the eighth lens 280 may have a second surface that is concave in the paraxial region and convex in regions other than the paraxial region.

The first lens 210 may be formed of glass, and the second lens 220 to the eighth lens 280 may be formed of plastic. In addition, the second lens 220 to the eighth lens 280 may each be formed of plastic having optical characteristics different from optical characteristics of an adjacent lens.

In an example, the first lens 210 may be formed of glass having a high dispersion value, and the second lens 220 and the fourth lens 240 may each be formed of plastic having a high refractive index and a low dispersion value.

In an example, each surface of the first lens 210 to the eighth lens 280 may have an aspherical coefficient as illustrated in Table 6. In an example, the object-side surfaces and image-side surfaces of the first to eighth lenses 210 to 280 may be all the aspherical surfaces.

TABLE 6

| | S1 | S2 | S3 | S4 | S5 | S6 | S7 | S8 |
|---|---|---|---|---|---|---|---|---|
| K | −2.629 | −43.491 | 29.427 | 12.399 | 1.153 | −94.676 | 99.000 | −99.000 |
| A | 2.464E−02 | −5.015E−02 | −5.929E−03 | 3.807E−02 | −7.446E−02 | −8.065E−02 | −7.636E−02 | −4.731E−02 |
| B | 5.369E−02 | 7.345E−01 | −1.349E−01 | −1.074E+00 | 1.271E+00 | 1.078E+00 | 1.722E−01 | 1.660E−01 |
| C | −3.155E−01 | −5.776E+00 | 9.394E−01 | 1.177E+01 | −1.553E+01 | −1.050E+01 | −1.958E+00 | −1.813E+00 |
| D | 1.008E+00 | 2.733E+01 | −3.919E+00 | −8.127E+01 | 1.184E+02 | 6.489E+01 | 1.068E+01 | 9.063E+00 |
| E | −2.130E+00 | −8.554E+01 | 1.103E+01 | 3.756E+02 | −6.019E+02 | −2.704E+02 | −3.698E+01 | −2.997E+01 |
| F | 3.041E+00 | 1.853E+02 | −2.121E+01 | −1.203E+03 | 2.123E+03 | 7.866E+02 | 8.546E+01 | 7.044E+01 |
| G | −2.969E+00 | −2.855E+02 | 2.735E+01 | 2.729E+03 | −5.331E+03 | −1.630E+03 | −1.344E+02 | −1.210E+02 |
| H | 1.963E+00 | 3.171E+02 | −2.208E+01 | −4.425E+03 | 9.651E+03 | 2.426E+03 | 1.417E+02 | 1.530E+02 |
| J | −8.412E−01 | −2.544E+02 | 8.310E+00 | 5.128E+03 | −1.262E+04 | −2.592E+03 | −9.269E+01 | −1.417E+02 |
| L | 2.025E−01 | 1.461E+02 | 2.702E+00 | −4.192E+03 | 1.182E+04 | 1.958E+03 | 2.660E+01 | 9.471E+01 |
| M | −9.370E−03 | −5.850E+01 | −5.118E+00 | 2.346E+03 | −7.714E+03 | −1.015E+03 | 9.617E+00 | −4.434E+01 |
| N | −8.925E−03 | 1.551E+01 | 2.766E+00 | −8.477E+02 | 3.335E+03 | 3.396E+02 | −1.203E+01 | 1.376E+01 |
| O | 2.378E−03 | −2.447E+00 | −7.231E−01 | 1.760E+02 | −8.583E+02 | −6.514E+01 | 4.417E+00 | −2.542E+00 |
| P | −1.984E−04 | 1.737E−01 | 7.723E−02 | −1.561E+01 | 9.950E+01 | 5.300E+00 | −6.055E−01 | 2.112E−01 |

| | S9 | S10 | S11 | S12 | S13 | S14 | S15 | S16 |
|---|---|---|---|---|---|---|---|---|
| K | 1.304 | 5.433 | −7.166 | −2.249 | 5.216 | −22.773 | 3.048 | −6.957 |
| A | 5.089E−02 | 5.574E−03 | −1.436E−01 | −1.877E−01 | 2.604E−02 | 3.807E−02 | −2.201E−01 | −1.031E−01 |
| B | 1.658E−01 | 3.866E−01 | 4.662E−01 | 3.409E−01 | −1.375E−02 | 1.386E−02 | 1.210E−01 | 5.114E−02 |
| C | −1.636E+00 | −2.164E+00 | −1.264E+00 | −7.316E−01 | −1.426E−01 | −3.231E−02 | −4.615E−02 | −1.495E−02 |
| D | 5.299E+00 | 5.345E+00 | 2.119E+00 | 1.143E+00 | 3.340E−01 | 3.466E−02 | 1.126E−02 | 9.410E−04 |
| E | −1.028E+01 | −8.108E+00 | −2.299E+00 | −1.254E+00 | −4.083E−01 | −3.016E−02 | −9.668E−04 | 1.113E−03 |
| F | 1.348E+01 | 8.134E+00 | 1.548E+00 | 9.660E−01 | 3.185E−01 | 1.945E−02 | −2.872E−04 | −5.141E−04 |
| G | −1.245E+01 | −5.373E+00 | −5.097E−01 | −5.261E−01 | −1.690E−01 | −8.943E−03 | 1.103E−04 | 1.199E−04 |
| H | 8.180E+00 | 2.154E+00 | −9.470E−02 | 2.040E−01 | 6.274E−02 | 2.903E−03 | −1.775E−05 | −1.778E−05 |
| J | −3.798E+00 | −3.331E−01 | 1.951E−01 | −5.648E−02 | −1.647E−02 | −6.619E−04 | 1.641E−06 | 1.778E−06 |
| L | 1.212E+00 | −1.391E−01 | −1.042E−01 | 1.107E−02 | 3.043E−03 | 1.048E−04 | −8.760E−08 | −1.216E−07 |

TABLE 6-continued

| | | | | | | | | |
|---|---|---|---|---|---|---|---|---|
| M | −2.485E−01 | 9.818E−02 | 3.133E−02 | −1.503E−03 | −3.875E−04 | −1.123E−05 | 2.118E−09 | 5.602E−09 |
| N | 2.749E−02 | −2.666E−02 | −5.671E−03 | 1.343E−04 | 3.238E−05 | 7.765E−07 | 2.447E−11 | −1.659E−10 |
| O | −6.171E−04 | 3.646E−03 | 5.776E−04 | −7.116E−06 | −1.599E−06 | −3.116E−08 | −2.667E−12 | 2.840E−12 |
| P | −1.195E−04 | −2.067E−04 | −2.550E−05 | 1.694E−07 | 3.536E−08 | 5.503E−10 | 4.557E−14 | −2.118E−14 |

Figure 4:
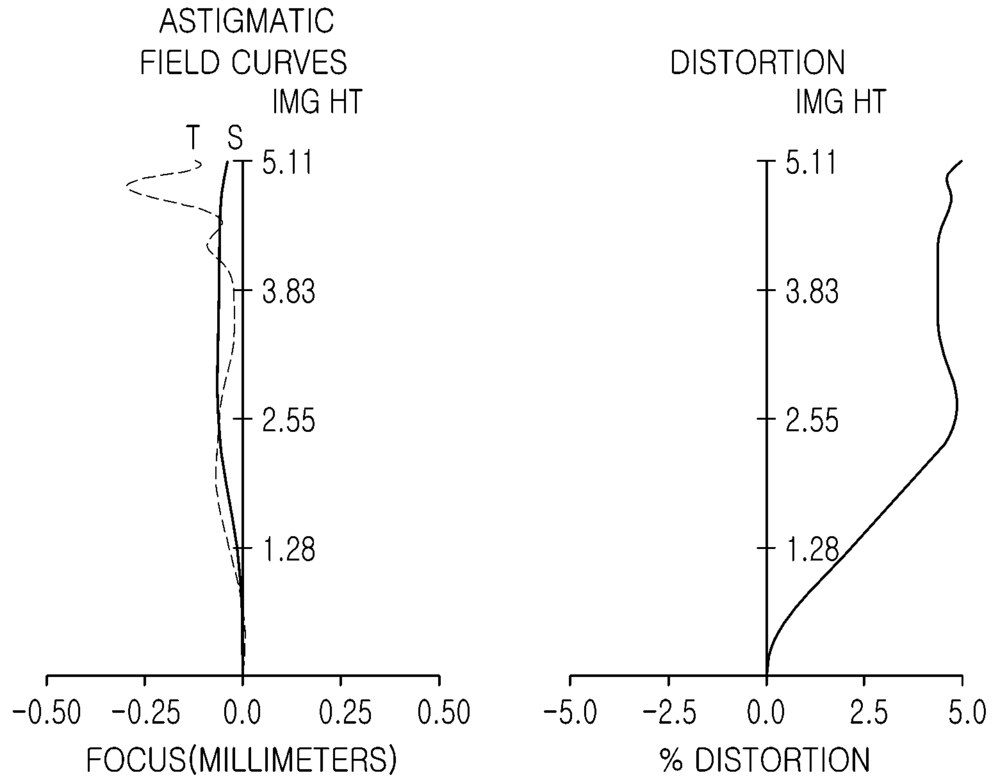
FIG. 4 is a view illustrating aberration characteristics of the example optical imaging system illustrated in FIG. 3.

In addition, the optical imaging system configured as described above may have aberration characteristics illustrated in FIG. 4.

Figure 5:
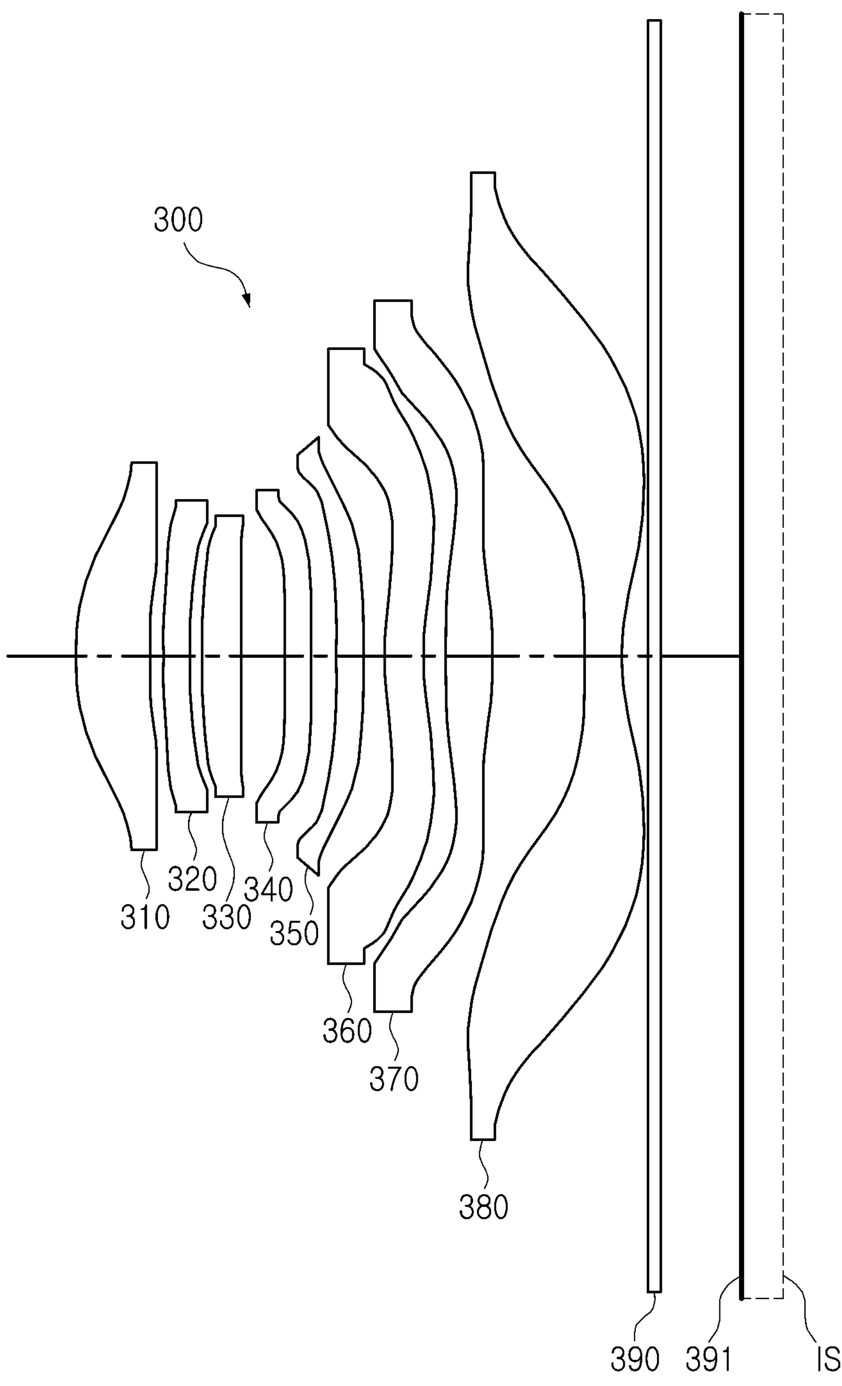
FIG. 5 is a view illustrating an optical imaging system in accordance with a third example.

An optical imaging system according to a third example is described with reference to FIGS. 5 and 6.

The optical imaging system according to the third example may include a first lens 310, a second lens 320, a third lens 330, a fourth lens 340, a fifth lens 350, a sixth lens 360, a seventh lens 370 and an eighth lens 380, and may further include a filter 390 and the image sensor IS, which includes an imaging surface 391.

The optical imaging system according to the third example may focus an image on the imaging plane 391. The imaging plane 391 may indicate the surface on which the focal point is formed by the optical imaging system. In an example, the imaging plane 391 may indicate one surface of the image sensor IS, on which light is received.

Tables 7 and 8 illustrate characteristics of each lens (e.g., radius of curvature, thickness of the lens or distance between the lenses, refractive index, Abbe number or focal length).

TABLE 7

| Surface No. | Item | Radius of curvature | Thickness or distance | Refractive index | Abbe No. | Focal length |
|---|---|---|---|---|---|---|
| S1 | First lens | 2.016 | 0.619 | 1.497 | 81.6 | 5.78 |
| S2 | First lens | 6.033 | 0.104 | | | |
| S3 | Second lens | 8.076 | 0.220 | 1.680 | 18.2 | −18.71 |
| S4 | Second lens | 4.911 | 0.100 | | | |
| S5 | Third lens | 5.718 | 0.320 | 1.535 | 55.7 | 13.61 |
| S6 | Third lens | 25.735 | 0.363 | | | |
| S7 | Fourth lens | −456.166 | 0.220 | 1.680 | 18.2 | 60043.84 |
| S8 | Fourth lens | −451.281 | 0.218 | | | |
| S9 | Fifth lens | −5.926 | 0.223 | 1.535 | 55.7 | −112.4 |
| S10 | Fifth lens | −6.658 | 0.172 | | | |
| S11 | Sixth lens | 3.794 | 0.313 | 1.614 | 25.9 | −16.59 |
| S12 | Sixth lens | 2.684 | 0.186 | | | |
| S13 | Seventh lens | 6.475 | 0.393 | 1.544 | 56.0 | 3.89 |
| S14 | Seventh lens | −3.098 | 0.762 | | | |
| S15 | Eighth lens | 21.089 | 0.300 | 1.535 | 55.7 | −3.14 |
| S16 | Eighth lens | 1.553 | 0.200 | | | |
| S17 | Filter | Infinity | 0.110 | 1.517 | 64.2 | |
| S18 | | Infinity | 0.678 | | | |
| S19 | Imaging plane | Infinity | | | | |

TABLE 8

| | | | |
|---|---|---|---|
| f | 4.56 | Y52 | 1.4602 |
| IMG HT | 5.107 | Y62 | 0.5796 |
| FOV | 93 | Y72 | 0.5338 |
| SAG52 | −0.3707 | Y82 | 0.5556 |
| SAG62 | −0.5004 | Z52 | −0.27167 |
| SAG72 | −0.6747 | Z62 | 0.04642 |
| SAG82 | −1.0326 | Z72 | −0.03621 |
| | | Z82 | 0.07649 |

In the third example, the first lens 310 may have positive refractive power, with a convex first surface and a concave second surface.

The second lens 320 may have negative refractive power, with a convex first surface and a concave second surface.

The third lens 330 may have positive refractive power, with a convex first surface and a concave second surface.

The fourth lens 340 may have positive refractive power, and the concave first surface and the convex second surface.

The fifth lens 350 may have negative refractive power, while the first surface of the fifth lens may be concave in the paraxial region and the second surface of the fifth lens may be convex in the paraxial region.

In addition, at least one inflection point may be formed on at least one of the first and second surfaces of the fifth lens 350. In an example, the fifth lens 350 may have a first surface that is concave in the paraxial region and convex in regions other than the paraxial region. In addition, the fifth lens 350 may have a second surface that is convex in the paraxial region and may be concave in regions other than the paraxial region.

The sixth lens 360 may have negative refractive power, while the first surface of the sixth lens may be concave in the paraxial region.

In addition, at least one inflection point may be formed on at least one of the first and second surfaces of the sixth lens 360. In an example, the first surface of the sixth lens 360 may be convex in the paraxial region and concave in regions other than the paraxial region. In addition, the sixth lens 360 may have a second surface concave in the paraxial region and convex in regions other than the paraxial region.

The seventh lens 370 may have positive refractive power, and the first and second surfaces of the seventh lens may be convex in the paraxial region.

In addition, at least one inflection point may be formed on at least one of the first and second surfaces of the seventh lens 370. In an example, the seventh lens 370 may have a first surface convex in the paraxial region and concave in regions other than the paraxial region. In addition, the seventh lens 370 may have a second surface that is convex in the paraxial region and may be concave in regions other than the paraxial region.

The eighth lens 380 may have negative refractive power, while the first surface of the eighth lens may be concave in the paraxial region.

In addition, at least one inflection point may be formed on at least one of the first and second surfaces of the eighth lens 380. In an example, the eighth lens 380 may have a first surface that is convex in the paraxial region and concave in regions other than the paraxial region. In addition, the eighth lens 380 may have a second surface that is concave in the paraxial region and convex in regions other than the paraxial region.

The first lens 310 may be formed of glass, and the second lens 320 to the eighth lens 380 may be formed of plastic. In addition, the second lens 320 to the eighth lens 380 may each be formed of plastic having optical characteristics different from those of an adjacent lens.

In an example, the first lens 310 may be formed of glass having a high dispersion value, and the second lens 320 and the fourth lens 340 may each be formed of plastic having a high refractive index and a low dispersion value.

In an example, each surface of the first lens 310 to the eighth lens 380 may have an aspherical coefficient as illustrated in Table 9. In an example, the object-side surfaces and image-side surfaces of the first to eighth lenses 310 to 380 may be all the aspherical surfaces.

TABLE 9

| | S1 | S2 | S3 | S4 | S5 | S6 | S7 | S8 |
|---|---|---|---|---|---|---|---|---|
| K | −2.657 | −43.550 | 29.663 | 12.324 | 0.863 | 34.450 | −99.000 | 99.000 |
| A | 2.363E−02 | −2.736E−02 | −2.729E−03 | 5.183E−02 | −4.493E−02 | −5.901E−02 | −7.855E−02 | −4.184E−02 |
| B | 5.984E−02 | 3.526E−01 | −1.862E−01 | −1.431E+00 | 6.573E−01 | 6.649E−01 | 1.443E−01 | −1.638E−02 |
| C | −3.640E−01 | −2.645E+00 | 1.347E+00 | 1.625E+01 | −8.115E+00 | −5.986E+00 | −1.322E+00 | 1.911E−02 |
| D | 1.269E+00 | 1.180E+01 | −5.927E+00 | −1.152E+02 | 5.938E+01 | 3.404E+01 | 5.511E+00 | −1.392E+00 |
| E | −3.040E+00 | −3.489E+01 | 1.804E+01 | 5.453E+02 | −2.815E+02 | −1.316E+02 | −1.209E+01 | 8.794E+00 |
| F | 5.126E+00 | 7.135E+01 | −3.940E+01 | −1.793E+03 | 9.121E+02 | 3.583E+02 | 5.393E+00 | −2.858E+01 |
| G | −6.200E+00 | −1.035E+02 | 6.258E+01 | 4.189E+03 | −2.079E+03 | −6.988E+02 | 4.675E+01 | 5.875E+01 |
| H | 5.430E+00 | 1.078E+02 | −7.241E+01 | −7.040E+03 | 3.383E+03 | 9.800E+02 | −1.530E+02 | −8.222E+01 |
| J | −3.446E+00 | −8.084E+01 | 6.050E+01 | 8.520E+03 | −3.937E+03 | −9.792E+02 | 2.537E+02 | 8.067E+01 |
| L | 1.569E+00 | 4.317E+01 | −3.579E+01 | −7.346E+03 | 3.240E+03 | 6.797E+02 | −2.647E+02 | −5.571E+01 |
| M | −5.000E−01 | −1.599E+01 | 1.446E+01 | 4.395E+03 | −1.834E+03 | −3.114E+02 | 1.805E+02 | 2.659E+01 |
| N | 1.059E−01 | 3.900E+00 | −3.741E+00 | −1.731E+03 | 6.760E+02 | 8.477E+01 | −7.832E+01 | −8.366E+00 |
| O | −1.341E−02 | −5.622E−01 | 5.460E−01 | 4.027E+02 | −1.452E+02 | −1.050E+01 | 1.970E+01 | 1.562E+00 |
| P | 7.694E−04 | 3.625E−02 | −3.272E−02 | −4.187E+01 | 1.366E+01 | 5.153E−02 | −2.190E+00 | −1.311E−01 |

| | S9 | S10 | S11 | S12 | S13 | S14 | S15 | S16 |
|---|---|---|---|---|---|---|---|---|
| K | 1.940 | 6.172 | −7.556 | −2.184 | 5.190 | −24.903 | 2.496 | −7.095 |
| A | 5.412E−02 | 1.392E−02 | −1.496E−01 | −2.129E−01 | 1.658E−02 | 3.948E−02 | −2.154E−01 | −1.031E−01 |
| B | 1.349E−01 | 2.385E−01 | 4.470E−01 | 3.961E−01 | 3.473E−03 | 4.330E−02 | 1.047E−01 | 4.167E−02 |
| C | 1.465E+00 | −1.330E+00 | −1.088E+00 | −7.504E−01 | −1.345E−01 | −1.188E−01 | −2.418E−02 | −2.734E−03 |
| D | 4.864E+00 | 2.695E+00 | 1.689E+00 | 1.038E+00 | 2.520E−01 | 1.507E−01 | −4.572E−03 | −6.907E−03 |
| E | −9.980E+00 | −2.676E+00 | −1.774E+00 | −1.040E+00 | −2.609E−01 | −1.245E−01 | 6.136E−03 | 4.281E−03 |
| F | 1.454E+01 | 4.545E−01 | 1.228E+00 | 7.512E−01 | 1.750E−01 | 7.091E−02 | −2.431E−03 | −1.392E−03 |
| G | −1.579E+01 | 2.389E+00 | −4.836E−01 | −3.894E−01 | −8.004E−02 | −2.871E−02 | 5.635E−04 | 2.934E−04 |
| H | 1.299E+01 | −3.551E+00 | 1.836E−02 | 1.448E−01 | 2.542E−02 | 8.386E−03 | −8.634E−05 | −4.258E−05 |
| J | −8.097E+00 | 2.721E+00 | 9.872E−02 | −3.856E−02 | −5.614E−03 | −1.768E−03 | 9.116E−06 | 4.346E−06 |
| L | 3.756E+00 | −1.316E+00 | −6.229E−02 | 7.275E−03 | 8.503E−04 | 2.656E−04 | −6.697E−07 | −3.117E−07 |
| M | −1.251E+00 | 4.158E−01 | 2.027E−02 | −9.490E−04 | −8.529E−05 | −2.769E−05 | 3.373E−08 | 1.540E−08 |
| N | 2.813E−01 | −8.355E−02 | −3.882E−03 | 8.138E−05 | 5.279E−06 | 1.899E−06 | −1.113E−09 | −4.993E−10 |
| O | −3.799E−02 | 9.710E−03 | 4.142E−04 | −4.128E−06 | −1.733E−07 | −7.699E−08 | 2.171E−11 | 9.565E−12 |
| P | 2.316E−03 | −4.976E−04 | −1.905E−05 | 9.383E−08 | 2.000E−09 | 1.396E−09 | −1.899E−13 | −8.207E−14 |

Figure 6:
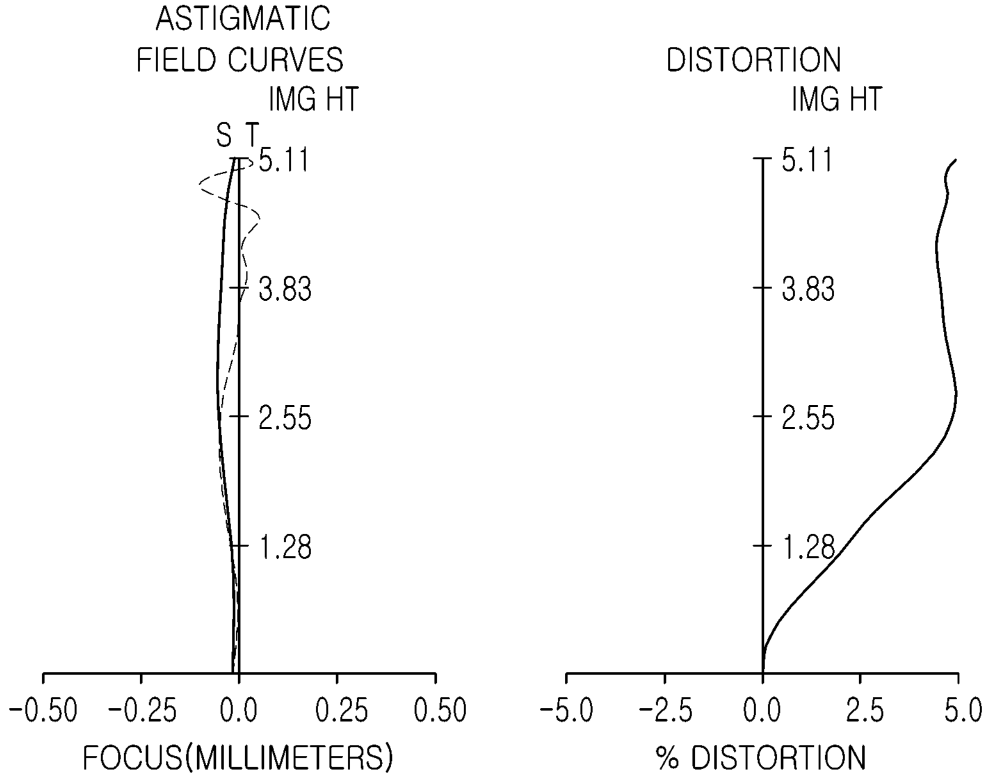
FIG. 6 is a view illustrating aberration characteristics of the example optical imaging system illustrated in FIG. 5.

In addition, the optical imaging system configured as described above may have aberration characteristics illustrated in FIG. 6.

Figure 7:
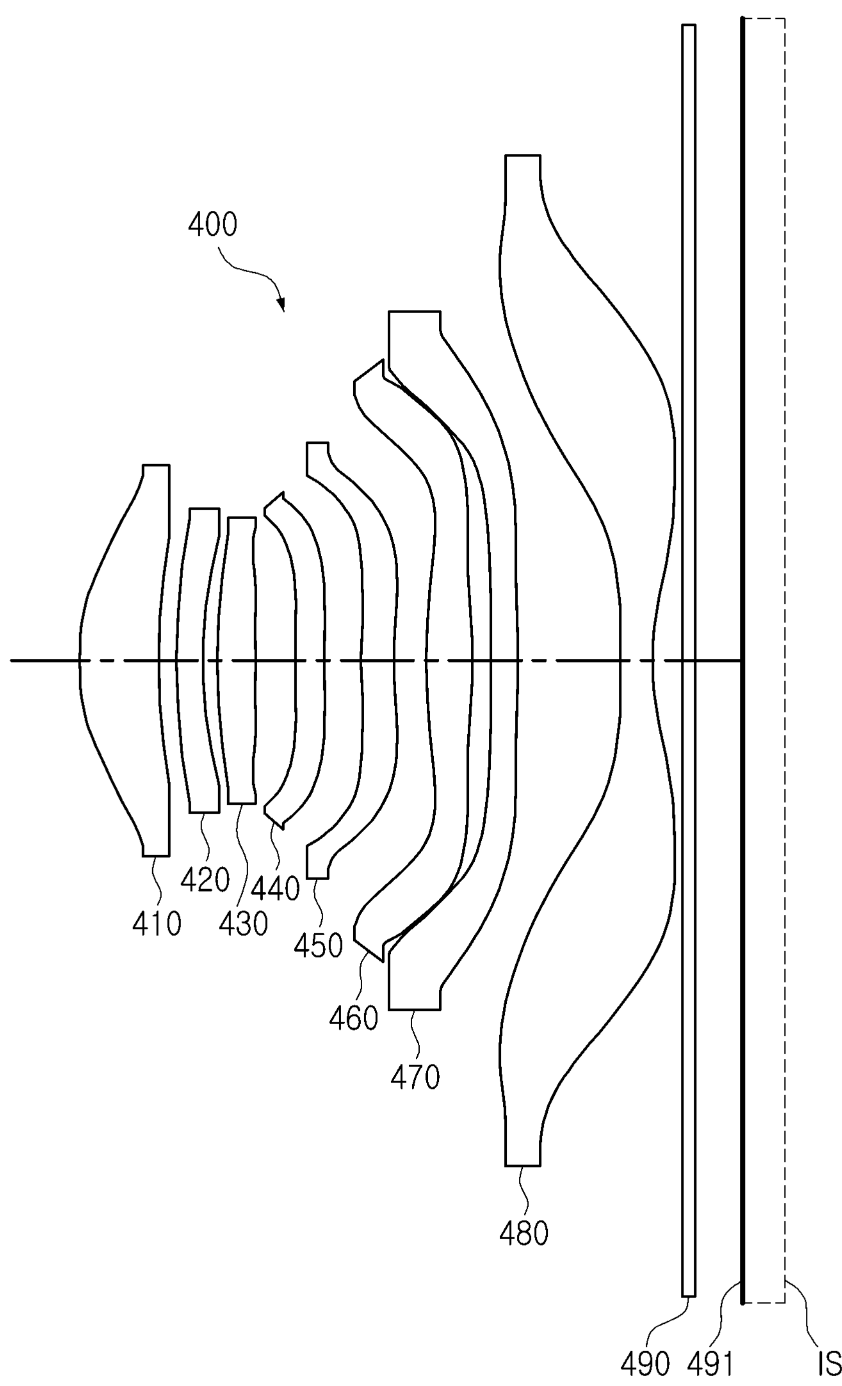
FIG. 7 is a view illustrating an optical imaging system in accordance with a fourth example.

An optical imaging system according to a fourth example is described with reference to FIGS. 7 and 8.

The optical imaging system according to the fourth example may include a first lens 410, a second lens 420, a third lens 430, a fourth lens 440, a fifth lens 450, a sixth lens 460, a seventh lens 470 and an eighth lens 480, and may further include a filter 490 and the image sensor IS, which includes an imaging surface 491.

The optical imaging system according to the fourth example may focus an image on the imaging plane 491. The imaging plane 491 may indicate the surface on which the focal point is formed by the optical imaging system. In an example, the imaging plane 491 may indicate one surface of the image sensor IS, on which light is received.

Tables 10 and 11 illustrate characteristics of each lens (e.g., radius of curvature, thickness of the lens or distance between the lenses, refractive index, Abbe number or focal length).

TABLE 10

| Surface no. | Item | Radius of curvature | Thickness or distance | Refractive index | Abbe No. | Focal length |
|---|---|---|---|---|---|---|
| S1 | First lens | 1.962 | 0.677 | 1.497 | 81.6 | 5.63 |
| S2 | First lens | 5.762 | 0.127 | | | |
| S3 | Second lens | 7.490 | 0.220 | 1.680 | 18.2 | −18.76 |
| S4 | Second lens | 4.686 | 0.119 | | | |
| S5 | Third lens | 6.535 | 0.305 | 1.535 | 55.7 | 14.59 |
| S6 | Third lens | 38.664 | 0.343 | | | |
| S7 | Fourth lens | −44.486 | 0.231 | 1.650 | 21.5 | −53.28 |
| S8 | Fourth lens | 165.058 | 0.309 | | | |
| S9 | Fifth lens | 5.738 | 0.272 | 1.567 | 37.4 | −27.57 |
| S10 | Fifth lens | 4.132 | 0.261 | | | |
| S11 | Sixth lens | 6.113 | 0.389 | 1.544 | 56.0 | 4.79 |
| S12 | Sixth lens | −4.468 | 0.150 | | | |
| S13 | Seventh lens | −5.843 | 0.224 | 1.635 | 24.0 | 298.74 |
| S14 | Seventh lens | −5.755 | 0.846 | | | |
| S15 | Eighth lens | 26.343 | 0.264 | 1.535 | 55.7 | −3.31 |
| S16 | Eighth lens | 1.659 | 0.250 | | | |
| S17 | Filter | Infinity | 0.110 | 1.517 | 64.2 | |
| S18 | | Infinity | 0.400 | | | |
| S19 | Imaging plane | Infinity | | | | |

TABLE 11

| | | | |
|---|---|---|---|
| f | 4.53 | Y52 | 0.3182 |
| IMG HT | 5.107 | Y62 | 0.4634 |
| FOV | 93.5 | Y72 | 0.469 |
| SAG52 | −0.5451 | Y82 | 0.5992 |
| SAG62 | −0.7441 | Z52 | 0.00989 |
| SAG72 | −0.6513 | Z62 | −0.02093 |
| SAG82 | −0.9297 | Z72 | −0.01557 |
| | | Z82 | 0.08053 |

In the fourth example, the first lens 410 may have positive refractive power, with a convex first surface and a concave second surface.

The second lens 420 may have negative refractive power, with a convex first surface and a concave second surface.

The third lens 430 may have positive refractive power, with a convex first surface and a concave second surface.

The fourth lens 440 may have negative refractive power, and concave first and second surfaces.

The fifth lens 450 may have negative refractive power, while the first surface of the fifth lens may be concave in the paraxial region.

In addition, at least one inflection point may be formed on at least one of the first and second surfaces of the fifth lens 450. In an example, the fifth lens 450 may have a first surface that is convex in the paraxial region and concave in regions other than the paraxial region. In addition, the fifth lens 450 may have a second surface that is concave in the paraxial region and convex in regions other than the paraxial region.

The sixth lens 460 may have positive refractive power, and the first and second surfaces may be convex in the paraxial region.

In addition, at least one inflection point may be formed on at least one of the first and second surfaces of the sixth lens 460. In an example, the first surface of the sixth lens 460 may be convex in the paraxial region and concave in regions other than the paraxial region. In addition, the sixth lens 460 may have a second surface that is convex in the paraxial region and may be concave in regions other than the paraxial region.

The seventh lens 470 may have positive refractive power, while the first surface of the seventh may be concave in the paraxial region and the second surface of the seventh lens may be convex in the paraxial region.

In addition, at least one inflection point may be formed on at least one of the first and second surfaces of the seventh lens 470. In an example, the seventh lens 470 may have a first surface that is concave in the paraxial region and convex in regions other than the paraxial region. In addition, the seventh lens 470 may have a second surface that is convex in the paraxial region and may be concave in regions other than the paraxial region.

The eighth lens 480 may have negative refractive power, while the first surface of the eighth lens may be concave in the paraxial region.

In addition, at least one inflection point may be formed on at least one of the first and second surfaces of the eighth lens 480. In an example, the eighth lens 480 may have a first surface that is convex in the paraxial region and concave in regions other than the paraxial region. In addition, the eighth lens 480 may have a second surface that is concave in the paraxial region and convex in regions other than the paraxial region.

The first lens 410 may be formed of glass, and the second lens 420 to the eighth lens 480 may be formed of plastic. In addition, the second lens 420 to the eighth lens 480 may each be formed of plastic having optical characteristics different from optical characteristics of an adjacent lens.

In an example, the first lens 410 may be formed of glass having a high dispersion value, and the second lens 420 and the fourth lens 440 may each be formed of plastic having a high refractive index and a low dispersion value.

In an example, each surface of the first lens 410 to the eighth lens 480 may have an aspherical coefficient as illustrated in Table 12. In an example, the object-side surfaces and image-side surfaces of the first to eighth lenses 410 to 480 may be all the aspherical surfaces.

TABLE 12

| | S1 | S2 | S3 | S4 | S5 | S6 | S7 | S8 |
|---|---|---|---|---|---|---|---|---|
| K | −1.979 | −25.768 | 20.340 | 12.286 | 6.670 | 0.000 | −74.250 | 99.000 |
| A | 3.189E−02 | −2.647E−02 | −4.590E−02 | 3.965E−02 | −1.879E−02 | −3.460E−02 | −7.770E−02 | −8.966E−02 |
| B | −5.293E−02 | 2.272E−01 | 2.409E−01 | −1.493E+00 | −1.467E−01 | 2.868E−01 | −1.271E−01 | −7.989E−02 |

TABLE 12-continued

| | | | | | | | | |
|---|---|---|---|---|---|---|---|---|
| C | 3.021E−01 | −1.453E+00 | −1.485E+00 | 1.891E+01 | 1.982E+00 | −3.440E+00 | 1.509E+00 | 1.169E+00 |
| D | −1.210E+00 | 5.860E+00 | 6.593E+00 | −1.513E+02 | −1.581E+01 | 2.674E+01 | −9.125E+00 | −6.097E+00 |
| E | 3.313E+00 | −1.610E+01 | −1.995E+01 | 8.224E+02 | 8.303E+01 | −1.393E+02 | 3.343E+01 | 1.924E+01 |
| F | −6.399E+00 | 3.120E+01 | 4.271E+01 | −3.133E+03 | −2.976E+02 | 4.995E+02 | −8.080E+01 | −4.123E+01 |
| G | 8.829E+00 | −4.351E+01 | −6.735E+01 | 8.529E+03 | 7.471E+02 | −1.257E+03 | 1.308E+02 | 6.233E+01 |
| H | −8.759E+00 | 4.411E+01 | 8.114E+01 | −1.675E+04 | −1.333E+03 | 2.252E+03 | −1.374E+02 | −6.730E+01 |
| J | 6.240E+00 | −3.247E+01 | −7.649E+01 | 2.375E+04 | 1.698E+03 | −2.882E+03 | 8.145E+01 | 5.177E+01 |
| L | −3.155E+00 | 1.715E+01 | 5.628E+01 | −2.405E+04 | −1.529E+03 | 2.614E+03 | −6.999E+00 | −2.785E+01 |
| M | 1.103E+00 | −6.315E+00 | −3.112E+01 | 1.694E+04 | 9.503E+02 | −1.640E+03 | −2.920E+01 | 1.006E+01 |
| N | −2.532E−01 | 1.537E+00 | 1.199E+01 | −7.886E+03 | −3.867E+02 | 6.773E+02 | 2.341E+01 | −2.253E+00 |
| O | 3.429E−02 | −2.220E−01 | −2.826E+00 | 2.179E+03 | 9.259E+01 | −1.654E+02 | −8.039E+00 | 2.635E−01 |
| P | −2.075E−03 | 1.437E−02 | 3.028E−01 | −2.705E+02 | −9.859E+00 | 1.812E+01 | 1.097E+00 | −9.655E−03 |

| | S9 | S10 | S11 | S12 | S13 | S14 | S15 | S16 |
|---|---|---|---|---|---|---|---|---|
| K | −34.964 | −2.742 | 5.475 | −10.384 | −0.097 | −14.269 | −7.792 | −5.825 |
| A | −2.066E−01 | −2.558E−01 | −2.416E−02 | 1.731E−02 | 4.373E−02 | 6.137E−02 | −2.345E−01 | −1.547E−01 |
| B | 3.435E−01 | 3.908E−01 | 1.424E−01 | 2.850E−01 | 1.785E−01 | 5.274E−02 | 2.065E−01 | 1.477E−01 |
| C | −1.096E+00 | −1.396E+00 | −4.622E−01 | −6.718E−01 | −5.371 E−01 | −2.244E−01 | −1.520E−01 | −1.029E−01 |
| D | 3.269E+00 | 4.017E+00 | 7.902E−01 | 8.805E−01 | 7.400E−01 | 3.044E−01 | 7.970E−02 | 5.003E−02 |
| E | −6.939E+00 | −8.153E+00 | −9.540E−01 | −7.909E−01 | −6.222E−01 | −2.388E−01 | −2.838E−02 | −1.717E−02 |
| F | 1.016E+01 | 1.180E+01 | 8.541E−01 | 5.176E−01 | 3.476E−01 | 1.214E−01 | 7.008E−03 | 4.208E−03 |
| G | −1.031E+01 | −1.234E+01 | −5.641 E−01 | −2.527E−01 | −1.349E−01 | −4.222E−02 | −1.230E−03 | −7.445E−04 |
| H | 7.150E+00 | 9.370E+00 | 2.714E−01 | 9.232E−02 | 3.714E−02 | 1.034E−02 | 1.559E−04 | 9.557E−05 |
| J | −3.218E+00 | −5.151E+00 | −9.403E−02 | −2.503E−02 | −7.236E−03 | −1.804E−03 | −1.433E−05 | −8.883E−06 |
| L | 7.887E−01 | 2.024E+00 | 2.313E−02 | 4.940E−03 | 9.734E−04 | 2.227E−04 | 9.463E−07 | 5.909E−07 |
| M | −6.554E−03 | −5.532E−01 | −3.930E−03 | −6.877E−04 | −8.502E−05 | −1.900E−05 | −4.383E−08 | −2.739E−08 |
| N | −5.732E−02 | 9.966E−02 | 4.379E−04 | 6.383E−05 | 4.169E−06 | 1.064E−06 | 1.352E−09 | 8.396E−10 |
| O | 1.556E−02 | −1.063E−02 | −2.877E−05 | −3.540E−06 | −6.671E−08 | −3.507E−08 | −2.495E−11 | −1.530E−11 |
| P | −1.412E−03 | 5.074E−04 | 8.438E−07 | 8.859E−08 | −1.628E−09 | 5.142E−10 | 2.086E−13 | 1.253E−13 |

Figure 8:
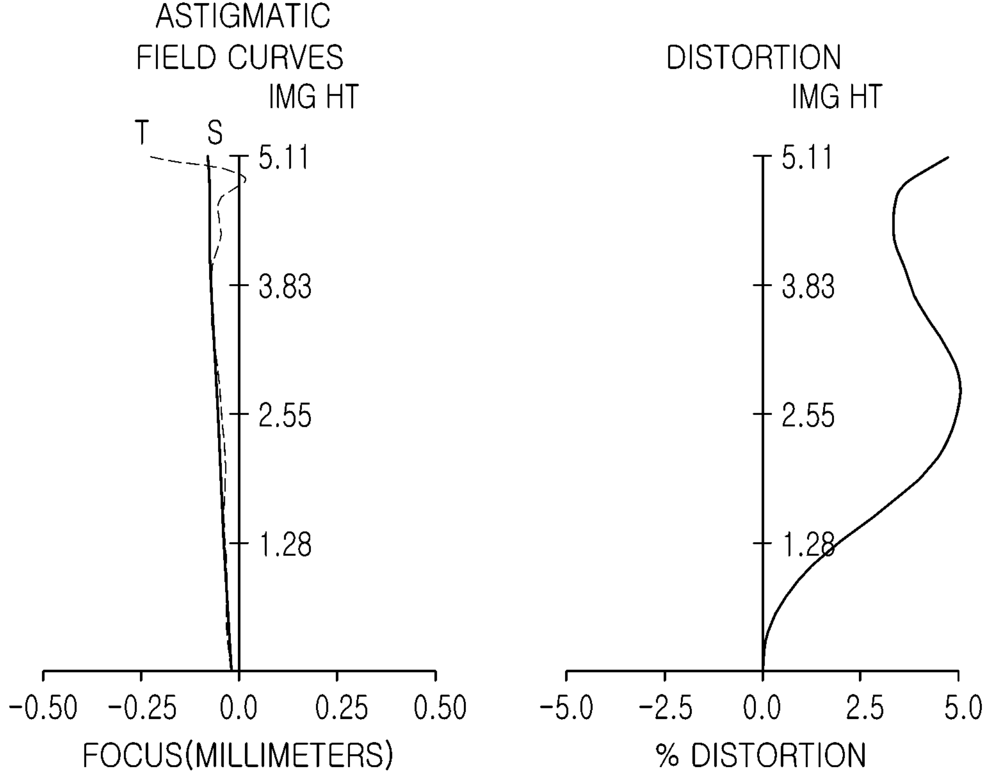
FIG. 8 is a view illustrating aberration characteristics of the example optical imaging system illustrated in FIG. 7.

In addition, the optical imaging system configured as described above may have aberration characteristics illustrated in FIG. 8.

Figure 9:
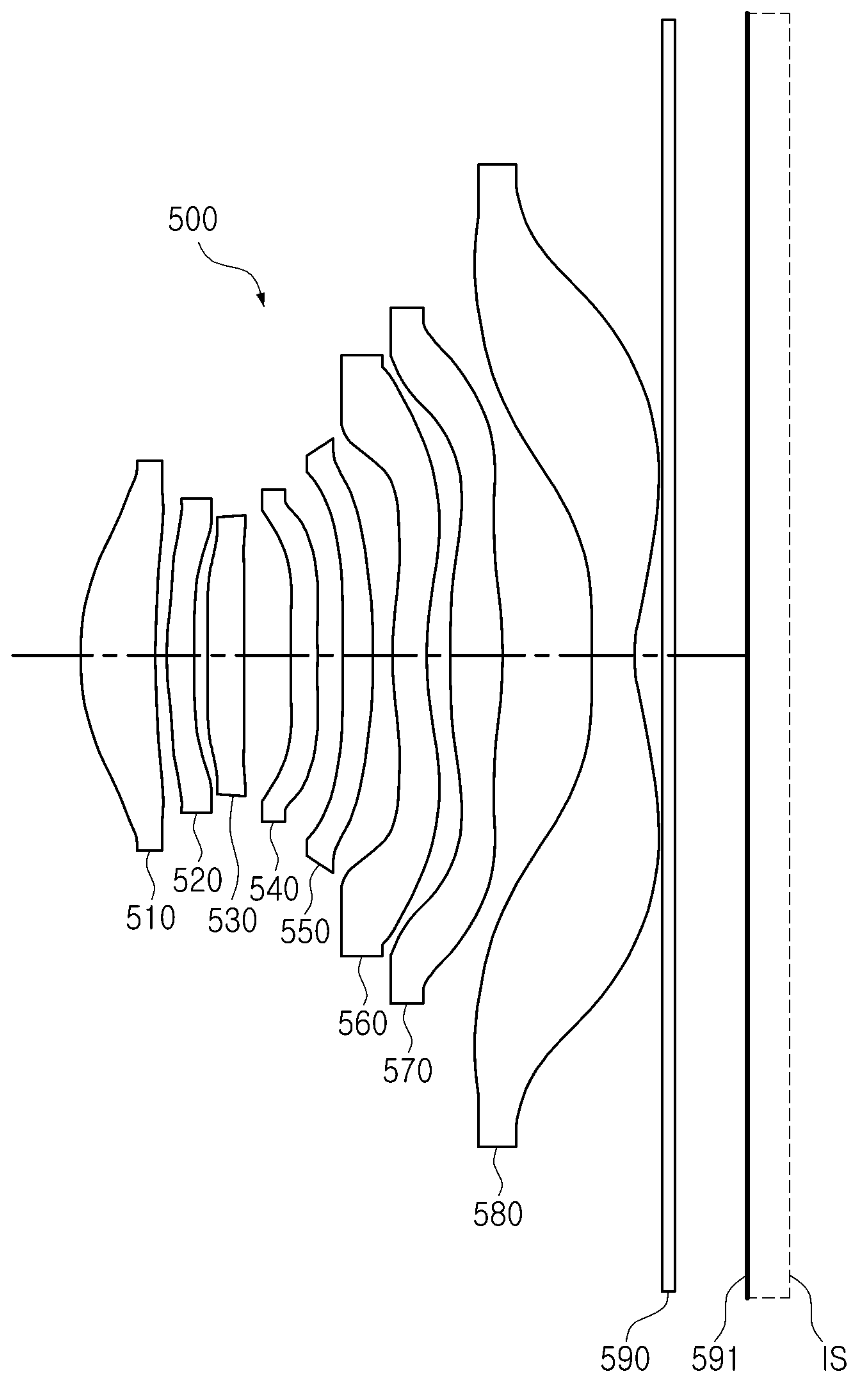
FIG. 9 is a view illustrating an optical imaging system in accordance with a fifth example.

An optical imaging system according to a fifth example is described with reference to FIGS. 9 and 10.

The optical imaging system according to the fifth example may include a first lens 510, a second lens 520, a third lens 530, a fourth lens 540, a fifth lens 550, a sixth lens 560, a seventh lens 570 and an eighth lens 580, and may further include a filter 590 and the image sensor IS, which includes an imaging plane 591.

The optical imaging system according to the fifth example may form an image on an imaging plane 591. The imaging plane 591 may indicate the surface on which the focal point is formed by the optical imaging system. In an example, the imaging plane 591 may indicate one surface of the image sensor IS, on which light is received.

Tables 13 and 14 illustrate characteristics of each lens (e.g., radius of curvature, thickness of the lens or distance between the lenses, refractive index, Abbe number or focal length).

TABLE 13

| Surface No. | Item | Radius of curvature | Thickness or distance | Refractive index | Abbe No. | Focal length |
|---|---|---|---|---|---|---|
| S1 | First lens | 2.017 | 0.625 | 1.497 | 81.6 | 5.77 |
| S2 | First lens | 6.068 | 0.100 | | | |
| S3 | Second lens | 7.997 | 0.220 | 1.680 | 18.2 | −18.29 |
| S4 | Second lens | 4.838 | 0.100 | | | |
| S5 | Third lens | 5.776 | 0.316 | 1.535 | 55.7 | 12.98 |
| S6 | Third lens | 33.039 | 0.376 | | | |
| S7 | Fourth lens | −166.972 | 0.222 | 1.650 | 21.5 | −2472.23 |
| S8 | Fourth lens | −186.188 | 0.206 | | | |
| S9 | Fifth lens | −7.100 | 0.257 | 1.535 | 55.7 | 4524.63 |
| S10 | Fifth lens | −7.169 | 0.161 | | | |
| S11 | Sixth lens | 3.534 | 0.290 | 1.614 | 25.9 | −17.11 |
| S12 | Sixth lens | 2.568 | 0.188 | | | |
| S13 | Seventh lens | 6.442 | 0.430 | 1.544 | 56.0 | 4.21 |
| S14 | Seventh lens | −3.499 | 0.741 | | | |
| S15 | Eighth lens | 21.814 | 0.360 | 1.535 | 55.7 | −3.16 |
| S16 | Eighth lens | 1.568 | 0.200 | | | |
| S17 | Filter | Infinity | 0.110 | 1.517 | 64.2 | |
| S18 | | Infinity | 0.597 | | | |
| S19 | Imaging plane | Infinity | | | | |

TABLE 14

| | | | |
|---|---|---|---|
| f | 4.5 | Y52 | 1.4833 |
| IMG HT | 5.107 | Y62 | 0.593 |
| FOV | 93.7 | Y72 | 0.5601 |
| SAG52 | −0.3273 | Y82 | 0.5818 |
| SAG62 | −0.3562 | Z52 | −0.2529 |
| SAG72 | −0.6443 | Z62 | 0.05307 |
| SAG82 | −0.9947 | Z72 | −0.03537 |
| | | Z82 | 0.08219 |

In the fifth example, the first lens 510 may have positive refractive power, with a convex first surface and a concave second surface.

The second lens 520 may have negative refractive power, with a convex first surface and a concave second surface.

The third lens 530 may have positive refractive power, with a convex first surface and a concave second surface.

The fourth lens 540 may have negative refractive power, and a concave first surface and a convex second surface.

The fifth lens 550 may have positive refractive power, while the first surface of the fifth lens may be concave in the paraxial region and the second surface of the fifth lens may be convex in the paraxial region.

In addition, at least one inflection point may be formed on at least one of the first and second surfaces of the fifth lens 550. For example, the fifth lens 550 may have a first surface thereof concave in the paraxial region and convex in regions other than the paraxial region. In addition, the fifth lens 550 may have a second surface thereof convex in the paraxial region and may be concave in regions other than the paraxial region.

The sixth lens 560 may have negative refractive power, while the first surface of the sixth lens may be concave in the paraxial region.

In addition, at least one inflection point may be formed on at least one of the first and second surfaces of the sixth lens 560. For example, the first surface of the sixth lens 560 may be convex in the paraxial region and concave in regions other than the paraxial region. In addition, the sixth lens 560 may have the second surface concave in the paraxial region and convex in regions other than the paraxial region.

The seventh lens 570 may have positive refractive power, and the first and second surfaces of the seventh lens may be convex in the paraxial region.

In addition, at least one inflection point may be formed on at least one of the first and second surfaces of the seventh lens 570. For example, the seventh lens 570 may have a first surface that is convex in the paraxial region and concave in regions other than the paraxial region. In addition, the seventh lens 570 may have a second surface that is convex in the paraxial region and may be concave in regions other than the paraxial region.

The eighth lens 580 may have negative refractive power, while the first surface of the eighth lens may be concave in the paraxial region.

In addition, at least one inflection point may be formed on at least one of the first and second surfaces of the eighth lens 580. For example, the first surface of the eighth lens 580 may be convex in the paraxial region and concave in regions other than the paraxial region. The second surface of the eighth lens 580 may be concave in the paraxial region and convex in regions other than the paraxial region.

The first lens 510 may be formed of glass, and the second lens 520 to the eighth lens 580 may be formed of plastic. In addition, the second lens 520 to the eighth lens 580 may each be formed of plastic having optical characteristics different from optical characteristics of an adjacent lens.

For example, the first lens 510 may be formed of glass having a high dispersion value, and the second lens 520 and the fourth lens 540 may each be formed of plastic having a high refractive index and a low dispersion value.

Meanwhile, each surface of the first lens 510 to the eighth lens 580 may have an aspherical coefficient as illustrated in Table 15. For example, the object-side surfaces and image-side surfaces of the first to eighth lenses 510 to 580 may be all the aspherical surfaces.

TABLE 15

| | S1 | S2 | S3 | S4 | S5 | S6 | S7 | S8 |
|---|---|---|---|---|---|---|---|---|
| K | −2.598 | −42.938 | 29.006 | 12.393 | 0.902 | 99.000 | −99.000 | 99.000 |
| A | 2.184E−02 | −2.756E−02 | −1.652E−02 | 4.187E−02 | −4.360E−02 | −4.996E−02 | −7.013E−02 | −3.313E−02 |
| B | 1.027E−01 | 3.955E−01 | 8.013E−02 | −1.254E+00 | 6.108E−01 | 6.152E−01 | 1.359E−01 | −1.261E−02 |
| C | −7.121E−01 | −3.052E+00 | −1.247E+00 | 1.488E+01 | −7.762E+00 | −6.520E+00 | −1.908E+00 | −7.064E−01 |
| D | 2.796E+00 | 1.382E+01 | 9.321E+00 | −1.115E+02 | 6.108E+01 | 4.359E+01 | 1.183E+01 | 4.211E+00 |
| E | −7.185E+00 | −4.126E+01 | −4.155E+01 | 5.597E+02 | −3.208E+02 | −1.957E+02 | −4.643E+01 | −1.412E+01 |
| F | 1.260E+01 | 8.538E+01 | 1.232E+02 | −1.950E+03 | 1.175E+03 | 6.099E+02 | 1.234E+02 | 3.148E+01 |
| G | −1.555E+01 | −1.259E+02 | −2.554E+02 | 4.824E+03 | −3.070E+03 | −1.344E+03 | −2.302E+02 | −4.935E+01 |
| H | 1.370E+01 | 1.341E+02 | 3.786E+02 | −8.578E+03 | 5.793E+03 | 2.113E+03 | 3.053E+02 | 5.546E+01 |
| J | −8.665E+00 | −1.035E+02 | −4.036E+02 | 1.098E+04 | −7.897E+03 | −2.369E+03 | −2.872E+02 | −4.467E+01 |
| L | 3.903E+00 | 5.725E+01 | 3.069E+02 | −1.003E+04 | 7.698E+03 | 1.867E+03 | 1.879E+02 | 2.535E+01 |
| M | −1.222E+00 | −2.214E+01 | −1.623E+02 | 6.362E+03 | −5.229E+03 | −1.004E+03 | −8.184E+01 | −9.765E+00 |
| N | 2.529E−01 | 5.678E+00 | 5.664E+01 | −2.662E+03 | 2.349E+03 | 3.466E+02 | 2.173E+01 | 2.381E+00 |
| O | −3.112E−02 | −8.676E−01 | −1.173E+01 | 6.604E+02 | −6.276E+02 | −6.820E+01 | −2.876E+00 | −3.192E−01 |
| P | 1.725E−03 | 5.978E−02 | 1.090E+00 | −7.350E+01 | 7.547E+01 | 5.640E+00 | 9.166E−02 | 1.648E−02 |

| | S9 | S10 | S11 | S12 | S13 | S14 | S15 | S16 |
|---|---|---|---|---|---|---|---|---|
| K | 4.098 | 4.510 | −7.719 | −2.230 | 5.221 | −23.619 | 3.171 | −6.911 |
| A | 7.131E−02 | 6.313E−02 | −9.009E−02 | −1.615E−01 | 2.579E−02 | 4.936E−02 | −2.170E−01 | −1.002E−01 |
| B | −3.677E−03 | −4.738E−02 | 1.925E−01 | 2.150E−01 | −7.505E−02 | −2.490E−02 | 1.111E−01 | 4.700E−02 |
| C | −1.108E+00 | −5.392E−01 | −5.166E−01 | −3.608E−01 | 1.028E−01 | 4.097E−02 | −3.312E−02 | −1.242E−02 |
| D | 4.693E+00 | 1.525E+00 | 8.116E−01 | 4.552E−01 | −1.290E−01 | −5.397E−02 | 1.685E−03 | 4.014E−04 |
| E | −1.120E+01 | −1.954E+00 | −7.953E−01 | −4.241E−01 | 1.258E−01 | 4.332E−02 | 3.429E−03 | 9.499E−04 |
| F | 1.813E+01 | 1.083E+00 | 4.260E−01 | 2.888E−01 | −9.369E−02 | −2.395E−02 | −1.636E−03 | −3.755E−04 |
| G | −2.108E+01 | 4.653E−01 | −3.790E−03 | −1.409E−01 | 5.289E−02 | 9.660E−03 | 3.980E−04 | 7.713E−05 |
| H | 1.795E+01 | −1.354E+00 | −1.875E−01 | 4.849E−02 | −2.227E−02 | −2.906E−03 | −6.141E−05 | −9.956E−06 |
| J | −1.124E+01 | 1.183E+00 | 1.595E−01 | −1.161E−02 | 6.837E−03 | 6.535E−04 | 6.396E−06 | 8.418E−07 |
| L | 5.124E+00 | −6.002E−01 | −7.344E−02 | 1.889E−03 | −1.491E−03 | −1.080E−04 | −4.569E−07 | −4.614E−08 |
| M | −1.652E+00 | 1.924E−01 | 2.111E−02 | −1.998E−04 | 2.234E−04 | 1.267E−05 | 2.211E−08 | 1.534E−09 |
| N | 3.562E−01 | −3.855E−02 | −3.782E−03 | 1.251E−05 | −2.177E−05 | −9.900E−07 | −6.924E−10 | −2.505E−11 |
| O | −4.599E−02 | 4.419E−03 | 3.866E−04 | −3.680E−07 | 1.240E−06 | 4.600E−08 | 1.265E−11 | 5.872E−15 |
| P | 2.682E−03 | −2.216E−04 | −1.725E−05 | 1.587E−09 | −3.130E−08 | −9.571E−10 | −1.021E−13 | 3.991E−15 |

Figure 10:
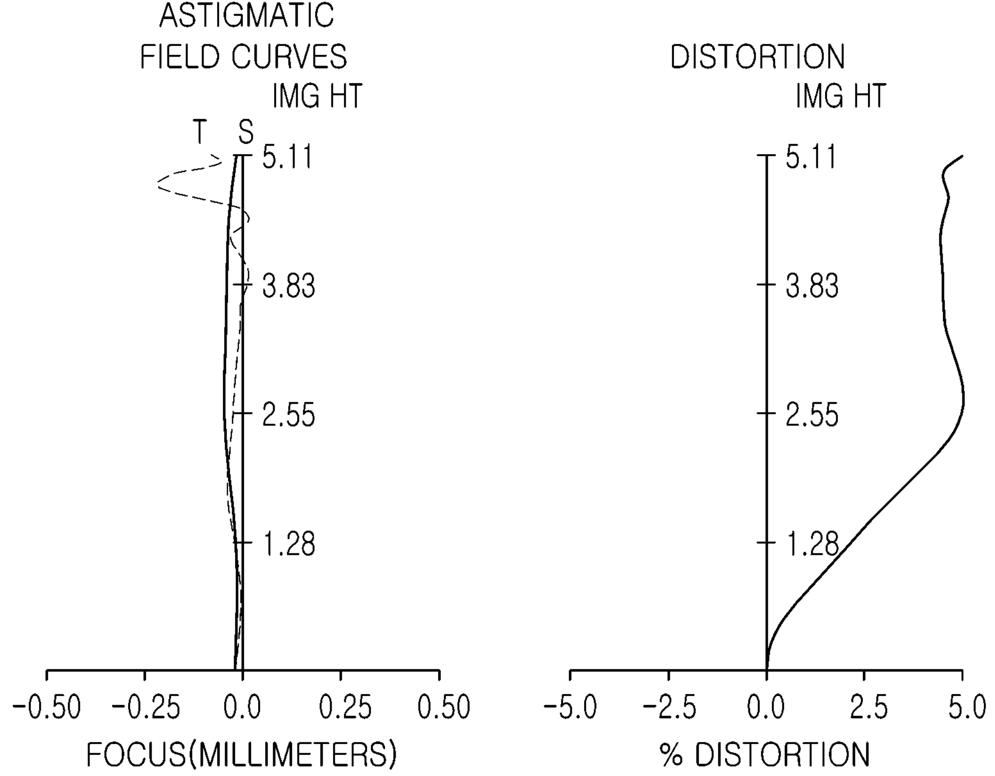
FIG. 10 is a view illustrating aberration characteristics of the example optical imaging system illustrated in FIG. 9.

In addition, the optical imaging system configured as described above may have aberration characteristics illustrated in FIG. 10.

Figure 11:
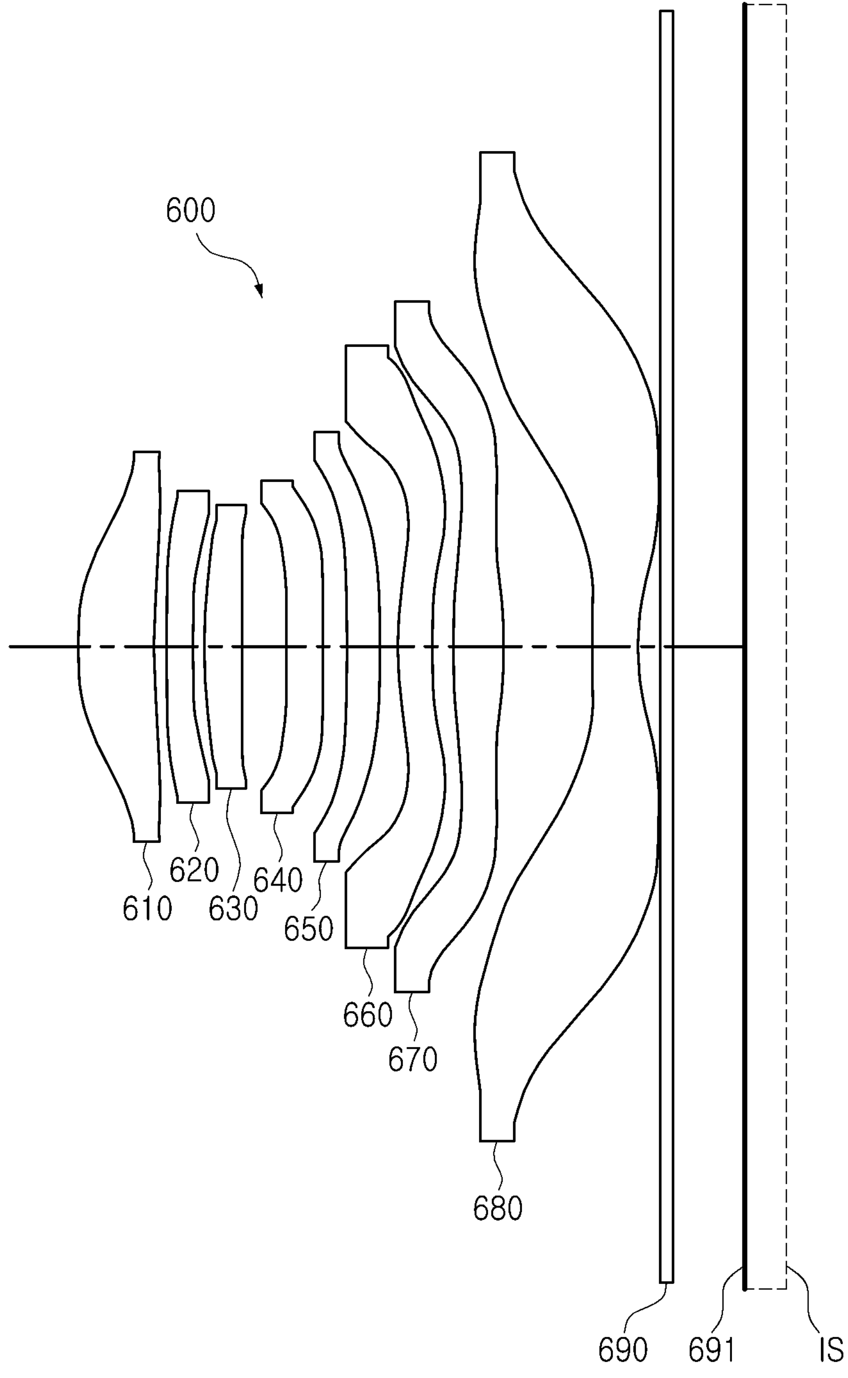
FIG. 11 is a view illustrating an optical imaging system in accordance with a sixth example.

An optical imaging system according to a sixth example is described with reference to FIGS. 11 and 12.

The optical imaging system according to the sixth example may include a first lens 610, a second lens 620, a third lens 630, a fourth lens 640, a fifth lens 650, a sixth lens 660, a seventh lens 670 and an eighth lens 680, and may further include a filter 690 and the image sensor IS.

The optical imaging system according to the sixth example may form an image on an imaging plane 691. The imaging plane 691 may indicate the surface on which the focal point is formed by the optical imaging system. For example, the imaging plane 691 may indicate one surface of the image sensor IS, on which light is received.

Tables 16 and 17 illustrate characteristics of each lens (e.g., radius of curvature, thickness of the lens or distance between the lenses, refractive index, Abbe number or focal length).

TABLE 16

| Surface no. | Item | Radius of curvature | Thickness or distance | Refractive index | Abbe No. | Focal length |
|---|---|---|---|---|---|---|
| S1 | First lens | 2.013 | 0.622 | 1.497 | 81.6 | 5.75 |
| S2 | First lens | 6.050 | 0.100 | | | |
| S3 | Second lens | 7.973 | 0.220 | 1.680 | 18.2 | −18.19 |
| S4 | Second lens | 4.819 | 0.100 | | | |
| S5 | Third lens | 5.289 | 0.319 | 1.535 | 55.7 | 12.64 |
| S6 | Third lens | 23.454 | 0.362 | | | |
| S7 | Fourth lens | −187.000 | 0.301 | 1.650 | 21.5 | 56882.86 |
| S8 | Fourth lens | −186.188 | 0.207 | | | |
| S9 | Fifth lens | −7.100 | 0.261 | 1.535 | 55.7 | 4232.36 |
| S10 | Fifth lens | −7.169 | 0.156 | | | |
| S11 | Sixth lens | 3.466 | 0.275 | 1.614 | 25.9 | −17.07 |
| S12 | Sixth lens | 2.532 | 0.173 | | | |
| S13 | Seventh lens | 6.436 | 0.430 | 1.544 | 56.0 | 4.23 |
| S14 | Seventh lens | −3.522 | 0.734 | | | |
| S15 | Eighth lens | 22.010 | 0.360 | 1.535 | 55.7 | −3.12 |
| S16 | Eighth lens | 1.549 | 0.200 | | | |
| S17 | Filter | Infinity | 0.110 | 1.517 | 64.2 | |
| S18 | | Infinity | 0.570 | | | |
| S19 | Imaging plane | Infinity | | | | |

TABLE 17

| | | | |
|---|---|---|---|
| f | 4.48 | Y52 | 1.5127 |
| IMG HT | 5.107 | Y62 | 0.6082 |
| FOV | 94.1 | Y72 | 0.5423 |
| SAG52 | −0.3339 | Y82 | 0.5803 |
| SAG62 | −0.3456 | Z52 | −0.26646 |
| SAG72 | −0.6294 | Z62 | 0.05639 |
| SAG82 | −0.9931 | Z72 | −0.0334 |
| | | Z82 | 0.08288 |

In the sixth example, the first lens 610 may have positive refractive power, with a convex first surface and a concave second surface.

The second lens 620 may have negative refractive power, with a convex first surface and a concave second surface.

The third lens 630 may have positive refractive power, with a convex first surface and a concave second surface.

The fourth lens 640 may have positive refractive power, and a concave first surface and a convex second surface.

The fifth lens 650 may have positive refractive power, while the first surface of the fifth lens may be concave in the paraxial region and the second surface thereof f the fifth lens may be convex in the paraxial region.

In addition, at least one inflection point may be formed on at least one of the first and second surfaces of the fifth lens 650. For example, the fifth lens 650 may have a first surface thereof concave in the paraxial region and convex in regions other than the paraxial region. In addition, the fifth lens 650 may have a second surface that is convex in the paraxial region and may be concave in regions other than the paraxial region.

The sixth lens 660 may have negative refractive power, while the first surface of the sixth lens may be concave in the paraxial region.

In addition, at least one inflection point may be formed on at least one of the first and second surfaces of the sixth lens 660. For example, the first surface of the sixth lens 660 may be convex in the paraxial region and concave in regions other than the paraxial region. In addition, the sixth lens 660 may have a second surface concave in the paraxial region and convex in regions other than the paraxial region.

The seventh lens 670 may have positive refractive power, and the first and second surfaces of the seventh lens may be convex in the paraxial region.

In addition, at least one inflection point may be formed on at least one of the first and second surfaces of the seventh lens 670. For example, the seventh lens 670 may have a first surface that is convex in the paraxial region and concave in regions other than the paraxial region. In addition, the seventh lens 670 may have a second surface that convex in the paraxial region and may be concave in regions other than the paraxial region.

The eighth lens 680 may have negative refractive power, while the first surface of the eighth lens may be concave in the paraxial region.

In addition, at least one inflection point may be formed on at least one of the first and second surfaces of the eighth lens 680. For example, the first surface of the eighth lens 680 may be convex in the paraxial region and concave in regions other than the paraxial region. The second surface of the eighth lens 680 may be concave in the paraxial region and convex in regions other than the paraxial region.

The first lens 610 may be formed of glass, and the second lens 620 to the eighth lens 680 may be formed of plastic. In addition, the second lens 620 to the eighth lens 680 may each be formed of plastic having optical characteristics different from optical characteristics of an adjacent lens.

For example, the first lens 610 may be formed of glass having a high dispersion value, and the second lens 620 and the fourth lens 640 may each be formed of plastic having a high refractive index and a low dispersion value.

Meanwhile, each surface of the first lens 610 to the eighth lens 680 may have an aspherical coefficient as illustrated in Table 18. In an example, the object-side surfaces and image-side surfaces of the first to eighth lenses 610 to 680 may all have aspherical surfaces.

Figure 12:
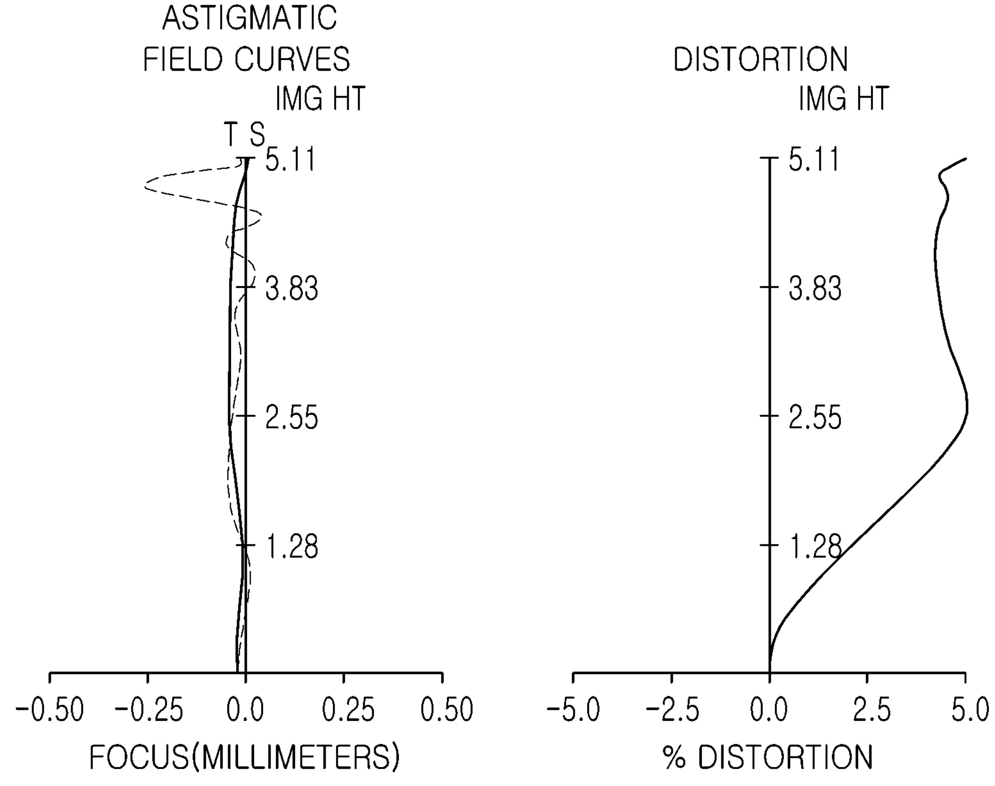
FIG. 12 is a view illustrating aberration characteristics of the example optical imaging system illustrated in FIG. 11.

In addition, the optical imaging system configured as described above may have aberration characteristics illustrated in FIG. 12.

Figure 13:
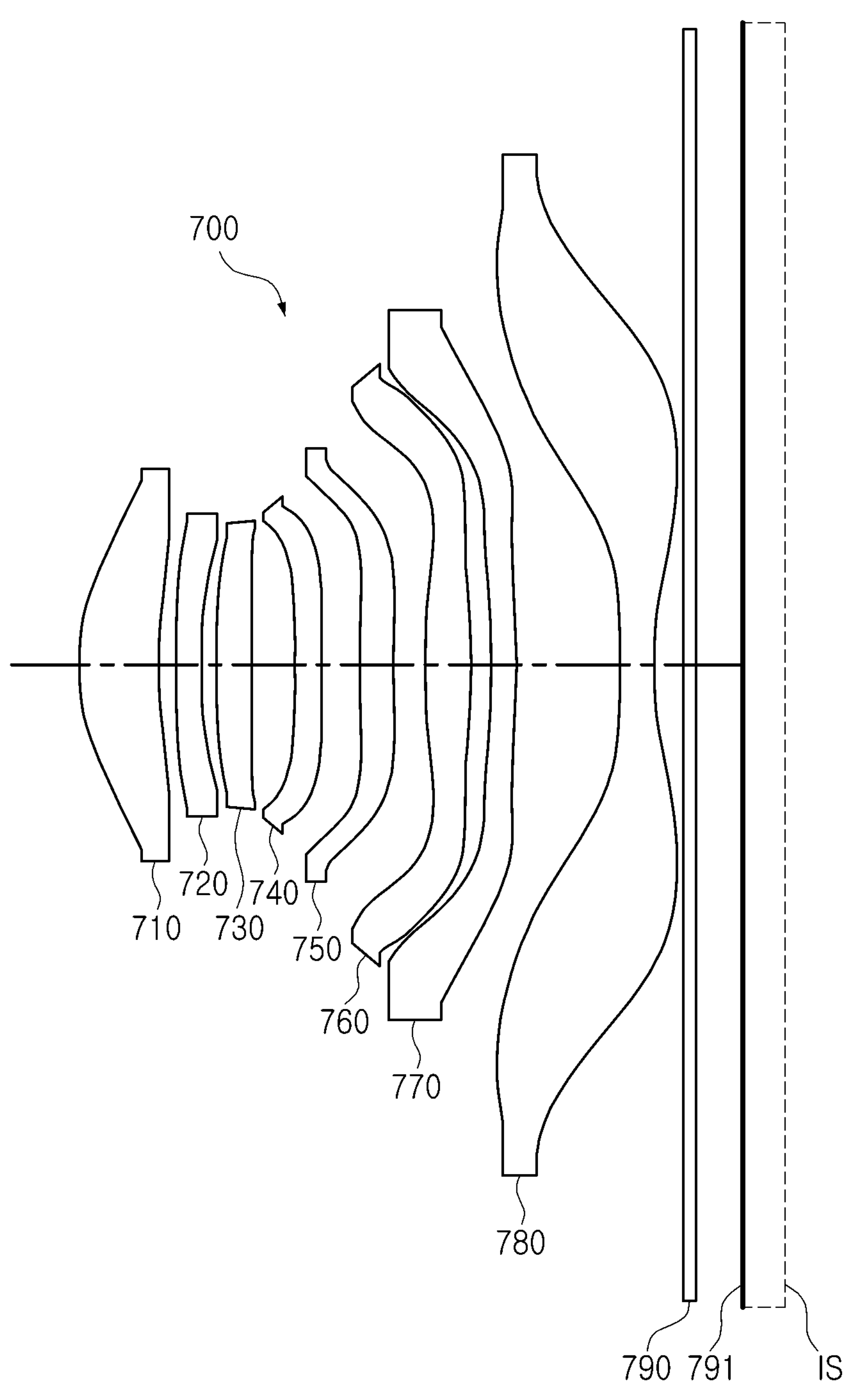
FIG. 13 is a view illustrating an optical imaging system in accordance with a seventh example.

An optical imaging system according to a seventh example is described with reference to FIGS. 13 and 14.

The optical imaging system according to the seventh example may include a first lens 710, a second lens 720, a third lens 730, a fourth lens 740, a fifth lens 750, a sixth lens 760, a seventh lens 770 and an eighth lens 780, and may further include a filter 790 and the image sensor IS, including an imaging plane 791.

The optical imaging system according to the seventh example may focus an image on the imaging plane 791. The imaging plane 791 may indicate the surface on which the focal point is formed by the optical imaging system. For example, the imaging plane 791 may indicate one surface of the image sensor IS, on which light is received.

Tables 19 and 20 illustrate characteristics of each lens (e.g., radius of curvature, thickness of the lens or distance between the lenses, refractive index, Abbe number or focal length).

TABLE 18

| | S1 | S2 | S3 | S4 | S5 | S6 | S7 | S8 |
|---|---|---|---|---|---|---|---|---|
| K | −2.595 | −41.246 | 29.062 | 12.170 | 2.102 | −88.807 | −99.000 | −99.000 |
| A | 2.413E−02 | −2.550E−02 | −1.129E−02 | 3.846E−02 | −3.976E−02 | −7.624E−02 | −1.764E−01 | −4.629E−02 |
| B | 8.757E−02 | 3.482E−01 | 1.860E−04 | −1.247E+00 | 5.719E−01 | 1.180E+00 | 1.732E+00 | 1.287E−01 |
| C | −5.976E−01 | −2.501E+00 | −4.283E−01 | 1.510E+01 | −7.530E+00 | −1.298E+01 | −1.538E+01 | −9.932E−01 |
| D | 2.196E+00 | 1.063E+01 | 3.832E+00 | −1.151E+02 | 5.956E+01 | 9.029E+01 | 8.567E+01 | 3.316E+00 |
| E | −5.210E+00 | −3.017E+01 | −1.690E+01 | 5.876E+02 | −3.078E+02 | −4.231E+02 | −3.223E+02 | −6.548E+00 |
| F | 8.389E+00 | 5.991E+01 | 4.656E+01 | −2.085E+03 | 1.090E+03 | 1.385E+03 | 8.495E+02 | 7.728E+00 |
| G | −9.448E+00 | −8.543E+01 | −8.667E+01 | 5.265E+03 | −2.712E+03 | −3.239E+03 | −1.603E+03 | −4.577E+00 |
| H | 7.549E+00 | 8.862E+01 | 1.124E+02 | −9.582E+03 | 4.791E+03 | 5.473E+03 | 2.189E+03 | −7.096E−01 |
| J | −4.282E+00 | −6.692E+01 | −1.024E+02 | 1.259E+04 | −5.999E+03 | −6.687E+03 | −2.163E+03 | 3.755E+00 |
| L | 1.702E+00 | 3.639E+01 | 6.473E+01 | −1.183E+04 | 5.242E+03 | 5.846E+03 | 1.528E+03 | −3.338E+00 |
| M | −4.589E−01 | −1.387E+01 | −2.746E+01 | 7.743E+03 | −3.090E+03 | −3.562E+03 | −7.508E+02 | 1.610E+00 |
| N | 7.884E−02 | 3.516E+00 | 7.313E+00 | −3.352E+03 | 1.151E+03 | 1.435E+03 | 2.431E+02 | −4.594E−01 |
| O | −7.601E−03 | −5.317E−01 | −1.064E+00 | 8.620E+02 | −2.372E+02 | −3.435E+02 | −4.648E+01 | 7.280E−02 |
| P | 2.984E−04 | 3.631E−02 | 5.895E−02 | −9.970E+01 | 1.928E+01 | 3.693E+01 | 3.961E+00 | −4.931E−03 |

| | S9 | S10 | S11 | S12 | S13 | S14 | S15 | S16 |
|---|---|---|---|---|---|---|---|---|
| K | 4.310 | 5.062 | −7.638 | −2.212 | 5.230 | −24.287 | 3.035 | −6.962 |
| A | 8.044E−02 | 6.318E−02 | −7.126E−02 | −1.622E−01 | 2.483E−02 | 4.743E−02 | −2.219E−01 | −9.816E−02 |
| B | −3.684E−02 | 2.310E−03 | 1.210E−01 | 2.308E−01 | −1.026E−01 | −2.833E−02 | 1.301E−01 | 4.952E−02 |
| C | 1.139E+00 | −9.676E−01 | −2.845E−01 | −3.915E−01 | 2.445E−01 | 8.822E−02 | −5.721E−02 | −1.587E−02 |
| D | 5.302E+00 | 3.134E+00 | 1.658E−01 | 4.680E−01 | −4.340E−01 | −1.573E−01 | 1.797E−02 | 2.192E−03 |
| E | −1.329E+01 | −5.578E+00 | 5.200E−01 | −3.978E−01 | 5.032E−01 | 1.601E−01 | −3.440E−03 | 4.352E−04 |
| F | 2.209E+01 | 6.561E+00 | −1.448E+00 | 2.442E−01 | −3.938E−01 | −1.067E−01 | 3.083E−04 | −2.911E−04 |
| G | −2.576E+01 | −5.364E+00 | 1.874E+00 | −1.069E−01 | 2.152E−01 | 4.913E−02 | 1.397E−05 | 7.125E−05 |
| H | 2.152E+01 | 3.096E+00 | −1.523E+00 | 3.257E−02 | −8.370E−02 | −1.603E−02 | −7.378E−06 | −1.050E−05 |
| J | −1.288E+01 | −1.259E+00 | 8.365E−01 | −6.660E−03 | 2.330E−02 | 3.733E−03 | 9.462E−07 | 1.024E−06 |
| L | 5.455E+00 | 3.533E−01 | −3.158E−01 | 8.451E−04 | −4.604E−03 | −6.161E−04 | −6.580E−08 | −6.761E−08 |
| M | −1.582E+00 | −6.547E−02 | 8.094E−02 | −5.177E−05 | 6.295E−04 | 7.034E−05 | 2.609E−09 | 2.990E−09 |
| N | 2.956E−01 | 7.305E−03 | −1.345E−02 | −9.962E−07 | −5.657E−05 | −5.278E−06 | −5.066E−11 | −8.463E−11 |
| O | −3.148E−02 | −3.945E−04 | 1.307E−03 | 3.473E−07 | 3.002E−06 | 2.339E−07 | 1.122E−13 | 1.376E−12 |
| P | 1.408E−03 | 4.068E−06 | −5.635E−05 | −1.510E−08 | −7.127E−08 | −4.637E−09 | 8.044E−15 | −9.659E−15 |

TABLE 19

| Surface No. | Item | Radius of curvature | Thickness or distance | Refractive index | Abbe No. | Focal length |
|---|---|---|---|---|---|---|
| S1 | First lens | 1.957 | 0.676 | 1.497 | 81.6 | 5.62 |
| S2 | First lens | 5.738 | 0.125 | | | |
| S3 | Second lens | 7.453 | 0.220 | 1.680 | 18.2 | −18.62 |
| S4 | Second lens | 4.658 | 0.119 | | | |
| S5 | Third lens | 6.529 | 0.305 | 1.535 | 55.7 | 14.65 |
| S6 | Third lens | 37.725 | 0.346 | | | |
| S7 | Fourth lens | −57.373 | 0.226 | 1.650 | 21.5 | −59.71 |
| S8 | Fourth lens | 124.486 | 0.309 | | | |
| S9 | Fifth lens | 5.858 | 0.272 | 1.567 | 37.4 | −26.5 |
| S10 | Fifth lens | 4.151 | 0.264 | | | |
| S11 | Sixth lens | 6.121 | 0.393 | 1.544 | 56.0 | 4.78 |
| S12 | Sixth lens | −4.457 | 0.150 | | | |
| S13 | Seventh lens | −6.120 | 0.220 | 1.635 | 24.0 | −3188.08 |
| S14 | Seventh lens | −6.225 | 0.845 | | | |
| S15 | Eighth lens | 26.246 | 0.280 | 1.535 | 55.7 | −3.29 |
| S16 | Eighth lens | 1.652 | 0.250 | | | |
| S17 | Filter | Infinity | 0.110 | 1.517 | 64.2 | |
| S18 | | Infinity | 0.390 | | | |
| S19 | Imaging plane | Infinity | | | | |

TABLE 20

| | | | |
|---|---|---|---|
| f | 4.54 | Y52 | 0.3176 |
| IMG HT | 5.107 | Y62 | 0.4631 |
| FOV | 93.3 | Y72 | 0.4479 |
| SAG52 | −0.5401 | Y82 | 0.6045 |
| SAG62 | −0.7578 | Z52 | 0.0098 |
| SAG72 | −0.6259 | Z62 | −0.02095 |
| SAG82 | −0.957 | Z72 | −0.01313 |
| | | Z82 | 0.08195 |

In the seventh example, the first lens 710 may have positive refractive power, with a convex first surface and a concave second surface.

The second lens 720 may have negative refractive power, with a convex first surface and a concave second surface.

The third lens 730 may have positive refractive power, with a convex first surface and a concave second surface.

The fourth lens 740 may have negative refractive power, and concave first and second surfaces.

The fifth lens 750 may have negative refractive power, while the first surface of the fifth lens may be concave in the paraxial region.

In addition, at least one inflection point may be formed on at least one of the first and second surfaces of the fifth lens 750. For example, the fifth lens 750 may have a first surface that is convex in the paraxial region and concave in regions other than the paraxial region. In addition, the fifth lens 750 may have a second surface that is concave in the paraxial region and convex in regions other than the paraxial region.

The sixth lens 760 may have positive refractive power, and the first and second surfaces may be convex in the paraxial region.

In addition, at least one inflection point may be formed on at least one of the first and second surfaces of the sixth lens 760. For example, the first surface of the sixth lens 760 may be convex in the paraxial region and concave in regions other than the paraxial region. In addition, the sixth lens 760 may have a second surface that is convex in the paraxial region and may be concave in regions other than the paraxial region.

The seventh lens 770 may have negative refractive power, while the first surface of the seventh lens may be concave in the paraxial region and the second surface of the seventh lens may be convex in the paraxial region.

In addition, at least one inflection point may be formed on at least one of the first and second surfaces of the seventh lens 770. For example, the seventh lens 770 may have a first surface that is concave in the paraxial region and convex in regions other than the paraxial region. In addition, the seventh lens 770 may have a second surface that is convex in the paraxial region and may be concave in regions other than the paraxial region.

The eighth lens 780 may have negative refractive power, while the first surface thereof may be concave in the paraxial region.

In addition, at least one inflection point may be formed on at least one of the first and second surfaces of the eighth lens 780. For example, the eighth lens 780 may have a first surface convex in the paraxial region and concave in regions other than the paraxial region. In addition, the eighth lens 780 may have a second surface that is concave in the paraxial region and convex in regions other than the paraxial region.

The first lens 710 may be formed of glass, and the second lens 720 to the eighth lens 780 may be formed of plastic. In addition, the second lens 720 to the eighth lens 780 may each be formed of plastic having optical characteristics different from optical characteristics of an adjacent lens.

For example, the first lens 710 may be formed of glass having a high dispersion value, and the second lens 720 and the fourth lens 740 may each be formed of plastic having a high refractive index and a low dispersion value.

Meanwhile, each surface of the first lens 710 to the eighth lens 780 may have an aspherical coefficient as illustrated in Table 21. For example, the object-side surfaces and image-side surfaces of the first to eighth lenses 710 to 780 may be all the aspherical surfaces.

TABLE 21

| | S1 | S2 | S3 | S4 | S5 | S6 | S7 | S8 |
|---|---|---|---|---|---|---|---|---|
| K | −1.972 | −25.316 | 20.260 | 12.239 | 6.577 | 0.000 | −99.000 | 99.000 |
| A | 2.893E−02 | −2.096E−02 | −4.932E−02 | 2.617E−02 | −3.593E−02 | −3.821E−02 | −8.752E−02 | −1.166E−01 |

TABLE 21-continued

| | | | | | | | | |
|---|---|---|---|---|---|---|---|---|
| B | −1.805E−02 | 1.792E−01 | 4.215E−01 | −1.292E+00 | 2.977E−01 | 3.409E−01 | 9.292E−02 | 3.789E−01 |
| C | 8.749E−02 | −1.165E+00 | −3.721E+00 | 1.775E+01 | −3.847E+00 | −3.813E+00 | −6.121E−01 | 2.570E+00 |
| D | −3.943E−01 | 4.684E+00 | 2.152E+01 | −1.492E+02 | 3.083E+01 | 2.822E+01 | 3.934E+00 | 1.279E+01 |
| E | 1.270E+00 | −1.282E+01 | −8.308E+01 | 8.322E+02 | −1.617E+02 | −1.431E+02 | −2.186E+01 | −4.475E+01 |
| F | −2.866E+00 | 2.479E+01 | 2.239E+02 | −3.211E+03 | 5.844E+02 | 5.071E+02 | 8.530E+01 | 1.103E+02 |
| G | 4.491E+00 | −3.468E+01 | −4.333E+02 | 8.786E+03 | −1.499E+03 | −1.275E+03 | −2.291 E+02 | −1.946E+02 |
| H | −4.922E+00 | 3.544E+01 | 6.112E+02 | −1.729E+04 | 2.773E+03 | 2.296E+03 | 4.291E+02 | 2.483E+02 |
| J | 3.787E+00 | −2.644E+01 | −6.300E+02 | 2.450E+04 | −3.715E+03 | −2.965E+03 | −5.654E+02 | −2.292E+02 |
| L | −2.034E+00 | 1.422E+01 | 4.693E+02 | −2.480E+04 | 3.570E+03 | 2.720E+03 | 5.225E+02 | 1.517E+02 |
| M | 7.457E−01 | −5.357E+00 | −2.460E+02 | 1.746E+04 | −2.398E+03 | −1.729E+03 | −3.316E+02 | −7.007E+01 |
| N | −1.778E−01 | 1.339E+00 | 8.601E+01 | −8.123E+03 | 1.069E+03 | 7.232E+02 | 1.377E+02 | 2.146E+01 |
| O | 2.485E−02 | −1.991E−01 | −1.799E+01 | 2.244E+03 | −2.842E+02 | −1.791E+02 | −3.370E+01 | −3.916E+00 |
| P | −1.544E−03 | 1.332E−02 | 1.702E+00 | −2.787E+02 | 3.405E+01 | 1.989E+01 | 3.687E+00 | 3.222E−01 |

| | S9 | S10 | S11 | S12 | S13 | S14 | S15 | S16 |
|---|---|---|---|---|---|---|---|---|
| K | −32.812 | −2.579 | 5.466 | −9.744 | −0.100 | −16.163 | −7.662 | −5.875 |
| A | −2.186E−01 | −2.614E−01 | −2.964E−02 | 1.405E−02 | 4.066E−02 | 6.486E−02 | −2.351E−01 | −1.521E−01 |
| B | 4.887E−01 | 4.652E−01 | 1.830E−01 | 3.290E−01 | 2.092E−01 | 3.917E−02 | 2.045E−01 | 1.415E−01 |
| C | −1.925E+00 | −1.732E+00 | −5.963E−01 | −8.351E−01 | −6.473E−01 | −2.008E−01 | −1.469E−01 | −9.508E−02 |
| D | 6.224E+00 | 4.946E+00 | 1.046E+00 | 1.184E+00 | 9.385E−01 | 2.785E−01 | 7.518E−02 | 4.455E−02 |
| E | −1.410E+01 | −9.893E+00 | −1.274E+00 | −1.137E+00 | −8.426E−01 | −2.197E−01 | −2.615E−02 | −1.474E−02 |
| F | 2.242E+01 | 1.410E+01 | 1.133E+00 | 7.834E−01 | 5.127E−01 | 1.119E−01 | 6.310E−03 | 3.493E−03 |
| G | −2.539E+01 | −1.452E+01 | −7.387E−01 | −3.963E−01 | −2.219E−01 | −3.896E−02 | −1.082E−03 | −5.989E−04 |
| H | 2.063E+01 | 1.088E+01 | 3.507E−01 | 1.480E−01 | 6.996E−02 | 9.570E−03 | 1.339E−04 | 7.467E−05 |
| J | −1.196E+01 | −5.917E+00 | −1.203E−01 | −4.063E−02 | −1.615E−02 | −1.677E−03 | −1.200E−05 | −6.753E−06 |
| L | 4.853E+00 | 2.307E+00 | 2.940E−02 | 8.067E−03 | 2.702E−03 | 2.088E−04 | 7.729E−07 | 4.377E−07 |
| M | −1.327E+00 | −6.276E−01 | −4.978E−03 | −1.125E−03 | −3.182E−04 | −1.804E−05 | −3.487E−08 | −1.979E−08 |
| N | 2.267E−01 | 1.129E−01 | 5.544E−04 | 1.042E−04 | 2.497E−05 | 1.029E−06 | 1.047E−09 | 5.921E−10 |
| O | −2.073E−02 | −1.206E−02 | −3.648E−05 | −5.758E−06 | −1.170E−06 | −3.483E−08 | −1.878E−11 | −1.054E−11 |
| P | 6.721 E−04 | 5.781E−04 | 1.074E−06 | 1.434E−07 | 2.470E−08 | 5.293E−10 | 1.525E−13 | 8.436E−14 |

Figure 14:
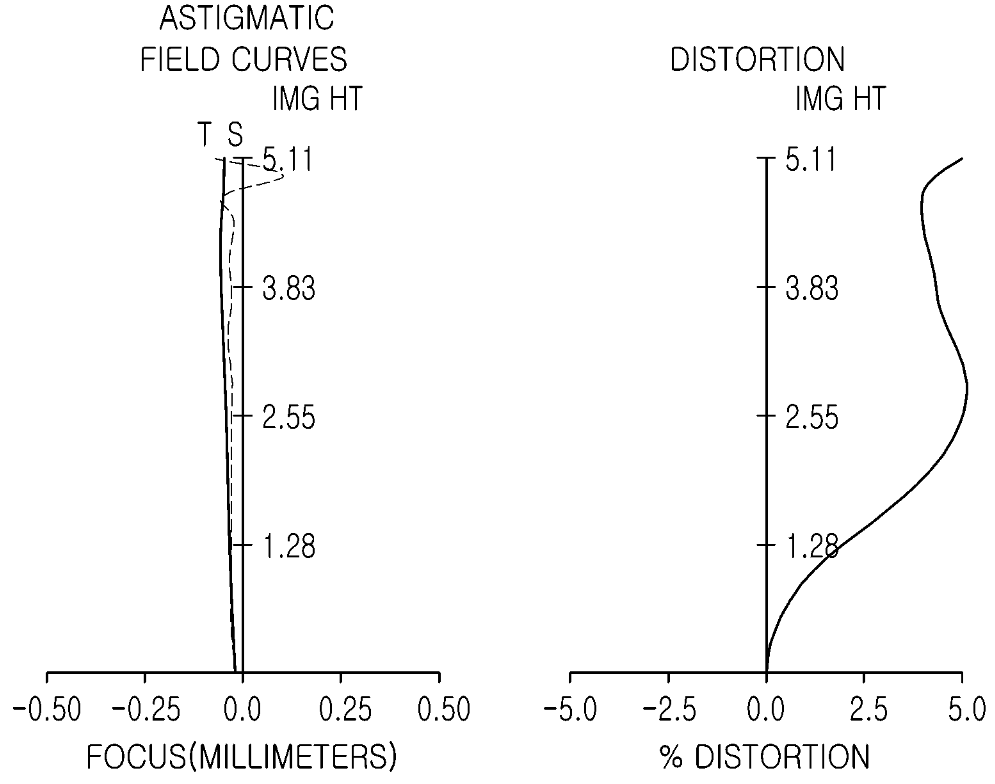
FIG. 14 is a view illustrating aberration characteristics of the example optical imaging system illustrated in FIG. 13.

In addition, the optical imaging system configured as described above may have aberration characteristics illustrated in FIG. 14.

Figure 15:
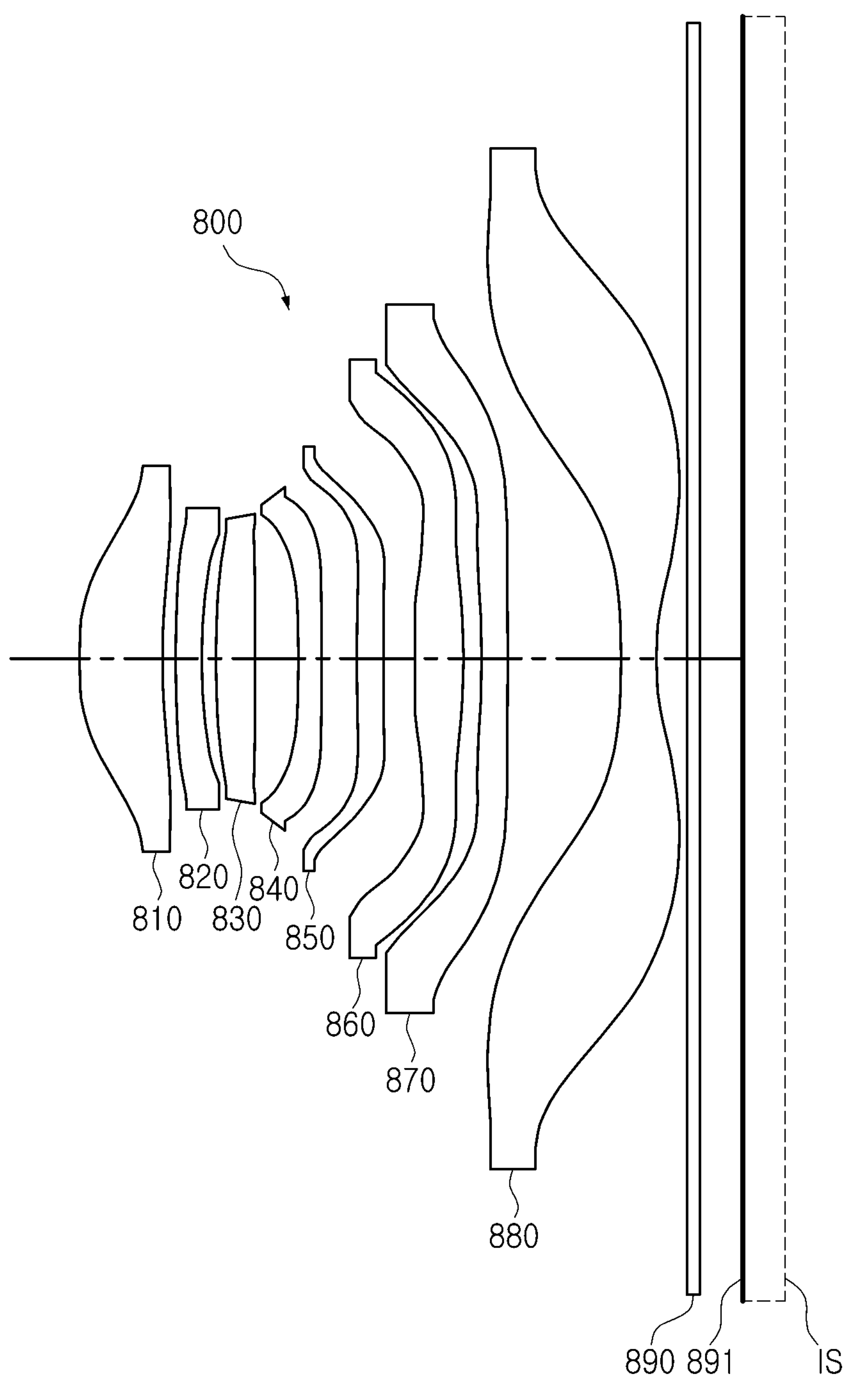
FIG. 15 is a view illustrating an optical imaging system in accordance with an eighth example.

An optical imaging system according to an eighth example is described with reference to FIGS. 15 and 16.

The optical imaging system according to the eighth example may include a first lens 810, a second lens 820, a third lens 830, a fourth lens 840, a fifth lens 850, a sixth lens 860, a seventh lens 870 and an eighth lens 880, and may further include a filter 890 and the image sensor IS, which includes an imaging plane 891.

The optical imaging system according to the eighth example may focus an image on the imaging plane 891. The imaging plane 891 may indicate the surface on which the focal point is formed by the optical imaging system. For example, the imaging plane 891 may indicate one surface of the image sensor IS, on which light is received.

Tables 22 and 23 illustrate characteristics of each lens (e.g., radius of curvature, thickness of the lens or distance between the lenses, refractive index, Abbe number or focal length).

TABLE 22

| Surface No. | Item | Radius of curvature | Thickness or distance | Refractive index | Abbe No. | Focal length |
|---|---|---|---|---|---|---|
| S1 | First lens | 1.917 | 0.702 | 1.497 | 81.6 | 5.36 |
| S2 | First lens | 5.968 | 0.100 | | | |
| S3 | Second lens | 8.033 | 0.220 | 1.755 | 27.5 | −12.79 |
| S4 | Second lens | 4.350 | 0.108 | | | |
| S5 | Third lens | 6.185 | 0.328 | 1.535 | 55.7 | 12.54 |
| S6 | Third lens | 74.047 | 0.339 | | | |
| S7 | Fourth lens | −56.093 | 0.220 | 1.650 | 21.5 | −40.85 |
| S8 | Fourth lens | 51.591 | 0.285 | | | |
| S9 | Fifth lens | 5.121 | 0.227 | 1.567 | 37.4 | −25.84 |
| S10 | Fifth lens | 3.740 | 0.261 | | | |
| S11 | Sixth lens | 6.090 | 0.403 | 1.544 | 56.0 | 4.47 |
| S12 | Sixth lens | −3.979 | 0.150 | | | |
| S13 | Seventh lens | −6.120 | 0.237 | 1.635 | 24.0 | −4914.13 |
| S14 | Seventh lens | −6.225 | 0.901 | | | |
| S15 | Eighth lens | 50.042 | 0.300 | 1.535 | 55.7 | −3.2 |
| S16 | Eighth lens | 1.659 | 0.250 | | | |
| S17 | Filter | Infinity | 0.110 | 1.517 | 64.2 | |
| S18 | | Infinity | 0.359 | | | |
| S19 | Imaging plane | Infinity | | | | |

TABLE 23

| | | | |
|---|---|---|---|
| f | 4.49 | Y52 | 0.3169 |
| IMG HT | 5.107 | Y62 | 0.4841 |
| FOV | 93.8 | Y72 | 0.4341 |
| SAG52 | −0.5667 | Y82 | 0.5815 |
| SAG62 | −0.7286 | Z52 | 0.01083 |
| SAG72 | −0.641 | Z62 | −0.02547 |
| SAG82 | −0.9926 | Z72 | −0.01247 |
| | | Z82 | 0.07701 |

In the eighth example, the first lens 810 may have positive refractive power, with a convex first surface and a concave second surface.

The second lens 820 may have negative refractive power, with a convex first surface and a concave second surface.

The third lens 830 may have positive refractive power, with a convex first surface and a concave second surface.

The fourth lens 840 may have negative refractive power, and concave first and second surfaces.

The fifth lens 850 may have negative refractive power, while the first surface of the fifth lens may be concave in the paraxial region.

In addition, at least one inflection point may be formed on at least one of the first and second surfaces of the fifth lens 850. For example, the fifth lens 850 may have a first surface that is convex in the paraxial region and concave in regions other than the paraxial region. In addition, the fifth lens 850 may have a second surface that is concave in the paraxial region and convex in regions other than the paraxial region.

The sixth lens 860 may have positive refractive power, and the first and second surfaces of the sixth lens may be convex in the paraxial region.

In addition, at least one inflection point may be formed on at least one of the first and second surfaces of the sixth lens 860. For example, the first surface of the sixth lens 860 may be convex in the paraxial region and concave in regions other than the paraxial region. In addition, the sixth lens 860 may have a second surface that is convex in the paraxial region and may be concave in regions other than the paraxial region.

The seventh lens 870 may have negative refractive power, while the first surface of the seventh lens may be concave in the paraxial region and the second surface of the seventh lens may be convex in the paraxial region.

In addition, at least one inflection point may be formed on at least one of the first and second surfaces of the seventh lens 870. For example, the seventh lens 870 may have a first surface that is concave in the paraxial region and convex in regions other than the paraxial region. In addition, the seventh lens 870 may have a second surface that is convex in the paraxial region and may be concave in regions other than the paraxial region.

The eighth lens 880 may have negative refractive power, while the first surface of the eight lens may be concave in the paraxial region.

In addition, at least one inflection point may be formed on at least one of the first and second surfaces of the eighth lens 880. For example, the eighth lens 880 may have a first surface that is convex in the paraxial region and concave in regions other than the paraxial region. In addition, the eighth lens 880 may have a second surface that is concave in the paraxial region and convex in regions other than the paraxial region.

The first lens 810 and the second lens 820 may be formed of glass, and the third lens 830 to the eighth lens 880 may be formed of plastic. In addition, the third lens 830 to the eighth lens 880 may each be formed of plastic having optical characteristics different from optical characteristics of an adjacent lens.

For example, the first lens 810 may be formed of glass having a high dispersion value, and the second lens 820 may be formed of glass having a high refractive index and a low dispersion value. The fourth lens 840 and the seventh lens 870 may each be formed of plastic having a high refractive index and the low dispersion value.

In an example, each surface of the first lens 810 to the eighth lens 880 may have an aspherical coefficient as illustrated in Table 24. For example, the object-side surfaces and image-side surfaces of the first to eighth lenses 810 to 880 may all have aspherical surfaces.

TABLE 24

| | S1 | S2 | S3 | S4 | S5 | S6 | S7 | S8 |
|---|---|---|---|---|---|---|---|---|
| K | −1.785 | −32.039 | 19.971 | 12.084 | 12.646 | 0.000 | −99.000 | −99.000 |
| A | 3.502E−02 | −3.396E−02 | −5.681E−02 | 2.307E−02 | −3.095E−02 | −3.355E−02 | −5.437E−02 | −7.047E−02 |
| B | −6.545E−02 | 2.708E−01 | 3.638E−01 | −1.016E+00 | 3.415E−01 | 4.128E−01 | −4.686E−01 | −1.971E−01 |
| C | 3.650E−01 | −1.865E+00 | −2.842E+00 | 1.230E+01 | −3.997E+00 | −4.721E+00 | 5.193E+00 | 2.157E+00 |
| D | −1.447E+00 | 8.173E+00 | 1.559E+01 | −9.465E+01 | 3.050E+01 | 3.426E+01 | −3.429E+01 | −1.155E+01 |
| E | 4.011E+00 | −2.421E+01 | −5.791E+01 | 5.012E+02 | −1.579E+02 | −1.685E+02 | 1.470E+02 | 3.901E+01 |
| F | −7.885E+00 | 5.031E+01 | 1.507E+02 | −1.881E+03 | 5.747E+02 | 5.798E+02 | −4.350E+02 | −9.063E+01 |
| G | 1.109E+01 | −7.512E+01 | −2.819E+02 | 5.084E+03 | −1.501E+03 | −1.424E+03 | 9.150E+02 | 1.498E+02 |
| H | −1.122E+01 | 8.152E+01 | 3.838E+02 | −9.972E+03 | 2.841E+03 | 2.522E+03 | −1.387E+03 | −1.789E+02 |
| J | 8.156E+00 | −6.432E+01 | −3.810E+02 | 1.417E+04 | −3.899E+03 | −3.222E+03 | 1.518E+03 | 1.545E+02 |
| L | −4.210E+00 | 3.648E+01 | 2.729E+02 | −1.443E+04 | 3.835E+03 | 2.938E+03 | −1.186E+03 | −9.563E+01 |
| M | 1.504E+00 | −1.447E+01 | −1.373E+02 | 1.024E+04 | −2.634E+03 | −1.862E+03 | 6.443E+02 | 4.126E+01 |
| N | −3.529E−01 | 3.806E+00 | 4.604E+01 | −4.813E+03 | 1.197E+03 | 7.795E+02 | −2.307E+02 | −1.178E+01 |
| O | 4.891E−02 | −5.959E−01 | −9.230E+00 | 1.344E+03 | −3.238E+02 | −1.935E+02 | 4.885E+01 | 1.995E+00 |
| P | −3.031E−03 | 4.200E−02 | 8.364E−01 | −1.689E+02 | 3.939E+01 | 2.157E+01 | −4.619E+00 | −1.517E−01 |
| | **S9** | **S10** | **S11** | **S12** | **S13** | **S14** | **S15** | **S16** |
| K | −41.861 | −5.652 | 5.445 | −10.894 | −0.634 | −15.398 | 11.180 | −6.299 |
| A | −2.046E−01 | −2.783E−01 | −3.646E−02 | 9.292E−03 | 4.758E−02 | 6.316E−02 | −2.467E−01 | −1.390E−01 |
| B | 2.402E−01 | 4.192E−01 | 2.119E−01 | 3.231E−01 | 2.317E−01 | 5.835E−02 | 1.921E−01 | 1.169E−01 |
| C | −3.091E−01 | −1.292E+00 | −6.352E−01 | −7.435E−01 | −6.682E−01 | −2.257E−01 | −1.245E−01 | −7.340E−02 |
| D | 9.498E−02 | 3.386E+00 | 1.096E+00 | 9.282E−01 | 8.677E−01 | 2.765E−01 | 6.037E−02 | 3.292E−02 |
| E | 1.205E+00 | −6.611E+00 | −1.349E+00 | −7.824E−01 | −6.871E−01 | −1.916E−01 | −2.040E−02 | −1.051E−02 |
| F | −4.061E+00 | 9.523E+00 | 1.219E+00 | 4.840E−01 | 3.650E−01 | 8.403E−02 | 4.824E−03 | 2.399E−03 |

TABLE 24-continued

| | | | | | | | | |
|---|---|---|---|---|---|---|---|---|
| G | 7.181E+00 | −1.012E+01 | −8.021E−01 | −2.280E−01 | −1.361E−01 | −2.434E−02 | −8.122E−04 | −3.944E−04 |
| H | −8.225E+00 | 7.923E+00 | 3.806E−01 | 8.221E−02 | 3.609E−02 | 4.686E−03 | 9.860E−05 | 4.689E−05 |
| J | 6.458E+00 | −4.535E+00 | −1.290E−01 | −2.234E−02 | −6.659E−03 | −5.767E−04 | −8.651E−06 | −4.026E−06 |
| L | −3.521E+00 | 1.869E+00 | 3.083E−02 | 4.459E−03 | 7.959E−04 | 3.856E−05 | 5.435E−07 | 2.467E−07 |
| M | 1.315E+00 | −5.379E−01 | −5.051E−03 | −6.294E−04 | −4.908E−05 | −1.744E−07 | −2.383E−08 | −1.052E−08 |
| N | −3.211E−01 | 1.025E−01 | 5.389E−04 | 5.926E−05 | −4.199E−07 | −1.899E−07 | 6.922E−10 | 2.961E−10 |
| O | 4.624E−02 | −1.160E−02 | −3.364E−05 | −3.332E−06 | 2.645E−07 | 1.400E−08 | −1.196E−11 | −4.948E−12 |
| P | −2.974E−03 | 5.911E−04 | 9.299E−07 | 8.457E−08 | −1.188E−08 | −3.426E−10 | 9.307E−14 | 3.717E−14 |

Figure 16:
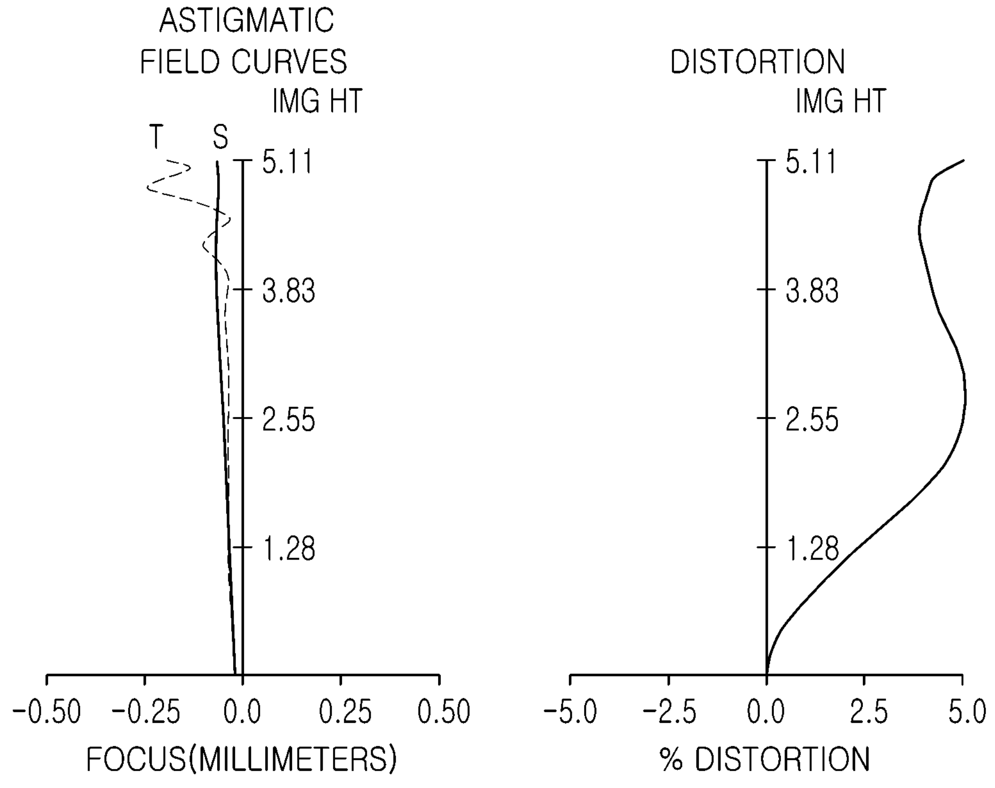
FIG. 16 is a view illustrating aberration characteristics of the example optical imaging system illustrated in FIG. 15.

In addition, the optical imaging system configured as described above may have aberration characteristics illustrated in FIG. 16.

Figure 17:
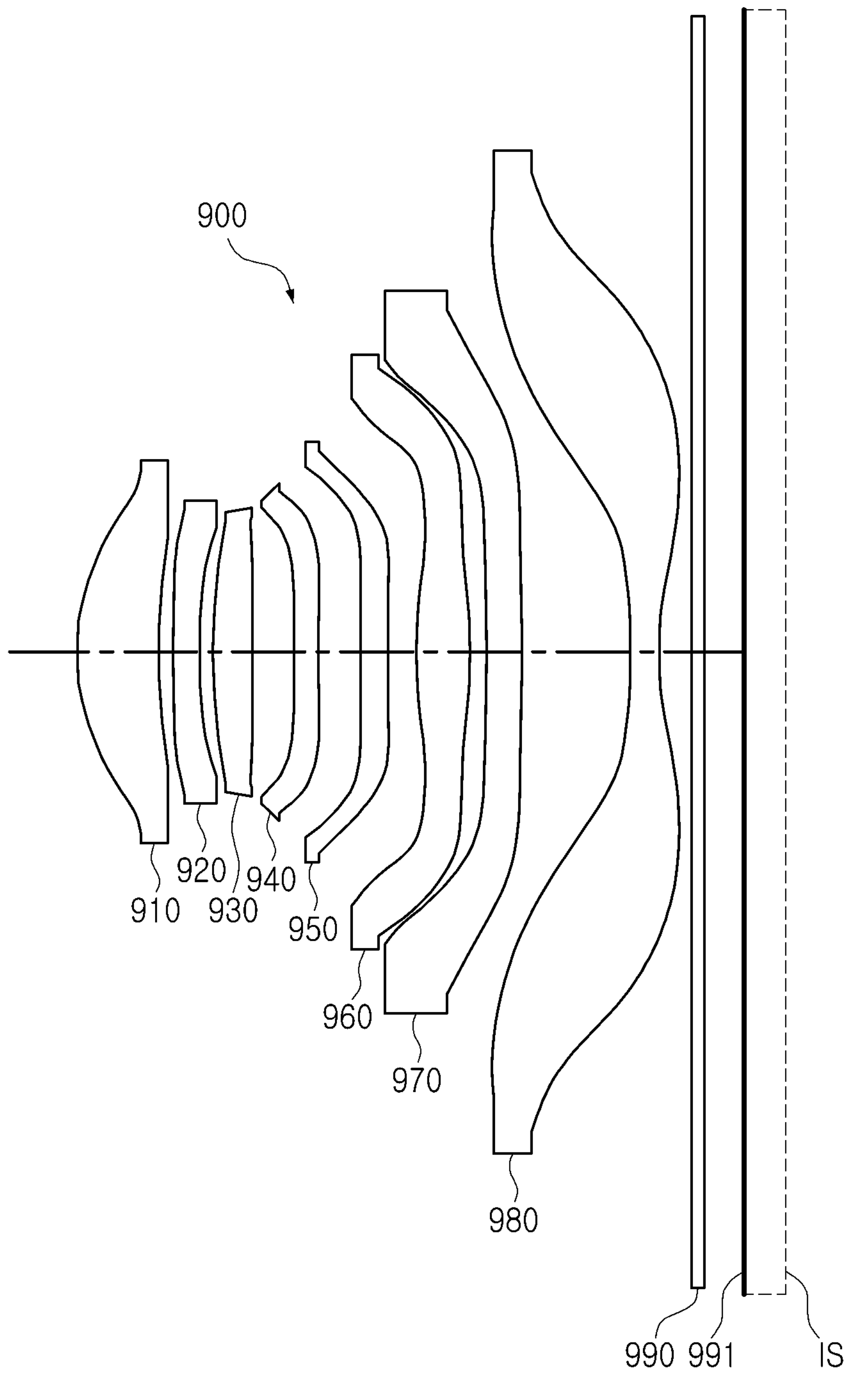
FIG. 17 is a view illustrating an optical imaging system in accordance with a ninth example.

An optical imaging system according to a ninth example is described with reference to FIGS. 17 and 18.

The optical imaging system according to the ninth example may include a first lens 910, a second lens 920, a third lens 930, a fourth lens 940, a fifth lens 950, a sixth lens 960, a seventh lens 970 and an eighth lens 980, and may further include a filter 990 and the image sensor IS, which includes an imaging plane 991.

The optical imaging system according to the ninth example may focus an image on the imaging plane 991. The imaging plane 991 may indicate the surface on which the focal point is formed by the optical imaging system. For example, the imaging plane 991 may indicate one surface of the image sensor IS, on which light is received.

Tables 25 and 26 illustrate characteristics of each lens (e.g., radius of curvature, thickness of the lens or distance between the lenses, refractive index, Abbe number or focal length).

TABLE 25

| Surface No. | Item | Radius of curvature | Thickness or distance | Refractive index | Abbe No. | Focal length |
|---|---|---|---|---|---|---|
| S1 | First lens | 1.921 | 0.689 | 1.497 | 81.6 | 5.37 |
| S2 | First lens | 5.995 | 0.100 | | | |
| S3 | Second lens | 8.011 | 0.220 | 1.755 | 27.5 | −12.68 |
| S4 | Second lens | 4.327 | 0.116 | | | |
| S5 | Third lens | 6.405 | 0.324 | 1.564 | 60.8 | 12.5 |
| S6 | Third lens | 66.198 | 0.340 | | | |
| S7 | Fourth lens | −63.481 | 0.220 | 1.650 | 21.5 | 89891.63 |
| S8 | Fourth lens | −63.500 | 0.340 | | | |
| S9 | Fifth lens | 7.264 | 0.220 | 1.567 | 37.4 | −18.07 |
| S10 | Fifth lens | 4.216 | 0.240 | | | |
| S11 | Sixth lens | 6.104 | 0.439 | 1.544 | 56.0 | 4.44 |
| S12 | Sixth lens | −3.922 | 0.150 | | | |
| S13 | Seventh lens | −5.924 | 0.285 | 1.635 | 24.0 | −70.65 |
| S14 | Seventh lens | −6.943 | 0.900 | | | |
| S15 | Eighth lens | 63.531 | 0.226 | 1.535 | 55.7 | −3.26 |
| S16 | Eighth lens | 1.700 | 0.250 | | | |
| S17 | Filter | Infinity | 0.110 | 1.517 | 64.2 | |
| S18 | | Infinity | 0.332 | | | |
| S19 | Imaging plane | Infinity | | | | |

TABLE 26

| | | | |
|---|---|---|---|
| f | 4.5 | Y52 | 0.323 |
| IMG HT | 5.107 | Y62 | 0.4701 |
| FOV | 93.8 | Y72 | 0.4436 |
| SAG52 | −0.5571 | Y82 | 0.5736 |
| SAG62 | −0.7476 | Z52 | 0.01005 |
| SAG72 | −0.6502 | Z62 | −0.02406 |
| SAG82 | −1.051 | Z72 | −0.01179 |
| | | Z82 | 0.07244 |

In the ninth example, the first lens 910 may have positive refractive power, with a convex first surface and a concave second surface.

The second lens 920 may have negative refractive power, with a convex first surface and a concave second surface.

The third lens 930 may have positive refractive power, with a convex first surface and a concave second surface.

The fourth lens 940 may have positive refractive power, and a concave first surface and a convex second surface.

The fifth lens 950 may have negative refractive power, while the first surface of the fifth lens may be concave in the paraxial region.

In addition, at least one inflection point may be formed on at least one of the first and second surfaces of the fifth lens 950. For example, the fifth lens 950 may have a first surface that is convex in the paraxial region and concave in regions other than the paraxial region. In addition, the fifth lens 950 may have a second surface that is concave in the paraxial region and convex in regions other than the paraxial region.

The sixth lens 960 may have positive refractive power, and the first and second surfaces of the sixth lens may be convex in the paraxial region.

In addition, at least one inflection point may be formed on at least one of the first and second surfaces of the sixth lens 960. For example, the first surface of the sixth lens 960 may be convex in the paraxial region and concave in regions other than the paraxial region. In addition, the sixth lens 960 may have a second surface that is convex in the paraxial region and may be concave in regions other than the paraxial region.

The seventh lens 970 may have negative refractive power, while the first surface of the seventh lens may be concave in the paraxial region and the second surface thereof may be convex in the paraxial region.

In addition, at least one inflection point may be formed on at least one of the first and second surfaces of the seventh lens 970. For example, the seventh lens 970 may have a first surface that is concave in the paraxial region and convex in regions other than the paraxial region. In addition, the seventh lens 970 may have a second surface thereof that is convex in the paraxial region and may be concave in regions other than the paraxial region.

The eighth lens 980 may have negative refractive power, while the first surface of the eighth lens may be concave in the paraxial region.

In addition, at least one inflection point may be formed on at least one of the first and second surfaces of the eighth lens 980. For example, the eighth lens 980 may have a first surface that is convex in the paraxial region and concave in regions other than the paraxial region. In addition, the eighth lens 980 may have a second surface that is concave in the paraxial region and convex in regions other than the paraxial region.

The first lens 910 to the third lens 930 may each be formed of glass, and the fourth lens 940 to the eighth lens 980 may each be formed of plastic. In addition, the fourth lens 940 to the eighth lens 980 may each be formed of plastic having optical characteristics different from those of an adjacent lens.

For example, the first lens 910 may be formed of glass having a high dispersion value, the second lens 920 may be formed of glass having a high refractive index and a low dispersion value, and the third lens 930 may be formed of glass having the high dispersion value. The fourth lens 940 and the seventh lens 970 may each be formed of plastic having a high refractive index and a low dispersion value.

In an example, each surface of the first lens 910 to the eighth lens 980 may have an aspherical coefficient as illustrated in Table 27. For example, the object-side surfaces and image-side surfaces of the first to eighth lenses 910 to 980 may be all the aspherical surfaces.

TABLE 27

| | S1 | S2 | S3 | S4 | S5 | S6 | S7 | S8 |
|---|---|---|---|---|---|---|---|---|
| K | −1.886 | −32.374 | 20.967 | 12.052 | 13.677 | 0.000 | −99.000 | 5.764 |
| A | 2.155E−02 | −1.973E−02 | −3.805E−02 | −8.814E−03 | −2.171E−02 | −3.189E−02 | −9.102E−02 | −4.032E−02 |
| B | 8.150E−02 | 1.085E−01 | 1.218E−01 | −2.994E−01 | 1.992E−01 | 3.646E−01 | 3.585E−01 | −2.662E−01 |
| C | −5.083E−01 | −8.469E−01 | −6.009E−01 | 4.132E+00 | −2.627E+00 | −4.046E+00 | 2.884E+00 | 2.262E+00 |
| D | 1.802E+00 | 4.107E+00 | 2.076E+00 | −3.403E+01 | 2.251E+01 | 2.797E+01 | 1.473E+01 | −1.182E+01 |
| E | −4.103E+00 | −1.332E+01 | −2.986E+00 | 1.891E+02 | −1.288E+02 | −1.306E+02 | 5.402E+01 | 4.046E+01 |
| F | 6.265E+00 | 3.001E+01 | −5.172E+00 | −7.323E+02 | 5.078E+02 | 4.277E+02 | 1.454E+02 | −9.597E+01 |
| G | −6.559E+00 | −4.811E+01 | 3.463E+01 | 2.012E+03 | −1.412E+03 | −1.005E+03 | 2.922E+02 | 1.620E+02 |
| H | 4.715E+00 | 5.562E+01 | −8.156E+01 | −3.961E+03 | 2.804E+03 | 1.713E+03 | 4.412E+02 | −1.972E+02 |
| J | −2.273E+00 | −4.644E+01 | 1.152E+02 | 5.592E+03 | −3.989E+03 | −2.117E+03 | 4.986E+02 | 1.733E+02 |
| L | 6.826E−01 | 2.772E+01 | −1.070E+02 | −5.604E+03 | 4.030E+03 | 1.876E+03 | 4.152E+02 | −1.087E+02 |
| M | −9.880E−02 | −1.152E+01 | 6.612E+01 | 3.888E+03 | −2.821E+03 | −1.161E+03 | 2.470E+02 | 4.740E+01 |
| N | −5.221E−03 | 3.165E+00 | −2.631E+01 | −1.775E+03 | 1.300E+03 | 4.763E+02 | 9.909E+01 | −1.363E+01 |
| O | 4.043E−03 | −5.164E−01 | 6.118E+00 | 4.790E+02 | −3.547E+02 | −1.163E+02 | 2.399E+01 | 2.320E+00 |
| P | −4.259E−04 | 3.786E−02 | −6.330E−01 | −5.791E+01 | 4.338E+01 | 1.278E+01 | 2.643E+00 | −1.765E−01 |

| | S9 | S10 | S11 | S12 | S13 | S14 | S15 | S16 |
|---|---|---|---|---|---|---|---|---|
| K | −38.578 | −3.607 | 5.429 | −9.896 | 0.463 | −11.647 | −71.806 | −6.476 |
| A | −1.816E−01 | −2.379E−01 | −8.008E−03 | 2.299E−02 | 3.470E−02 | 4.830E−02 | −2.607E−01 | −1.558E−01 |
| B | 3.098E−01 | 4.036E−01 | 1.005E−01 | 3.492E−01 | 2.938E−01 | 8.757E−02 | 2.296E−01 | 1.452E−01 |
| C | −1.458E+00 | −1.737E+00 | −3.858E−01 | −9.044E−01 | −8.265E−01 | −2.555E−01 | −1.588E−01 | −9.758E−02 |
| D | 5.785E+00 | 5.493E+00 | 6.367E−01 | 1.205E+00 | 1.113E+00 | 2.943E−01 | 7.771E−02 | 4.580E−02 |
| E | −1.520E+01 | −1.173E+01 | −6.836E−01 | −1.040E+00 | −9.465E−01 | −2.005E−01 | −2.602E−02 | −1.511E−02 |
| F | 2.721E+01 | 1.748E+01 | 5.202E−01 | 6.309E−01 | 5.601E−01 | 8.938E−02 | 6.079E−03 | 3.542E−03 |
| G | −3.439E+01 | −1.858E+01 | −2.829E−01 | −2.804E−01 | −2.422E−01 | −2.738E−02 | −1.013E−03 | −5.954E−04 |
| H | 3.123E+01 | 1.428E+01 | 1.072E−01 | 9.279E−02 | 7.788E−02 | 5.910E−03 | 1.222E−04 | 7.221E−05 |
| J | −2.049E+01 | −7.928E+00 | −2.679E−02 | −2.284E−02 | −1.855E−02 | −9.066E−04 | −1.069E−05 | −6.313E−06 |
| L | 9.619E+00 | 3.149E+00 | 3.848E−03 | 4.117E−03 | 3.203E−03 | 9.810E−05 | 6.735E−07 | 3.938E−07 |
| M | −3.152E+00 | −8.711E−01 | −1.427E−04 | −5.272E−04 | −3.864E−04 | −7.293E−06 | −2.976E−08 | −1.707E−08 |
| N | 6.844E−01 | 1.593E−01 | −4.708E−05 | 4.534E−05 | 3.063E−05 | 3.525E−07 | 8.761E−10 | 4.889E−10 |
| O | −8.851E−02 | −1.730E−02 | 7.672E−06 | −2.346E−06 | −1.420E−06 | −9.891E−09 | −1.544E−11 | −8.313E−12 |
| P | 5.164E−03 | 8.446E−04 | −3.734E−07 | 5.520E−08 | 2.893E−08 | 1.205E−10 | 1.233E−13 | 6.356E−14 |

Figure 18:
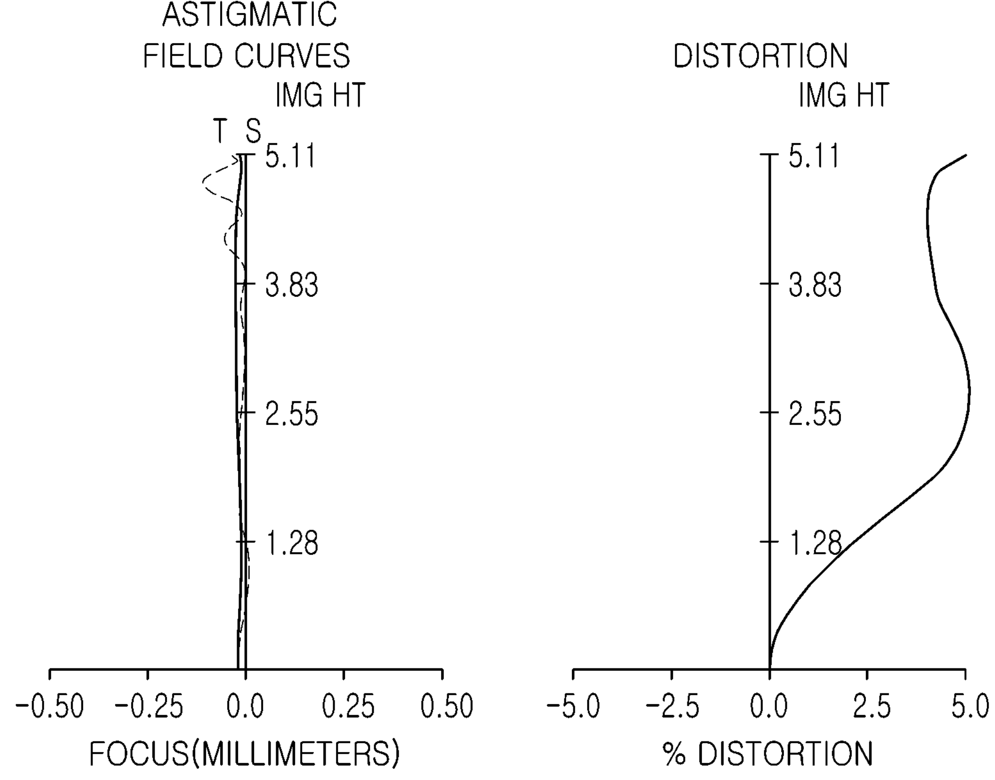
FIG. 18 is a view illustrating aberration characteristics of the example optical imaging system illustrated in FIG. 17.

In addition, the optical imaging system configured as described above may have aberration characteristics illustrated in FIG. 18.

Figure 19:
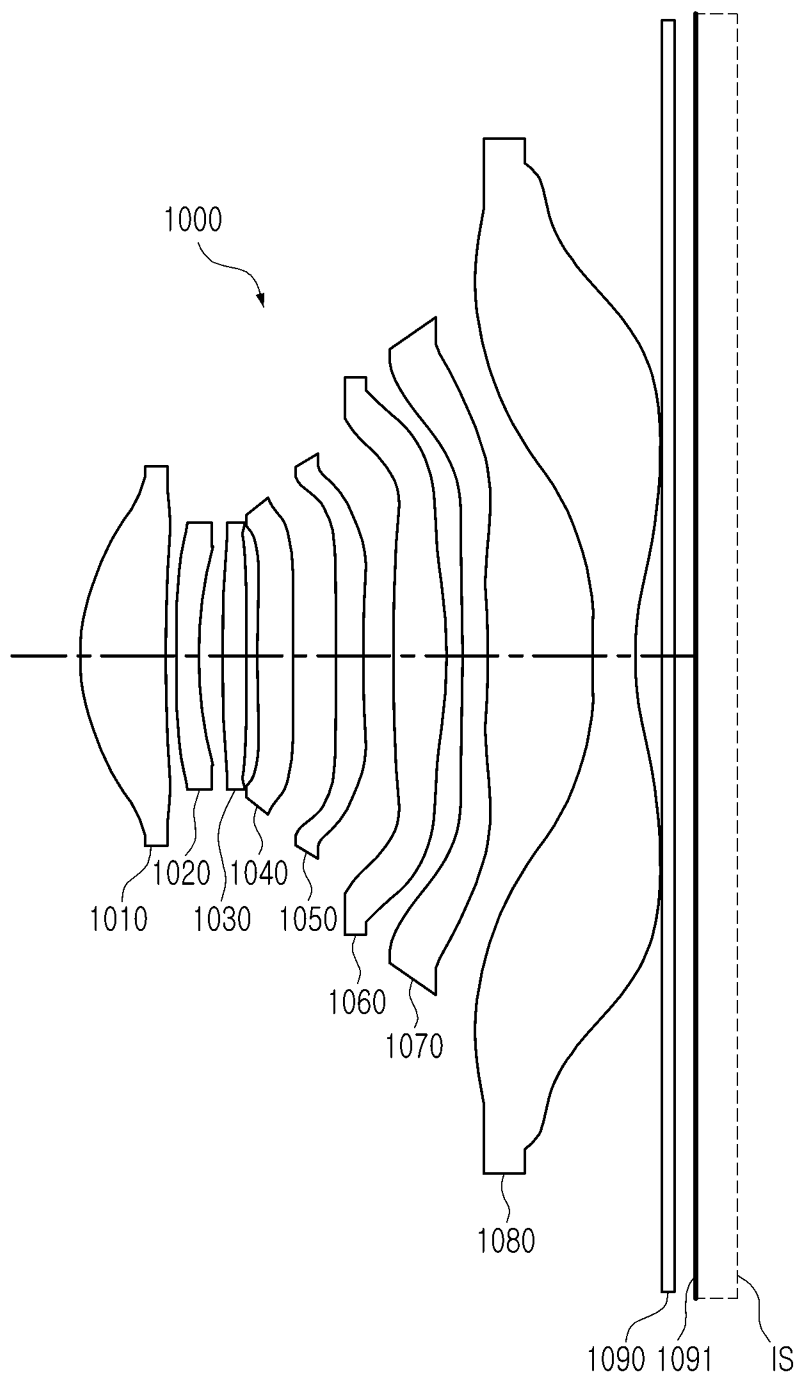
FIG. 19 is a view illustrating an optical imaging system in accordance with a tenth example.

An optical imaging system 1000 according to a tenth example is described with reference to FIGS. 19 and 20.

The optical imaging system 1000 according to the tenth example may include a first lens 1010, a second lens 1020, a third lens 1030, a fourth lens 1040, a fifth lens 1050, a sixth lens 1060, a seventh lens 1070 and an eighth lens 1080, and may further include a filter 1090 and the image sensor IS, which includes an imaging plane 1091.

The optical imaging system 1000 according to the tenth example may focus an image on an imaging plane 1091. The imaging plane 1091 may indicate the surface on which the focal point is formed by the optical imaging system. For example, the imaging plane 1091 may indicate one surface of the image sensor IS, on which light is received.

Tables 28 and 29 illustrate characteristics of each lens (e.g., radius of curvature, thickness of the lens or distance between the lenses, refractive index, Abbe number or focal length).

TABLE 28

| Surface no. | Item | Radius of curvature | Thickness or distance | Refractive index | Abbe No. | Focal length |
|---|---|---|---|---|---|---|
| S1 | First lens | 1.970 | 0.748 | 1.497 | 81.6 | 5.37 |
| S2 | First lens | 6.510 | 0.100 | | | |
| S3 | Second lens | 7.685 | 0.210 | 1.755 | 27.5 | −21.1 |
| S4 | Second lens | 5.137 | 0.220 | | | |
| S5 | Third lens | 33.136 | 0.210 | 1.517 | 64.2 | −1000 |
| S6 | Third lens | 31.079 | 0.100 | | | |
| S7 | Fourth lens | 7.665 | 0.304 | 1.744 | 44.9 | 20.24 |
| S8 | Fourth lens | 15.263 | 0.399 | | | |
| S9 | Fifth lens | 7.033 | 0.238 | 1.567 | 37.4 | −23.36 |
| S10 | Fifth lens | 4.547 | 0.253 | | | |
| S11 | Sixth lens | 6.013 | 0.491 | 1.544 | 56.0 | 4.39 |
| S12 | Sixth lens | −3.869 | 0.157 | | | |
| S13 | Seventh lens | −7.049 | 0.210 | 1.635 | 24.0 | −21.75 |
| S14 | Seventh lens | −14.417 | 0.945 | | | |
| S15 | Eighth lens | 50.007 | 0.380 | 1.535 | 55.7 | −3.45 |
| S16 | Eighth lens | 1.780 | 0.250 | | | |
| S17 | Filter | Infinity | 0.110 | 1.517 | 64.2 | |
| S18 | | Infinity | 0.175 | | | |
| S19 | Imaging plane | Infinity | | | | |

TABLE 29

| | | | |
|---|---|---|---|
| f | 4.32 | Y52 | 0.3597 |
| IMG HT | 5.107 | Y62 | 0.6427 |
| FOV | 96.1 | Y72 | 0.335 |
| SAG52 | −0.408 | Y82 | 0.6852 |
| SAG62 | −0.7106 | Z52 | 0.01144 |
| SAG72 | −0.4527 | Z62 | −0.04308 |
| SAG82 | −0.9839 | Z72 | −0.00332 |
| | | Z82 | 0.09726 |

In the tenth example, the first lens 1010 may have positive refractive power, with a convex first surface and a concave second surface.

The second lens 1020 may have negative refractive power, with a convex first surface and a concave second surface.

The third lens 1030 may have negative refractive power, with a convex first surface and a concave second surface.

The fourth lens 1040 may have positive refractive power, with a convex first surface and a concave second surface.

The fifth lens 1050 may have negative refractive power, while the first surface of the fifth lens may be concave in the paraxial region.

In addition, at least one inflection point may be formed on at least one of the first and second surfaces of the fifth lens 1050. For example, the fifth lens 1050 may have a first surface that is convex in the paraxial region and concave in regions other than the paraxial region. In addition, the fifth lens 1050 may have a second surface concave in the paraxial region and convex in regions other than the paraxial region.

The sixth lens 1060 may have positive refractive power, and the first and second surfaces may be convex in the paraxial region.

In addition, at least one inflection point may be formed on at least one of the first and second surfaces of the sixth lens 1060. For example, the first surface of the sixth lens 1060 may be convex in the paraxial region and concave in regions other than the paraxial region. In addition, the sixth lens 1060 may have the second surface thereof convex in the paraxial region and may be concave in regions other than the paraxial region.

The seventh lens 1070 may have negative refractive power, while the first surface of the seventh lens may be concave in the paraxial region and the second surface of the seventh lens may be convex in the paraxial region.

In addition, at least one inflection point may be formed on at least one of the first and second surfaces of the seventh lens 1070. For example, the seventh lens 1070 may have a first surface that is concave in the paraxial region and convex in regions other than the paraxial region. In addition, the seventh lens 1070 may have a second surface that is convex in the paraxial region and may be concave in regions other than the paraxial region.

The eighth lens 1080 may have negative refractive power, while the first surface of the eighth lens may be concave in the paraxial region.

In addition, at least one inflection point may be formed on at least one of the first and second surfaces of the eighth lens 1080. For example, the eighth lens 1080 may have a first surface that is convex in the paraxial region and concave in regions other than the paraxial region. In addition, the eighth lens 1080 may have a second surface that is concave in the paraxial region and convex in regions other than the paraxial region.

The first lens 1010 to the fourth lens 1040 may each be formed of glass, and the fifth lens 1050 to the eighth lens 1080 may each be formed of plastic. In addition, the fifth lens 1050 to the eighth lens 1080 may each be formed of plastic having optical characteristics different from optical characteristics of an adjacent lens.

For example, the first lens 1010 may be formed of glass having a high dispersion value, the second lens 1020 and the fourth lens 1040 may each be formed of glass having a high refractive index and a low dispersion value, and the third lens 1030 may be formed of glass having a high dispersion value. The seventh lens 1070 may be formed of plastic having a high refractive index and the low dispersion value.

In an example, each surface of the first lens 1010 to the eighth lens 1080 may have an aspherical coefficient as illustrated in Table 30. For example, the object-side surfaces and image-side surfaces of the first to eighth lenses 1010 to 1080 may all have aspherical surfaces.

TABLE 30

| | S1 | S2 | S3 | S4 | S5 | S6 | S7 | S8 |
|---|---|---|---|---|---|---|---|---|
| K | −1.831 | −54.695 | 21.852 | 16.120 | −99.000 | −99.000 | 29.790 | 92.004 |
| A | 1.208E−02 | −4.289E−02 | −7.604E−02 | 5.566E−02 | 7.574E−02 | −1.754E−01 | −1.696E−01 | −8.735E−02 |
| B | 1.457E−01 | 2.849E−01 | 8.288E−01 | −1.659E+00 | 2.045E+00 | 1.744E+00 | 1.196E+00 | 4.463E−01 |
| C | −8.067E−01 | −1.808E+00 | −8.425E+00 | 2.373E+01 | 2.469E+01 | −1.622E+01 | −9.730E+00 | −2.672E+00 |
| D | 2.592E+00 | 7.308E+00 | 5.653E+01 | −2.091E+02 | 1.791E+02 | 1.019E+02 | 5.330E+01 | 1.029E+01 |
| E | −5.435E+00 | −1.976E+01 | −2.560E+02 | 1.235E+03 | 8.582E+02 | −4.387E+02 | −2.024E+02 | −2.670E+01 |
| F | 7.839E+00 | 3.712E+01 | 8.141E+02 | −5.086E+03 | 2.848E+03 | 1.332E+03 | 5.455E+02 | 4.756E+01 |
| G | −8.017E+00 | −4.965E+01 | −1.861E+03 | 1.497E+04 | 6.720E+03 | −2.914E+03 | −1.064E+03 | −5.863E+01 |
| H | 5.897E+00 | 4.788E+01 | 3.093E+03 | −3.187E+04 | 1.143E+04 | 4.641E+03 | 1.515E+03 | 4.947E+01 |
| J | −3.125E+00 | −3.333E+01 | −3.736E+03 | 4.915E+04 | 1.406E+04 | −5.383E+03 | −1.576E+03 | −2.724E+01 |
| L | 1.179E+00 | 1.658E+01 | 3.242E+03 | −5.432E+04 | 1.237E+04 | 4.496E+03 | 1.185E+03 | 8.359E+00 |
| M | −3.082E−01 | −5.747E+00 | −1.966E+03 | 4.191E+04 | 7.593E+03 | −2.633E+03 | −6.269E+02 | −3.137E−01 |
| N | 5.287E−02 | 1.317E+00 | 7.904E+02 | −2.142E+04 | 3.085E+03 | 1.026E+03 | 2.217E+02 | −7.672E−01 |
| O | −5.333E−03 | −1.793E−01 | −1.890E+02 | 6.513E+03 | 7.455E+02 | −2.388E+02 | −4.711E+01 | 2.645E−01 |
| P | 2.386E−04 | 1.097E−02 | 2.035E+01 | −8.916E+02 | 8.109E+01 | 2.512E+01 | 4.555E+00 | −2.978E−02 |

| | S9 | S10 | S11 | S12 | S13 | S14 | S15 | S16 |
|---|---|---|---|---|---|---|---|---|
| K | −1.643 | 1.753 | 5.365 | −5.603 | −5.086 | −8.907 | 99.000 | −5.470 |
| A | −1.875E−01 | −1.852E−01 | −2.223E−02 | 2.329E−02 | 4.072E−02 | 3.542E−02 | −1.985E−01 | −1.139E−01 |
| B | 4.647E−01 | 1.305E−01 | 6.676E−03 | 1.759E−01 | 2.043E−01 | 1.084E−01 | 1.298E−01 | 9.005E−02 |
| C | −1.920E+00 | −1.135E−01 | −8.735E−03 | −4.108E−01 | −5.014E−01 | −2.529E−01 | −7.017E−02 | −5.356E−02 |
| D | 6.513E+00 | 8.651E−03 | −2.477E−02 | 4.755E−01 | 5.570E−01 | 2.573E−01 | 2.905E−02 | 2.228E−02 |
| E | −1.574E+01 | 3.101E−01 | 5.447E−02 | −3.548E−01 | −3.796E−01 | −1.573E−01 | −8.526E−03 | −6.379E−03 |
| F | 2.687E+01 | −8.700E−01 | −5.168E−02 | 1.942E−01 | 1.763E−01 | 6.312E−02 | 1.770E−03 | 1.268E−03 |
| G | −3.284E+01 | 1.377E+00 | 3.442E−02 | −8.446E−02 | −5.958E−02 | −1.735E−02 | −2.642E−04 | −1.780E−04 |
| H | 2.897E+01 | −1.421E+00 | −1.961E−02 | 2.968E−02 | 1.532E−02 | 3.334E−03 | 2.867E−05 | 1.780E−05 |
| J | −1.846E+01 | 9.898E−01 | 9.190E−03 | −8.172E−03 | −3.050E−03 | −4.492E−04 | −2.265E−06 | −1.271E−06 |
| L | 8.407E+00 | −4.683E−01 | −3.138E−03 | 1.681E−03 | 4.647E−04 | 4.179E−05 | 1.291E−07 | 6.415E−08 |
| M | −2.667E+00 | 1.482E−01 | 7.196E−04 | −2.453E−04 | −5.198E−05 | −2.576E−06 | −5.173E−09 | −2.231E−09 |
| N | 5.592E−01 | −3.004E−02 | −1.039E−04 | 2.381E−05 | 3.972E−06 | 9.640E−08 | 1.382E−10 | 5.072E−11 |
| O | −6.957E−02 | 3.520E−03 | 8.515E−06 | −1.373E−06 | −1.834E−07 | −1.781E−09 | −2.210E−12 | −6.771E−13 |
| P | 3.884E−03 | −1.814E−04 | −3.019E−07 | 3.552E−08 | 3.827E−09 | 7.277E−12 | 1.601E−14 | 4.011E−15 |

Figure 20:
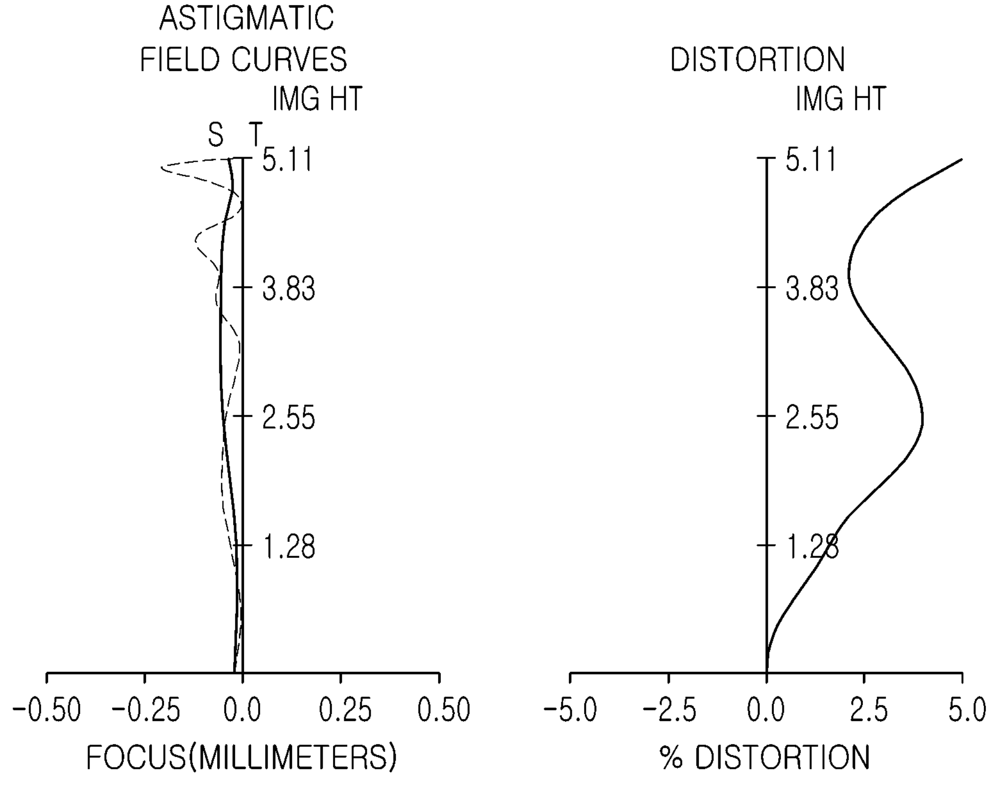
FIG. 20 is a view illustrating aberration characteristics of the example optical imaging system illustrated in FIG. 19.
Figure 21:
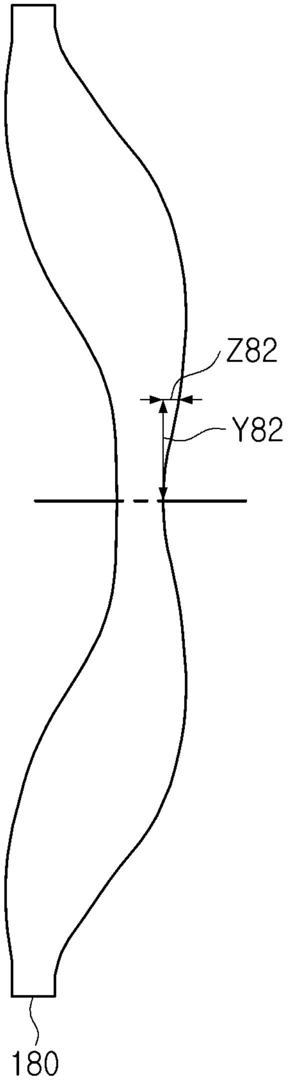
FIG. 21 is a view illustrating Y82 and Z82, in accordance with one or more embodiments.

In addition, the optical imaging system configured as described above may have aberration characteristics illustrated in FIG. 20.

As set forth above, the optical imaging system according to one or more examples may implement a high resolution and have a small overall length.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:

a first lens, a second lens, a third lens, a fourth lens, a fifth lens, a sixth lens, a seventh lens and an eighth lens, which are arranged in order from an object side to an imaging side, wherein the first lens has positive refractive power, the second lens has negative refractive power, the third lens has positive refractive power, the fourth lens has positive refractive power, the fifth lens has negative refractive power, the sixth lens has negative refractive power, the seventh lens has positive refractive power, and the eighth lens has negative refractive power, wherein the fourth lens has a concave object-side surface in a paraxial region thereof and a convex image-side surface in a paraxial region thereof, wherein the optical imaging system has a total of eight lenses, wherein at least one lens of the first to eighth lens is formed of glass, and remaining lenses are formed of plastic, wherein $40<v1-v2<70$ and $20<v1-(v6+v7)/2<50$ are satisfied, where v1 indicates an Abbe number of the first lens, v2 indicates an Abbe number of the second lens, v6 indicates an Abbe number of the sixth lens, and v7 indicates an Abbe number of the seventh lens, and wherein among the first to eighth lenses, the fourth lens has a largest absolute focal length, and the fifth lens has a second largest absolute focal length.

2. The optical imaging system of claim 1, wherein at least one of $-0.2<SAG52/TTL<0$, $-0.2<SAG62/TTL<0$, $-0.3<SAG72/TTL<0$ and $-0.3<SAG82/TTL<0$ is satisfied, where SAG52 indicates a Sag value obtained at an end of an effective diameter of an image-side surface of the fifth lens, SAG62 indicates a Sag value obtained at an end of an effective diameter of an image-side surface of the sixth lens, SAG72 indicates a Sag value obtained at an end of an effective diameter of an image-side surface of the seventh lens, and SAG82 indicates a Sag value obtained at an end of an effective diameter of an image-side surface of the eighth lens.

3. The optical imaging system of claim 1, wherein $30<v1-v4<70$ is satisfied, where v4 indicates an Abbe number of the fourth lens.

4. The optical imaging system of claim 3, wherein the first lens is formed of glass having an Abbe number greater than 70.

5. The optical imaging system of claim 3, wherein the Abbe number of the first lens is the greatest among the Abbe numbers of the first to eighth lenses, and the second lens and the fourth lens are each formed of one of glass and plastic having a refractive index greater than 1.65 and the Abbe number less than 22.

6. The optical imaging system of claim 1, wherein $0<f1/f<1.4$ is satisfied, where f indicates a total focal length of the optical imaging system, and f1 indicates a focal length of the first lens.

7. The optical imaging system of claim 1, wherein $-10<f2/f<-1$ is satisfied, in which "f" indicates a total focal length of the optical imaging system, and f2 indicates a focal length of the second lens.

8. The optical imaging system of claim 1, wherein $0<|f3/f|/10<30$ is satisfied, where f indicates a total focal length of the optical imaging system, and f3 indicates a focal length of the third lens.

9. The optical imaging system of claim 1, wherein $0.5<|f6/f|<10$ is satisfied, where f indicates a total focal length of the optical imaging system, and f6 indicates a focal length of the sixth lens.

10. The optical imaging system of claim 1, wherein $-3<f8/f<0$ is satisfied, where f indicates a total focal length of the optical imaging system, and f8 indicates a focal length of the eighth lens.

11. The optical imaging system of claim 1, wherein $TTL/f<1.4$ and $BFL/f<0.3$ are satisfied, where TTL indicates a distance on an optical axis from an object-side surface of the first lens to an imaging plane, f indicates a total focal length of the optical imaging system, and BFL indicates a distance on the optical axis from an image-side surface of the eighth lens to the imaging plane.

12. The optical imaging system of claim 1, wherein $D1/f<0.1$ is satisfied, where D1 indicates a distance on the optical axis between an image-side surface of the first lens and an object-side surface of the second lens, and f indicates a total focal length of the optical imaging system.

13. The optical imaging system of claim 1, wherein $FOV \times (IMG\ HT/f)>65°$ is satisfied, where IMG HT indicates half a diagonal length of an imaging plane, f indicates a total focal length of the optical imaging system, and FOV indicates a field of view of the optical imaging system.

14. The optical imaging system of claim 1, wherein the fifth lens has at least one inflection point on an image-side surface thereof, and $2<|Y52/Z52|<50$ is satisfied, where Y52 indicates a vertical height between a first inflection point of the image-side surface of the fifth lens and the optical axis, and Z52 indicates a Sag value obtained at the first inflection point of the image-side surface of the fifth lens.

15. The optical imaging system of claim 1, wherein the sixth lens has at least one inflection point on an image-side surface thereof, and $3<|Y62/Z62|<50$ is satisfied, where Y62 indicates a vertical height between a first inflection point of the image-side surface of the sixth lens and the optical axis, and Z62 indicates a Sag value obtained at the first inflection point of the image-side surface of the sixth lens.

16. The optical imaging system of claim 1, wherein the seventh lens has at least one inflection point on an image-side surface thereof, and

521 $|Y72/Z72|<120$ is satisfied, in which Y72 indicates a vertical height between a first inflection point of the image-side surface of the seventh lens and the optical axis, and Z72 indicates a Sag value obtained at the first inflection point of the image-side surface of the seventh lens.

17. The optical imaging system of claim 1, wherein the eighth lens has at least one inflection point on an image-side surface thereof, and $2<|Y82/Z82|<30$ is satisfied, in which Y82 indicates a vertical height between a first inflection point of the image-side surface of the eighth lens and the optical axis, and Z82 indicates a Sag value obtained at the first inflection point of the image-side surface of the eighth lens.

18. The optical imaging system of claim 1, wherein $TTL/(2 \times IMG\ HT)<0.6$ is satisfied, where TTL indicates a distance on an optical axis from an object-side surface of the first lens to an imaging plane, and IMG HT indicates half a diagonal length of the imaging plane.

* * * * *